US011267590B2

(12) United States Patent
Ashrafi

(10) Patent No.: US 11,267,590 B2
(45) Date of Patent: Mar. 8, 2022

(54) RADAR SYSTEM AND METHOD FOR DETECTING AND IDENTIFYING TARGETS USING ORBITAL ANGULAR MOMENTUM CORRELATION MATRIX

(71) Applicant: NXGEN PARTNERS IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 146 days.

(21) Appl. No.: 16/576,107

(22) Filed: Sep. 19, 2019

(65) Prior Publication Data

US 2020/0407082 A1 Dec. 31, 2020

Related U.S. Application Data

(60) Provisional application No. 62/867,715, filed on Jun. 27, 2019.

(51) Int. Cl.
*B64G 1/24* (2006.01)
*G01S 7/52* (2006.01)
(Continued)

(52) U.S. Cl.
CPC .......... *B64G 1/242* (2013.01); *G01S 7/52025* (2013.01); *H04B 10/25752* (2013.01); *H04B 10/508* (2013.01)

(58) Field of Classification Search
CPC ....... B64G 1/242; B64G 3/00; G01S 7/52025; G01S 7/026; G01S 7/4802; G01S 7/4814;
(Continued)

(56) References Cited

U.S. PATENT DOCUMENTS 3,459,466 A 8/1969 Giordmaine
3,614,722 A 10/1971 Jones
(Continued)

OTHER PUBLICATIONS

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).
(Continued)

*Primary Examiner* — Abbas H Alagheband
(74) *Attorney, Agent, or Firm* — Gregory M. Howison

(57) ABSTRACT

A system for identifying a target object includes a database containing a plurality of unique combinations of a plurality of orbital angular momentum modes. Each of the unique combinations of the plurality of orbital angular momentum modes is associated with a particular type of target object. A signal generator generates a signal having one of a plurality of orbital angular momentum modes applied thereto and directs the signal toward the target object. A transceiver transmits the signal toward the target object and receives a second signal having a unique combination of a plurality of orbital angular momentum modes reflected from the target object. A detection system compares the second signal having the unique combination of the plurality of orbital angular momentum modes with the plurality of unique combinations of the plurality of unique orbital angular unique combination of a plurality of orbital angular momentum modes within the database, identifies the target object responsive to the comparison of the second signal having the unique combination of the plurality of orbital angular momentum modes with the plurality of unique combinations of the plurality of unique orbital angular unique combination of a plurality of orbital angular momentum modes within the database and provides an output identifying the target object.

21 Claims, 44 Drawing Sheets

(51) Int. Cl.
*H04B 10/508* (2013.01)
*H04B 10/2575* (2013.01)

(58) Field of Classification Search
CPC ........ G01S 7/4816; G01S 7/499; G01S 17/02; H04B 10/508; H04B 10/25752
USPC ........................................................ 375/136
See application file for complete search history.

(56) References Cited

U.S. PATENT DOCUMENTS

| | | | |
|---|---|---|---|
| 3,893,771 | A | 7/1975 | Bell |
| 4,379,409 | A | 4/1983 | Primbsch et al. |
| 4,503,336 | A | 3/1985 | Hutchin et al. |
| 4,584,883 | A | 4/1986 | Miyoshi et al. |
| 4,736,463 | A | 4/1988 | Chavez |
| 4,862,115 | A | 8/1989 | Lee et al. |
| 5,051,754 | A | 9/1991 | Newberg |
| 5,220,163 | A | 6/1993 | Toughlian et al. |
| 5,222,071 | A | 6/1993 | Pezeshki et al. |
| 5,272,484 | A | 12/1993 | Labaar |
| 5,543,805 | A | 8/1996 | Thaniyavarn |
| 5,555,530 | A | 9/1996 | Meehan |
| 6,337,659 | B1 | 1/2002 | Kim |
| 6,992,829 | B1 | 1/2006 | Jennings et al. |
| 7,577,165 | B1 | 8/2009 | Barrett |
| 7,663,502 | B2* | 2/2010 | Breed .................. G01S 17/04 340/12.25 |
| 7,729,572 | B1 | 6/2010 | Pepper et al. |
| 7,792,431 | B2 | 9/2010 | Jennings et al. |
| 8,058,598 | B2* | 11/2011 | Sandler .................. G01S 7/4814 250/201.9 |
| 8,432,884 | B1 | 4/2013 | Ashrafi |
| 8,503,546 | B1 | 8/2013 | Ashrafi |
| 8,559,823 | B2 | 10/2013 | Izadpanah et al. |
| 8,811,366 | B2 | 8/2014 | Ashrafi |
| 8,909,586 | B2* | 12/2014 | Horwood ................ G06N 7/02 706/51 |
| 9,077,577 | B1* | 7/2015 | Ashrafi .............. H04W 12/041 |
| 9,391,375 | B1 | 7/2016 | Bales et al. |
| 9,448,162 | B2* | 9/2016 | Zhai ..................... G01S 7/4816 |
| 10,209,192 | B2* | 2/2019 | Ashrafi ............... G01N 21/6428 |
| 10,326,526 | B2* | 6/2019 | Ashrafi .................. G02B 6/262 |
| 10,530,435 | B2* | 1/2020 | Ashrafi ............... H04L 27/2639 |
| 2005/0254826 | A1 | 11/2005 | Jennings et al. |
| 2005/0259914 | A1 | 11/2005 | Padgett et al. |
| 2007/0025421 | A1* | 2/2007 | Shattil .............. H04B 10/25752 375/136 |
| 2008/0192246 | A1 | 8/2008 | Neiss et al. |
| 2010/0013696 | A1* | 1/2010 | Schmitt ................. G01S 7/499 342/54 |
| 2010/0317959 | A1 | 12/2010 | Eigort et al. |
| 2011/0058248 | A1 | 3/2011 | Vodopyanov et al. |
| 2011/0069309 | A1 | 3/2011 | Newbury et al. |
| 2011/0122407 | A1 | 5/2011 | Jalali et al. |
| 2011/0242652 | A1* | 10/2011 | Sahouani ............. G02B 5/3033 359/486.02 |
| 2011/0272584 | A1 | 11/2011 | Zhang et al. |
| 2012/0207470 | A1 | 8/2012 | Djordjevic et al. |
| 2013/0027774 | A1 | 1/2013 | Bovino et al. |
| 2013/0235744 | A1 | 9/2013 | Chen et al. |
| 2013/0321801 | A1 | 12/2013 | Lewis et al. |
| 2014/0016181 | A1 | 1/2014 | Dal Negro |
| 2014/0070102 | A1* | 3/2014 | Globus ................... G01N 22/00 250/339.07 |
| 2014/0349337 | A1* | 11/2014 | Dasari .................... G01N 21/65 435/40.5 |
| 2014/0355624 | A1 | 12/2014 | Li et al. |
| 2015/0098697 | A1 | 4/2015 | Marom et al. |
| 2015/0289766 | A1 | 10/2015 | Ashrafi et al. |
| 2016/0061810 | A1 | 3/2016 | Kim et al. |
| 2016/0109361 | A1 | 4/2016 | Wang et al. |
| 2016/0231274 | A1 | 8/2016 | Tirapu et al. |
| 2016/0352419 | A1* | 12/2016 | Fonseka ............ H03M 13/2775 |
| 2018/0024427 | A1* | 1/2018 | Rebiffe .............. G03B 21/2066 362/231 |
| 2019/0339288 | A1* | 11/2019 | Gangadharan ..... G01N 33/6893 |
| 2020/0249350 | A1* | 8/2020 | Schmalenberg ...... G01S 7/4814 |
| 2020/0284883 | A1* | 9/2020 | Ferreira .................. G01S 7/484 |

OTHER PUBLICATIONS

Anderson, Jorgen Bach; Rappaport, Theodore S.; Yoshida, Susumu; Propagation Measurements and Models for Wireless Communications Channels; 33 42-49 (1995).

Byun, S.H., Haji, G.A. & Young, L.E.; Development and application of GPS signal multipath simulator; Radio Science, vol. 37, No. 6, 1098 (2002).

Gibson, G. et al., Free-space information transfer using light beans carrying orbital angular momentum; Optical Express 12, 5448-5456 (2004).

H. Yao et al.; Patch Antenna Array for the Generation of Millimeter-wave Hermite-Gaussian Beams, IEEE Antennas and Wireless Propagation Letters; 2016.

Huang, Hao et al.; Crosstalk mitigation in a free-space orbital angular momentum multiplexed communication link using 4×4 MIMO equalization; Optics Letters, vol. 39, No. 15; 4360-4363; (2014).

Hur, Sooyoung et at; Millimeter Wave Beamforming for Wireless Backhaul and Access in Small Cell Networks. IEEE Transactions on Communications, vol. 61, 4391-4402 (2013).

Iskander, Magdy F.; Propagation Prediction Models for Wireless Communication Systems; IEEE Transactions on Microwave Theory and Techniques, vol. 50., No. 3, 662-673 (2002).

Katayama, Y., et al.; Wireless Data Center Networking with Steered-Beam mmWave Links; IEEE Wireless Communication Network Conference; 2011, 2179-2184 (2011).

Li, X. et al.; Investigation of interference in multiple-input multiple-output wireless transmission at W band for an optical wireless integration system. Optics Letters 38, 742-744 (2013).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Padgett, Miles J. et al., Divergence of an orbital-angular-momentum-carrying beam upon propagation. New Journal of Physics 17, 023011 (2015).

Rapport, T.S.; Millimeter Wave Mobile Communications for 5G Cellular: It Will Work!; IEEE Access, 1, 335-349 (2013).

Ren, Y. et al.; Experimental Demonstration of 16 Gbit/s millimeter-wave Communications using MIMO Processing of 2 DAM Modes on Each of Two Transmitter/Receiver Antenna Apertures. In Proc. IEEE GLobal TElecom. Conf. 3821-3826 (2014).

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 24//374, San Jose, CA, Jun. 2016 (OSA, Wash., D.C., 2016).

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D C., 2015).

Solyman Ashrafi, A Dual-Channel 60 GHz Communications Link Using Patch Antenna Arrays to Generate Data-Carrying Orbital-Angular-Momentum Beams, IEEE International Communication

(56) References Cited

OTHER PUBLICATIONS

Conference (ICC) 2016, paper 1570224643, Kuala Lumpur, Malaysia, May 2016 (IEEE, Piscataway, NJ, 2016).

Solyman Ashrafi, Acoustically induced stresses in elastic cylinders and their visualization, The Journal of the Acoustical Society of America 82(4): 1378-1385, Sep. 1987.

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Channeling Radiation of Electrons in Crystal Lattices, Essays on Classical and Quantum Dynamics, Gordon and Breach Science Publishers, 1991.

Solyman Ashrafi, CMA Equalization for a 2 GB/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Solyman Ashrafi, Demonstration of Distance Emulation for an Orbital-Angular-Momentum Beam. OSA Technical Digest (online), paper Sth1F.6. The Optical Society, 2015.

Solyman Ashrafi, Demonstration of OAM-based MIMO FSO link using spatial diversity and MIMO equalization for turbulence mitigation,IEEE/OSA Conference on Optical Fiber Communications (OFC), paper Th1H.2, Anaheim, CA, Mar. 2016 (Optical Society of America, Washington, D.C., 2016).

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Detecting and Disentangling Nonlinear Structure from Solar Flux Time Series, 43rd Congress of the International Astronautical Federation, Aug. 1992.

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstralion of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).

Solyman Ashrafi, Experimental demonstration of enhanced spectral efficiency of 1.18 symbols/s/Hz using Multiple-layer-overlay modulation for QPSK over a 14-km fiber link. OSA Technical Digest (online), paper JTh2A.63. The Optical Society, 2014.

Solyman Ashrafi, Experimental Demonstralion of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Experimental Demonstralion of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Future Mission Studies: Forecasting Solar Flux Directly From Its Chaotic Time Series, Computei Sciences Corp., Dec. 1991.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Optical Communications Using Orbital Angular Momentum Beams, Adv. Opt. Photon. 7, 66-106, Advances in Optics and Photonic, 2015.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Performance Metrics and Design Considerations for a Free-Space Optical Orbital-Angular-Momentum Multiplexed Communication Link, The Optical Society, vol. 2, No. 4, Apr. 2015.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, Splitting and contrary motion of coherent bremsstrahlung peaks in strained-layer superlattices, Journal of Applied Physics 70:4190-4193, Dec. 1990.

Solyman Ashrafi, Splitting of channeling-radiation peaks in strained-layer superlattices, Journal of the Optical Society of America B 8(12), Nov. 1991.

(56) References Cited

OTHER PUBLICATIONS

Solyman Ashrafi, Spurious Resonances and Modelling of Composite Resonators, 37th Annual Symposium on Frequency Control, 1983.

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

Famburini, Fabrizio; Encoding many channels on the same frequency through radio vorticity: first experimental test; New Journal of Physics 14, 033001 (2012).

Time-resolved orbital angular momentum spectroscopy, published by the American Institute of Physics, Appl. Phys. Lett. 107, 032406 (2015) by Loyan et al.

Vasnetsov, M. V., Pasko, V.A. & Soskin, M.S.; Analysis of orbital angular momentum of a misaligned optical beam; New Journal of Physics 7, 46 (2005).

Wang, Jian, et al.; Terabit free-space data transmission employing orbital angular momentum multiplexing. Nature Photonics; 6, 488-496 (2012).

Yan, Y. et al.; High-capacity millimetre-wave communications with orbital angular momentum multiplexing; Nature communications; 5, 4876 (2014).

Yongxiong Ren et al.; Experimental Investigation of Data Transmission Over a Graded-index Multimode Fiber Using the Basis of Orbital Angular Momentum Modes.

\* cited by examiner $$\Delta h = \frac{\ell \lambda}{n-1}$$

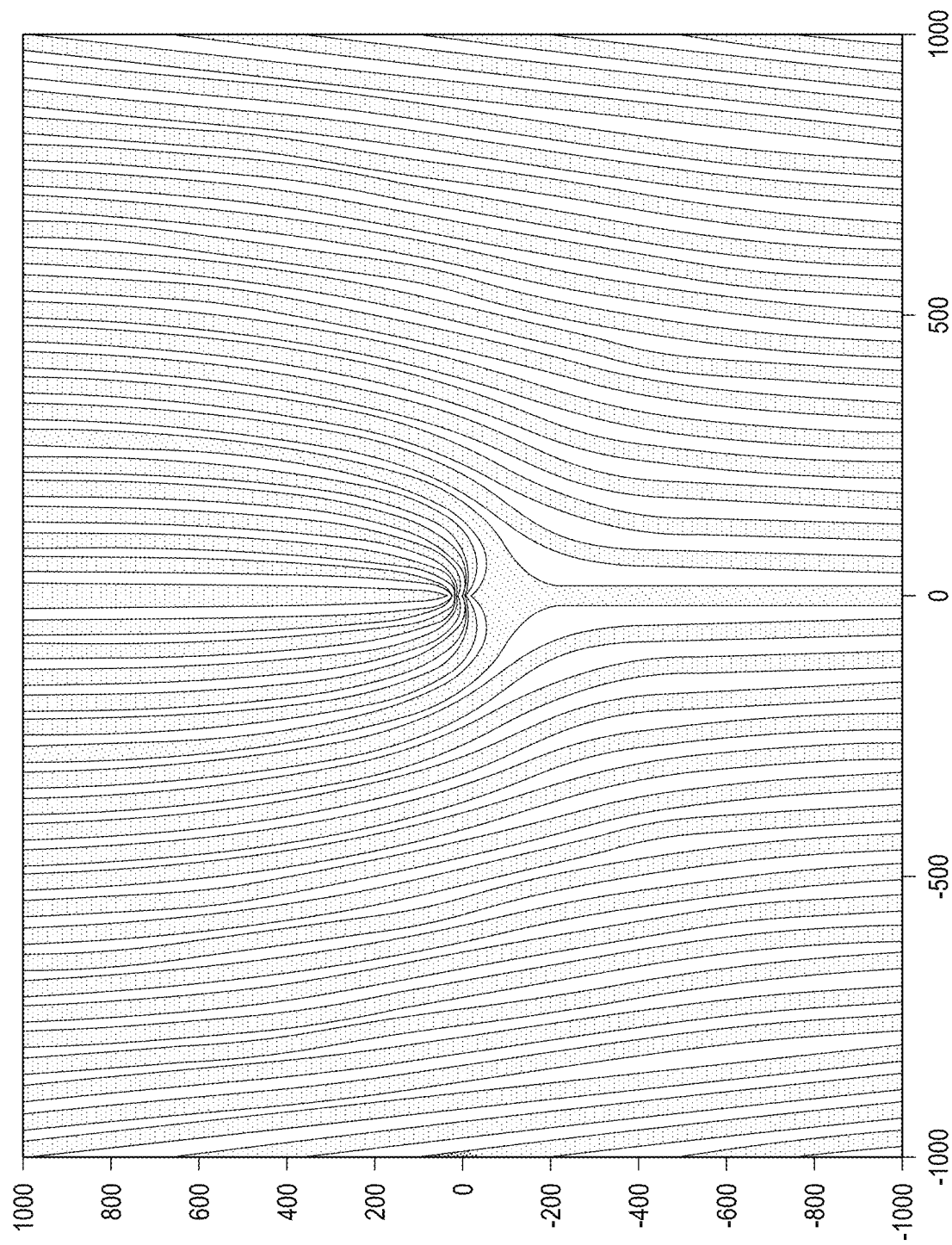

$$\begin{bmatrix} y_1 \\ y_2 \\ y_3 \end{bmatrix} = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} \\ h_{2,1} & h_{2,2} & h_{2,3} & h_{2,4} & h_{2,5} & h_{2,6} & h_{2,7} & h_{2,8} & h_{2,9} & h_{2,10} & h_{2,11} & h_{2,12} & h_{2,13} & h_{2,14} & h_{2,15} \\ h_{3,1} & h_{3,2} & h_{3,3} & h_{3,4} & h_{3,5} & h_{3,6} & h_{3,7} & h_{3,8} & h_{3,9} & h_{3,10} & h_{3,11} & h_{3,12} & h_{3,13} & h_{3,14} & h_{3,15} \end{bmatrix} \begin{bmatrix} x_{-2,1} \\ x_{-1,1} \\ x_{0,1} \\ x_{1,1} \\ x_{2,1} \\ x_{-2,2} \\ x_{-1,2} \\ x_{0,2} \\ x_{1,2} \\ x_{2,2} \\ x_{-2,3} \\ x_{-1,3} \\ x_{0,3} \\ x_{1,3} \\ x_{2,3} \end{bmatrix}$$

FIG. 34

|     | SH0 | SH1 | SH2 | SH3 | SH4 | SH5 |
|-----|-----|-----|-----|-----|-----|-----|
| SH0 | 1   | 0   | 0   | 0   | 0   | 0   |
| SH1 | 0   | 1   | 0   | 0   | 0   | 0   |
| SH2 | 0   | 0   | 1   | 0   | 0   | 0   |
| SH3 | 0   | 0   | 0   | 1   | 0   | 0   |
| SH4 | 0   | 0   | 0   | 0   | 1   | 0   |
| SH5 | 0   | 0   | 0   | 0   | 0   | 1   |

4702

MODE CROSSTALK MATRIX
HERMITE-GAUSSIAN

|  | $HG_{00}$ | $HG_{01}$ | $HG_{10}$ | $HG_{02}$ | $HG_{20}$ | $HG_{11}$ |
|---|---|---|---|---|---|---|
| $HG_{00}$ | 0 | -21.9 | -22.7 | -30.7 | -25.9 | -25.7 |
| $HG_{01}$ | -18.0 | 0 | -20.8 | -17.8 | -29.0 | -20.8 |
| $HG_{10}$ | -20.0 | -19.6 | 0 | -33.5 | -19.6 | -22.9 |
| $HG_{02}$ | -14.5 | -17.2 | -28.1 | 0 | -16.1 | -17.7 |
| $HG_{20}$ | -17.7 | -28.9 | -18.0 | -17.4 | 0 | -19.9 |
| $HG_{11}$ | -23.7 | -21.2 | -18.8 | -17.1 | -20.9 | 0 |

SELECTIVITY EXCITED (INPUT) / SELECTIVITY MEASURED (OUTPUT)

MODE CROSSTALK MATRIX
LAGUERRE-GAUSSIAN

|  | $LG_{00}$ | $LG_{+10}$ | $LG_{-10}$ | $LG_{01}$ | $LG_{+10}$ | $LG_{-10}$ |
|---|---|---|---|---|---|---|
| $LG_{00}$ | 0 | -19.3 | -20.4 | -21.3 | -24.6 | -18.3 |
| $LG_{+10}$ | 14.4 | 0 | -00.1 | -23.4 | -18.2 | -19.8 |
| $LG_{-10}$ | -16.3 | -00.1 | 0 | -16.2 | -17.8 | -18.6 |
| $LG_{01}$ | 0 | -06.3 | -05.1 | 0 | +04.6 | +04.2 |
| $LG_{+20}$ | -09.6 | -11.3 | -10.6 | -06.3 | 0 | -00.1 |
| $LG_{-20}$ | -09.0 | -12.2 | -11.1 | -06.8 | 0 | 0 |

SELECTIVITY EXCITED (INPUT) / SELECTIVITY MEASURED (OUTPUT)

$$A_{325} = \begin{array}{|c|c|c|c|c|c|c|c|c|c|c|}
\hline
LG_{10} & a_{101} & a_{102} & a_{103} & a_{104} & a_{105} & a_{106} & a_{107} & a_{108} & a_{109} & \mathbf{a_{1010}} \\
\hline
LG_9 & a_{91} & a_{92} & a_{93} & a_{94} & a_{95} & a_{96} & a_{97} & a_{98} & \mathbf{a_{99}} & a_{910} \\
\hline
LG_8 & a_{81} & a_{82} & a_{83} & a_{84} & a_{85} & a_{86} & a_{87} & \mathbf{a_{88}} & a_{89} & a_{810} \\
\hline
LG_7 & a_{71} & a_{72} & a_{73} & a_{74} & a_{75} & a_{76} & \mathbf{a_{77}} & a_{78} & a_{79} & a_{710} \\
\hline
LG_6 & a_{61} & a_{62} & a_{63} & a_{64} & a_{65} & \mathbf{a_{66}} & a_{67} & a_{68} & a_{69} & a_{610} \\
\hline
LG_5 & a_{51} & a_{52} & a_{53} & a_{54} & \mathbf{a_{55}} & a_{56} & a_{57} & a_{58} & a_{59} & a_{510} \\
\hline
LG_4 & a_{41} & a_{42} & a_{43} & \mathbf{a_{44}} & a_{45} & a_{46} & a_{47} & a_{48} & a_{49} & a_{410} \\
\hline
LG_3 & a_{31} & a_{32} & \mathbf{a_{33}} & a_{34} & a_{35} & a_{36} & a_{37} & a_{38} & a_{39} & a_{310} \\
\hline
LG_2 & a_{21} & \mathbf{a_{22}} & a_{23} & a_{24} & a_{25} & a_{26} & a_{27} & a_{28} & a_{29} & a_{210} \\
\hline
LG_1 & \mathbf{a_{11}} & a_{12} & a_{13} & a_{14} & a_{15} & a_{16} & a_{17} & a_{18} & a_{19} & a_{110} \\
\hline
 & LG_1 & LG_2 & LG_3 & LG_4 & LG_5 & LG_6 & LG_7 & LG_8 & LG_9 & LG_{10} \\
\hline
\end{array}$$

FIG. 54

$$B_{355} = \begin{array}{|c|c|c|c|c|c|c|c|c|c|c|}
\hline
LG_{10} & a_{101} & a_{102} & a_{103} & a_{104} & a_{105} & a_{106} & a_{107} & a_{108} & a_{109} & \mathbf{a_{1010}} \\
\hline
LG_9 & a_{91} & a_{92} & a_{93} & a_{94} & a_{95} & a_{96} & a_{97} & a_{98} & \mathbf{a_{99}} & a_{910} \\
\hline
LG_8 & a_{81} & a_{82} & a_{83} & a_{84} & a_{85} & a_{86} & a_{87} & \mathbf{a_{88}} & a_{89} & a_{810} \\
\hline
LG_7 & a_{71} & a_{72} & a_{73} & a_{74} & a_{75} & a_{76} & \mathbf{a_{77}} & a_{78} & a_{79} & a_{710} \\
\hline
LG_6 & a_{61} & a_{62} & a_{63} & a_{64} & a_{65} & \mathbf{a_{66}} & a_{67} & a_{68} & a_{69} & a_{610} \\
\hline
LG_5 & a_{51} & a_{52} & a_{53} & a_{54} & \mathbf{a_{55}} & a_{56} & a_{57} & a_{58} & a_{59} & a_{510} \\
\hline
LG_4 & a_{41} & a_{42} & a_{43} & \mathbf{a_{44}} & a_{45} & a_{46} & a_{47} & a_{48} & a_{49} & a_{410} \\
\hline
LG_3 & a_{31} & a_{32} & \mathbf{a_{33}} & a_{34} & a_{35} & a_{36} & a_{37} & a_{38} & a_{39} & a_{310} \\
\hline
LG_2 & a_{21} & \mathbf{a_{22}} & a_{23} & a_{24} & a_{25} & a_{26} & a_{27} & a_{28} & a_{29} & a_{210} \\
\hline
LG_1 & \mathbf{a_{11}} & a_{12} & a_{13} & a_{14} & a_{15} & a_{16} & a_{17} & a_{18} & a_{19} & a_{110} \\
\hline
 & LG_1 & LG_2 & LG_3 & LG_4 & LG_5 & LG_6 & LG_7 & LG_8 & LG_9 & LG_{10} \\
\hline
\end{array}$$

|   |   |   |   |   |   |   |   |   |   |   |
|---|---|---|---|---|---|---|---|---|---|---|
|   | $\sigma_{11}$ | 0 | 0 | 0 | 0 | 0 | 0 | 0 | 0 | 0 |
|   | 0 | $\sigma_{22}$ | 0 | 0 | 0 | 0 | 0 | 0 | 0 | 0 |
|   | 0 | 0 | $\sigma_{33}$ | 0 | 0 | 0 | 0 | 0 | 0 | 0 |
|   | 0 | 0 | 0 | $\sigma_{44}$ | 0 | 0 | 0 | 0 | 0 | 0 |
|   | 0 | 0 | 0 | 0 | $\sigma_{55}$ | 0 | 0 | 0 | 0 | 0 |
|   | 0 | 0 | 0 | 0 | 0 | $\sigma_{66}$ | 0 | 0 | 0 | 0 |
|   | 0 | 0 | 0 | 0 | 0 | 0 | $\sigma_{77}$ | 0 | 0 | 0 |
|   | 0 | 0 | 0 | 0 | 0 | 0 | 0 | $\sigma_{88}$ | 0 | 0 |
|   | 0 | 0 | 0 | 0 | 0 | 0 | 0 | 0 | $\sigma_{99}$ | 0 |
|   | 0 | 0 | 0 | 0 | 0 | 0 | 0 | 0 | 0 | $\sigma_{1010}$ |
| $\Sigma$ |   |   |   |   |   |   |   |   |   |   |

FIG. 56

RADAR SYSTEM AND METHOD FOR DETECTING AND IDENTIFYING TARGETS USING ORBITAL ANGULAR MOMENTUM CORRELATION MATRIX

CROSS-REFERENCE TO RELATED APPLICATIONS

This claims benefit of U.S. Provisional Application No. 62/867,715, filed Jun. 27, 2019, entitled A NEW RADAR THAT GENERATES ELECTROMAGNETIC WAVES WITH COMPLEX PHASE FRONTS, the specification of which is incorporated herein by reference in its entirety.

TECHNICAL FIELD

The present invention relates to object detection through a radar system, and more particularly, to detection of objects through a radar system using a correlation matrix.

BACKGROUND

The detection of aircraft, vehicles, ships and other types of objects is useful for a variety of navigational, targeting and other applications. Current technologies utilize various RF technologies for transmitting a signal toward a target, receiving a reflection therefrom and analyzing the reflection to detect the target. Various types of anti-radar technologies have made it difficult to detect and identify a target and target type. Thus, there is a need for an improved system and technique for identifying a target and target type that can uniquely identify a target based on its reflection characteristics.

SUMMARY

The present invention, as disclosed and described herein, comprises a system for identifying a target object includes a database containing a plurality of unique combinations of a plurality of orbital angular momentum modes. Each of the unique combinations of the plurality of orbital angular momentum modes is associated with a particular type of target object. A signal generator generates a signal having one of a plurality of orbital angular momentum modes applied thereto and directs the signal toward the target object. A transceiver transmits the signal toward the target object and receives a second signal having a unique combination of a plurality of orbital angular momentum modes reflected from the target object. A detection system compares the second signal having the unique combination of the plurality of orbital angular momentum modes with the plurality of unique combinations of the plurality of unique orbital angular unique combination of a plurality of orbital angular momentum modes within the database, identifies the target object responsive to the comparison of the second signal having the unique combination of the plurality of orbital angular momentum modes with the plurality of unique combinations of the plurality of unique orbital angular unique combination of a plurality of orbital angular momentum modes within the database and provides an output identifying the target object.

BRIEF DESCRIPTION OF THE DRAWINGS

For a more complete understanding, reference is now made to the following description taken in conjunction with the accompanying Drawings in which:

FIGS. 18A-18D illustrate various holograms for use in applying an orbital angular momentum to a plane wave signal;

FIG. 34 illustrates a fixed channel matrix;

FIG. 54 illustrates a first correlation matrix generated at a first wavelength;

FIG. 55 illustrates a second correlation matrix generated at a second wavelength; and FIG. 56 illustrates a unique signature matrix associated with a particular target object.

DETAILED DESCRIPTION

Figure 1:
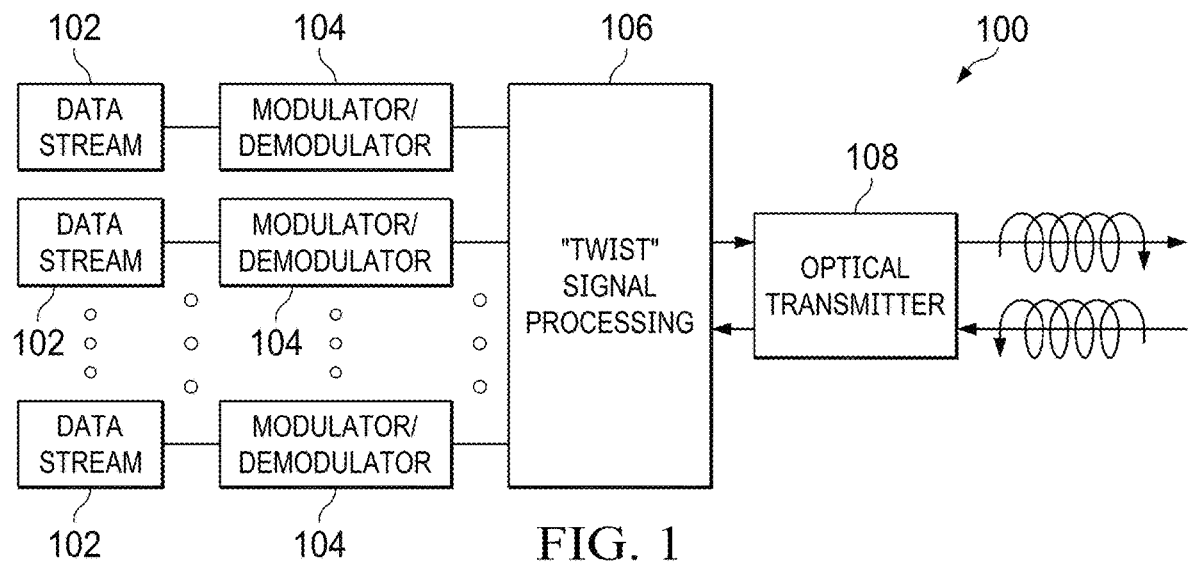
FIG. 1 is a functional block diagram of a system for generating orbital angular momentum within a radar system.

Referring now to the drawings, wherein like reference numbers are used herein to designate like elements throughout, the various views and embodiments of a radar system and method for detecting and identifying items using an orbital angular momentum correlation matrix are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 41A:
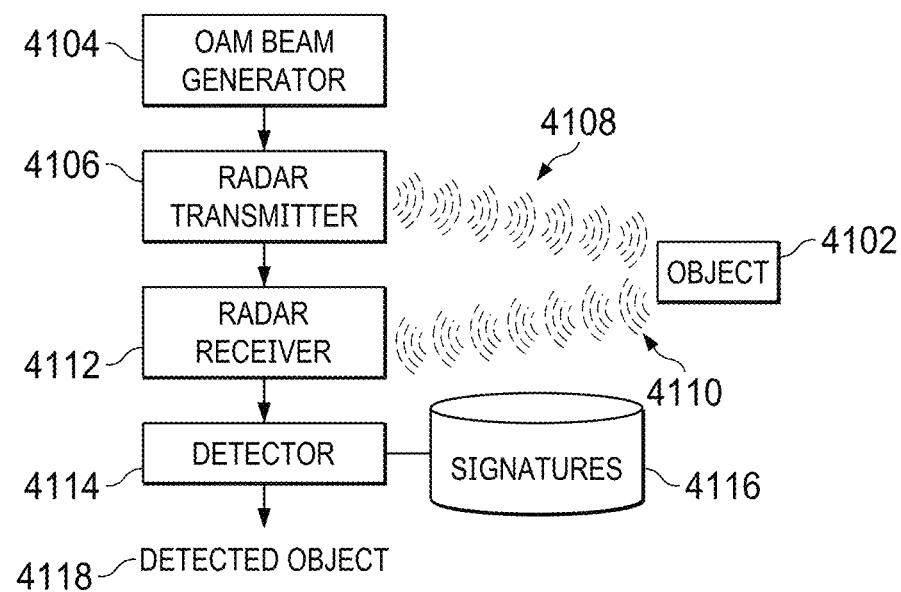
FIG. 41A illustrates a system for generating a unique indicator for a target object using correlation matrices.
Figure 41B:
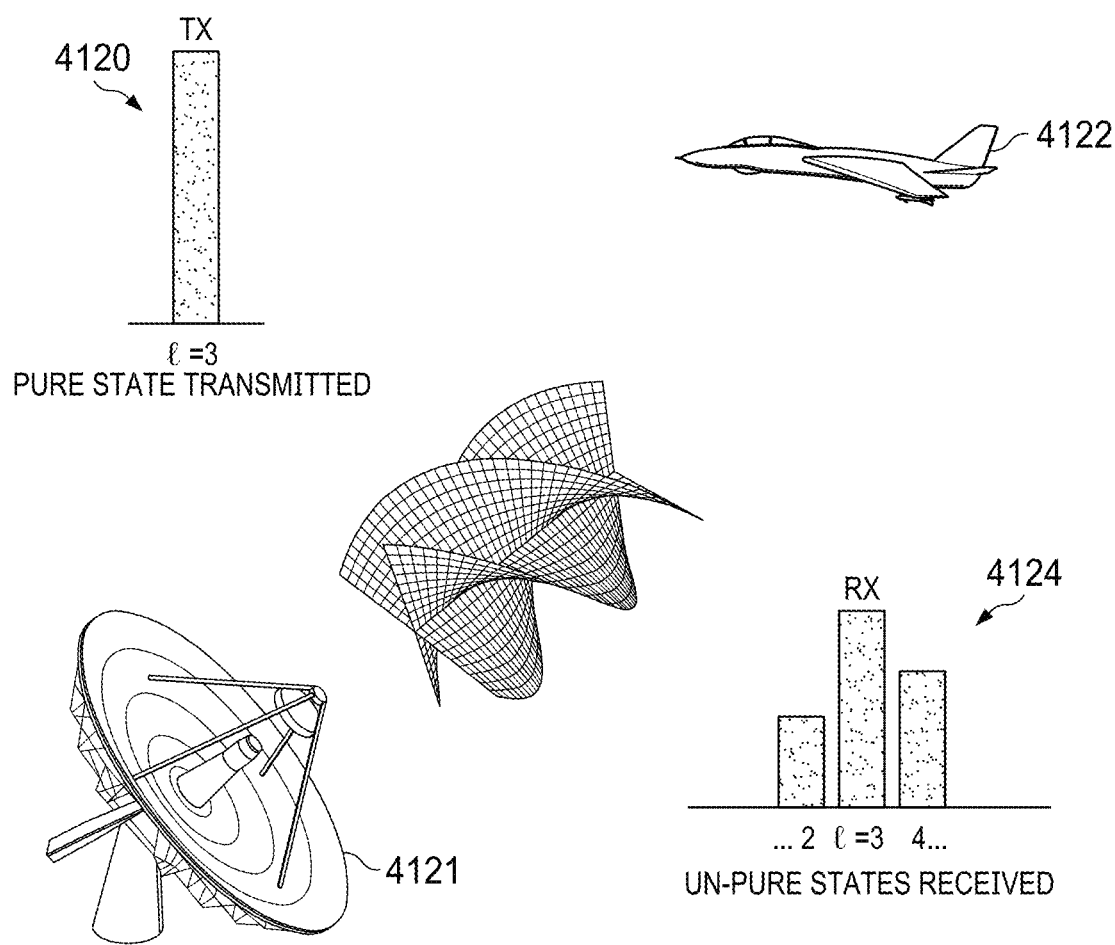
FIG. 41B illustrates a system for detecting a target based on OAM states of a reflection.

Referring now more particularly to FIG. 1, there is illustrated a functional block diagram of a system for generating the orbital angular momentum "twist" within a radar system, such as that illustrated with respect to FIG. 41A, to provide a unique data stream that may be combined with multiple other data streams for transmission upon a same wavelength or frequency. One or more 102 are provided to the transmission processing circuitry 100. Each of the one or more data streams 102 comprises a unique combination of data. The multiple data streams 102 are processed by modulator/demodulator circuitry 104. The modulator/demodulator circuitry 104 modulates the received data stream 102 onto a wavelength or frequency channel.

The modulated data stream is provided to the orbital angular momentum (OAM) signal processing block 106. The orbital angular momentum signal processing block 106 applies in one embodiment an orbital angular momentum to a signal. In other embodiments the processing block 106 can apply any orthogonal function to a signal being transmitted. These orthogonal functions can be spatial Bessel functions, Laguerre-Gaussian functions, Hermite-Gaussian functions or any other orthogonal function. Each of the modulated data streams from the modulator/demodulator 104 are provided a different orbital angular momentum by the orbital angular momentum electromagnetic block 106 such that each of the modulated data streams have a unique and different orbital angular momentum associated therewith. Each of the modulated signals having an associated orbital angular momentum are provided to a transmitter 108 that transmits each of the modulated data streams having a unique orbital angular momentum on a same wavelength using RF, optical or any other transmission scheme. Each wavelength has a selected number of bandwidth slots B and may have its data transmission capability increase by a factor of the number of degrees of orbital angular momentum $\ell$ that are provided from the OAM electromagnetic block 106. The transmitter 108 transmitting signals at a single wavelength could transmit B groups of information. The transmitter 108 and OAM electromagnetic block 106 may transmit $\ell \times B$ groups of information according to the configuration described herein.

In a receiving mode, the transmitter 108 will receive a wavelength including multiple signals transmitted therein having different orbital angular momentum signals embedded therein. The transmitter 108 forwards these signals to the OAM signal processing block 106, which separates each of the signals having different orbital angular momentum and provides the separated signals to the demodulator circuitry 104. The demodulation process extracts the one or more data streams 102 from the modulated signals and provides it at the receiving end.

Figure 2:
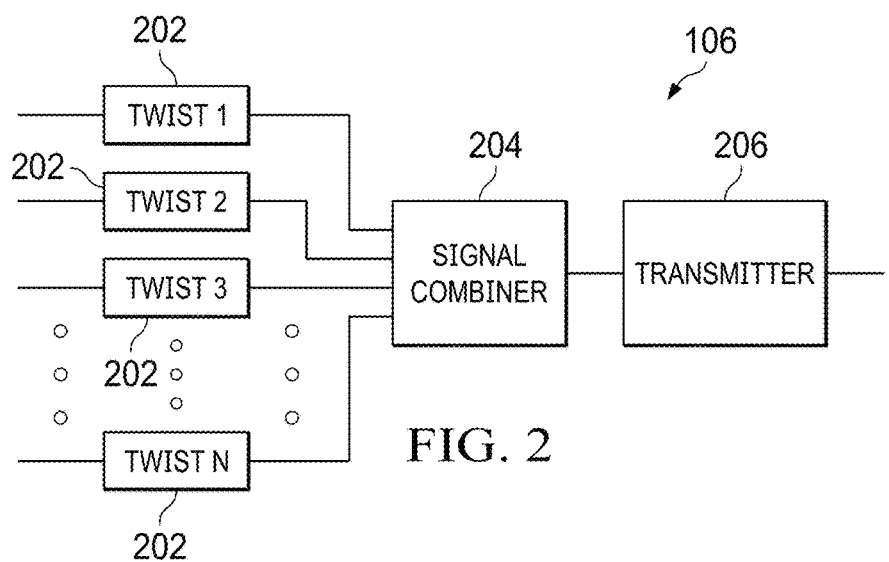
FIG. 2 is a functional block diagram of the orbital angular momentum signal processing block of FIG. 1.

Referring now to FIG. 2, there is provided a more detailed functional description of the OAM signal processing block 106. Each of the input data streams are provided to OAM circuitry 202. Each of the OAM circuitry 202 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 202 are unique to the data stream that is provided thereto. An infinite number of orbital angular momentums may be applied to different input data streams using many different currents. Each of the separately generated data streams are provided to a signal combiner 204, which combines/multiplexes the signals onto a wavelength for transmission from the transmitter 206. The combiner 204 performs a spatial mode division multiplexing to place all of the signals upon a same carrier signal in the space domain. Alternatively, only a single OAM may be applied to a single input signal for other applications as will be discussed more fully herein below.

Figure 3:
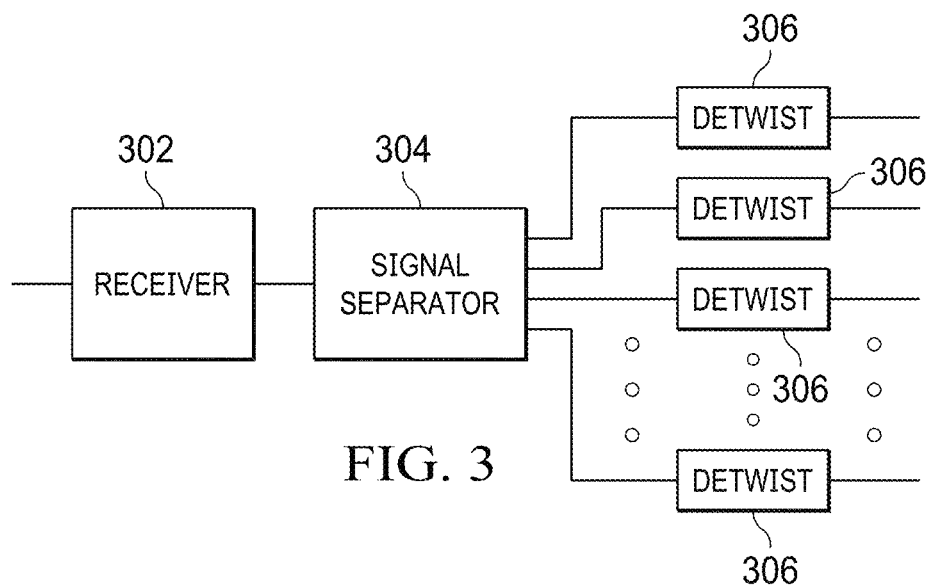
FIG. 3 is a functional block diagram illustrating the manner for removing orbital angular momentum from a received signal.
Figure 10:
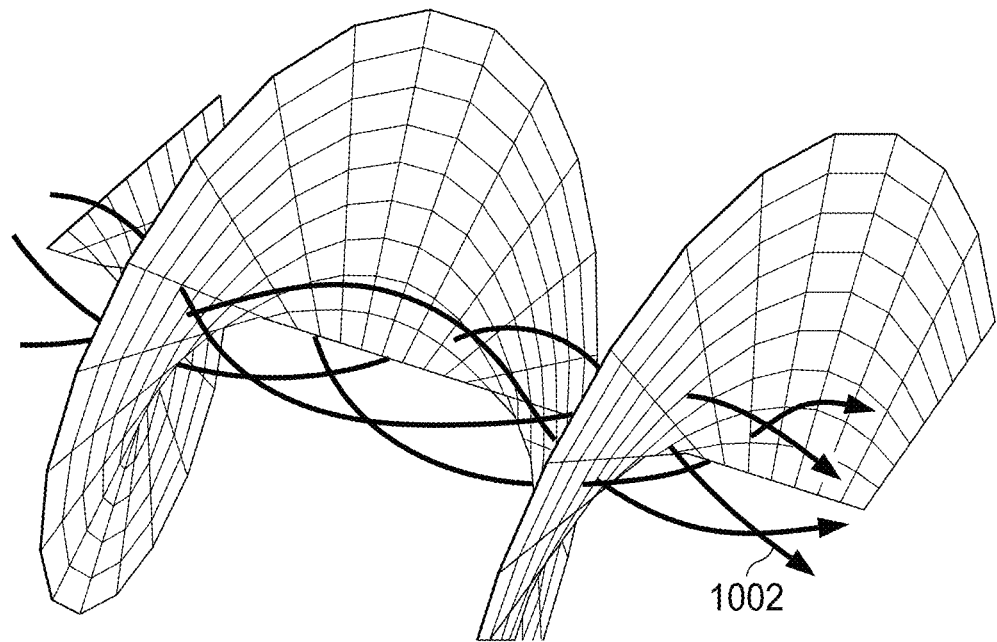
FIG. 10 illustrates a wavefront having a Poynting vector spiraling around a direction of propagation of the wavefront.

Referring now to FIG. 3, there is illustrated the manner in which the OAM processing circuitry 606 may separate a received signal into multiple data streams. The receiver 302 receives the combined OAM signals on a single wavelength and provides this information to a signal separator 304. The signal separator 304 separates each of the signals having different orbital angular momentums from the received wavelength and provides the separated signals to OAM de-twisting circuitry 306. The OAM de-twisting circuitry 306 removes the associated OAM twist from each of the associated signals and provides the received modulated data stream for further processing. The signal separator 304 separates each of the received signals that have had the orbital angular momentum removed therefrom into individual received signals. The individually received signals are provided to the receiver 302 for demodulation.

Figure 4:
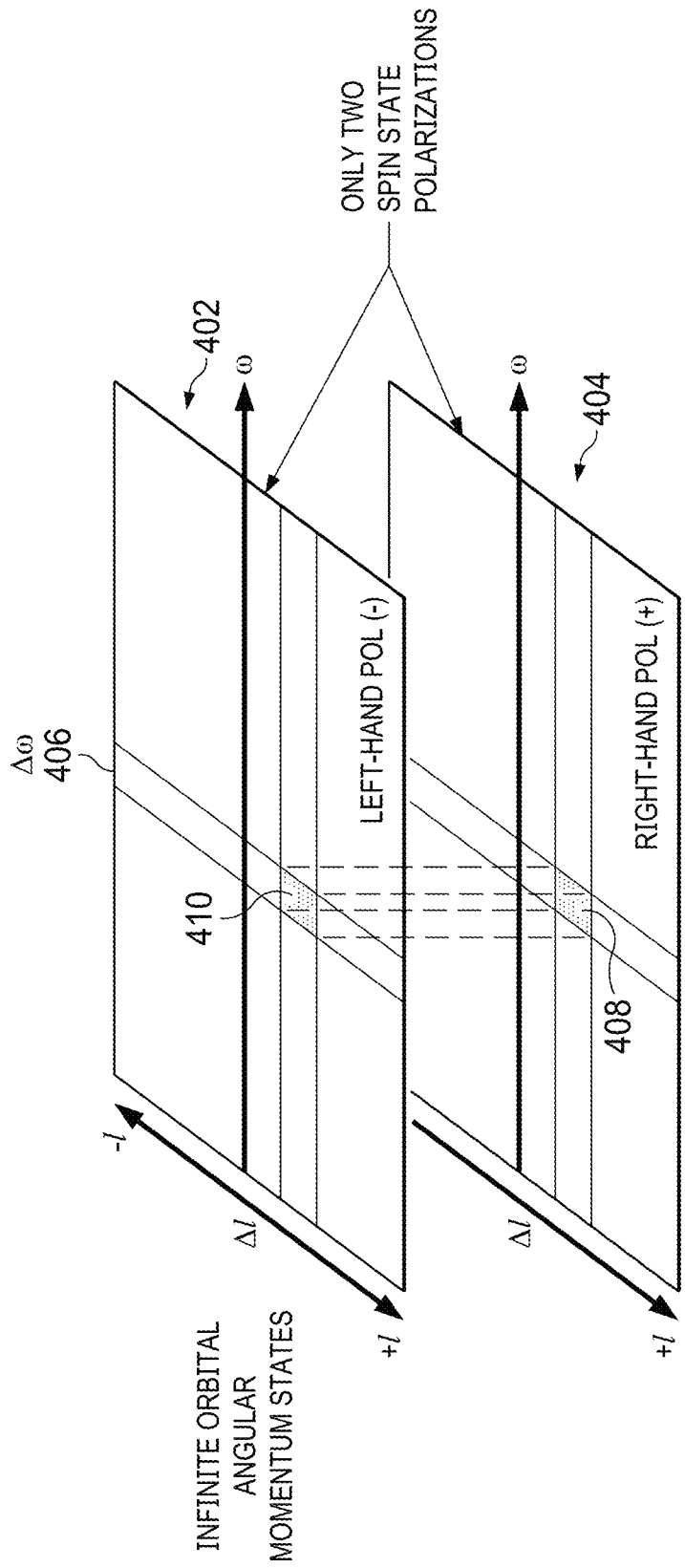
FIG. 4 illustrates a single wavelength having two quanti-spin polarizations providing an infinite number of signals having various orbital angular momentums associated therewith.

FIG. 4 illustrates in a manner in which a single wavelength or frequency, having two quanti-spin polarizations may provide an infinite number of twists having various orbital angular momentums associated therewith. The 1 axis represents the various quantized orbital angular momentum states which may be applied to a particular signal at a selected frequency or wavelength. The symbol omega (w) represents the various frequencies to which the signals of differing orbital angular momentum may be applied. The top grid 402 represents the potentially available signals for a left handed signal polarization, while the bottom grid 404 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 406 in both the left handed polarization plane 402 and the right handed polarization plane 404 can provide an infinite number of signals at different orbital angular momentum states ΔI. Blocks 408 and 410 represent a particular signal having an orbital angular momentum ΔI at a frequency Δω or wavelength in both the right handed polarization plane 404 and left handed polarization plane 410, respectively. By changing to a different orbital angular momentum within the same frequency Δω or wavelength 406, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 4, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 5A:
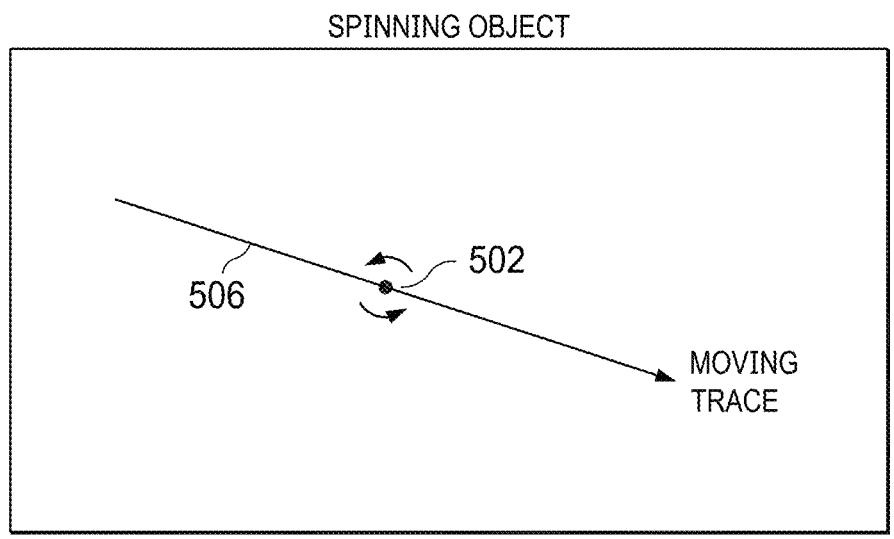
FIG. 5A illustrates an object with only a spin angular momentum.
Figure 5B:
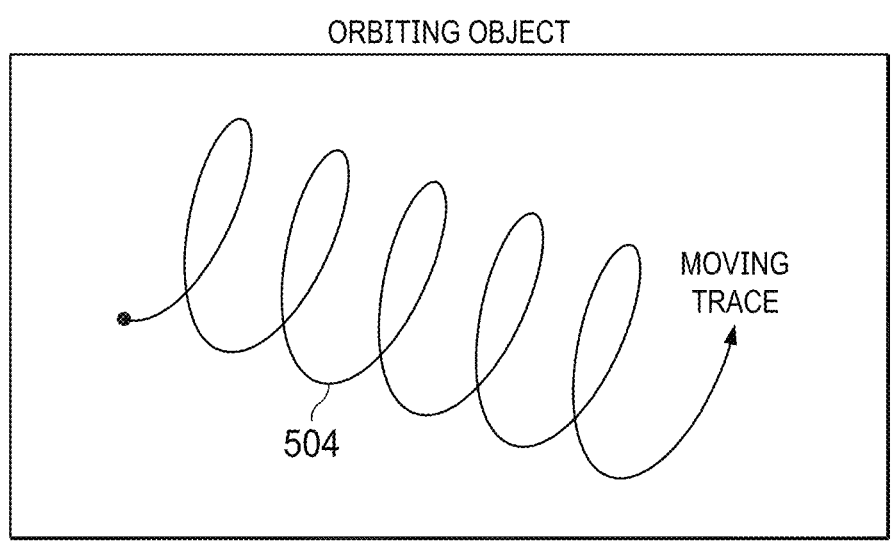
FIG. 5B illustrates an object with an orbital angular momentum.
Figure 5C:
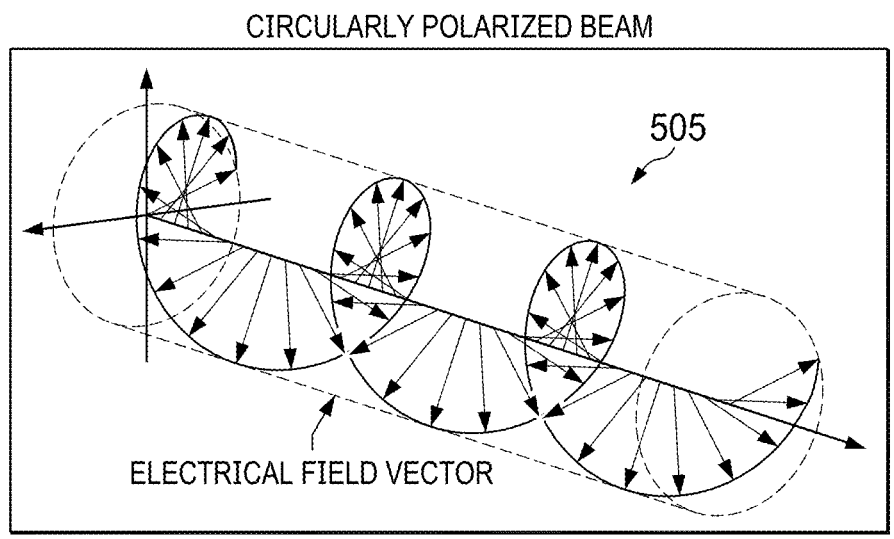
FIG. 5C illustrates a circularly polarized beam carrying spin angular momentum.
Figure 5D:
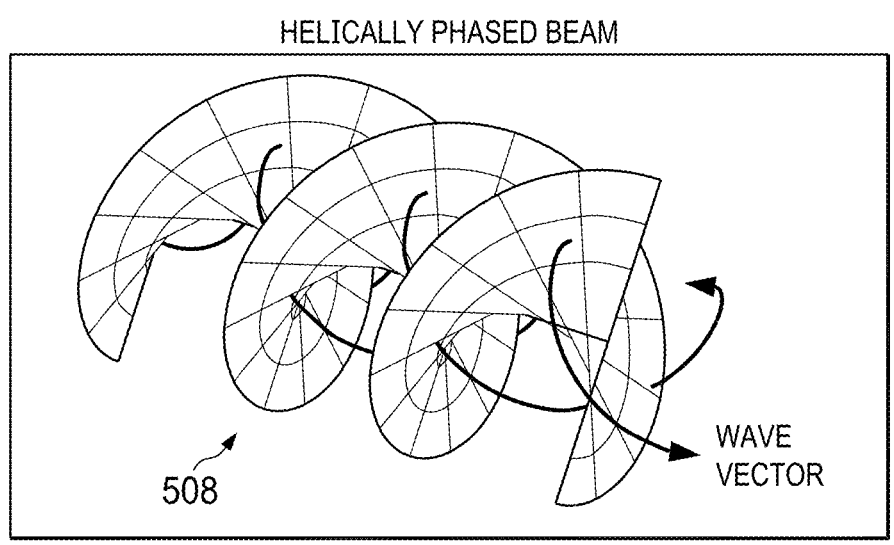
FIG. 5D illustrates the phase structure of a beam carrying an orbital angular momentum.

Referring now to FIG. 5A-5D, it is well-known that the concept of linear momentum is usually associated with objects moving in a straight line. The object could also carry angular momentum if it has a rotational motion, such as spinning (i.e., spin angular momentum (SAM) 502), or orbiting around an axis 506 (i.e., OAM 504), as shown in FIGS. 5A and 5B, respectively. A light beam may also have rotational motion as it propagates. In paraxial approximation, a light beam carries SAM 502 if the electrical field rotates along the beam axis 506 (i.e., circularly polarized light 505), and carries OAM 504 if the wave vector spirals around the beam axis 506, leading to a helical phase front 508, as shown in FIGS. 5C and 5D. In its analytical expression, this helical phase front 508 is usually related to a phase term of exp(i$\ell$θ) in the transverse plane, where θ refers to the angular coordinate, and $\ell$ is an integer indicating the number of intertwined helices (i.e., the number of a phase shifts along the circle around the beam axis). $\ell$ could be a positive, negative integer or zero, corresponding to clockwise, counterclockwise phase helices or a Gaussian beam with no helix, respectively.

Two important concepts relating to OAM include: 1) OAM and polarization: As mentioned above, an OAM beam is manifested as a beam with a helical phase front and therefore a twisting wavevector, while polarization states can only be connected to SAM 1002. A light beam carries SAM 502 of ±h/2π (h is Plank's constant) per photon if it is left or right circularly polarized, and carries no SAM 502 if it is linearly polarized. Although the SAM 502 and OAM 504 of light can be coupled to each other under certain scenarios, they can be clearly distinguished for a paraxial light beam. Therefore, with the paraxial assumption, OAM 504 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). An LG beam is a special subset among all OAM-carrying beams, due to the fact that the analytical expression of LG beams are eigen-solutions of paraxial form of the wave equation in cylindrical coordinates. For an LG beam, both azimuthal and radial wavefront distributions are well defined, and are indicated by two index numbers, $\ell$ and p, of which $\ell$ has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same $\ell$ index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotonic states (the $A\mu$ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the $A\mu$ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2) \text{ Hamiltonian (total energy)}$$

$$\frac{dU^{mech}}{dt} + \frac{dU^{em}}{dt} + \oint_{s'} d^2 x' \hat{n}' \cdot S = 0 \text{ conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \text{ linear momentum}$$

$$\frac{dp^{mech}}{dt} + \frac{dp^{em}}{dt} + \oint_{s'} d^2 x' \hat{n} \cdot T = 0 \text{ conservation of linear momentum}$$

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E^2| + c^2|B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n} \cdot M = 0 \text{ conservation of angular momentum}$$

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i [(x' - x_0) \times \nabla] A_i,$$

For each singular Fourier mode in real valued representation:

$$J^{em} = -i\frac{\varepsilon_0}{2\omega} \int_{V'} d^3 x' (E^* \times E) - i\frac{\varepsilon_0}{2\omega} \int_{V'} d^3 x' E_i [(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0, \text{ continuity equation}$$

where S is the Poynting vector $$S = \frac{1}{4}(E \times H^* + E^* \times H),$$

and U is the energy density $$U = \frac{1}{4}(\varepsilon |E|^2 + \mu_0 |H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon |E|^2 + \mu_0 |H|^2} \right)$$

Figure 6:
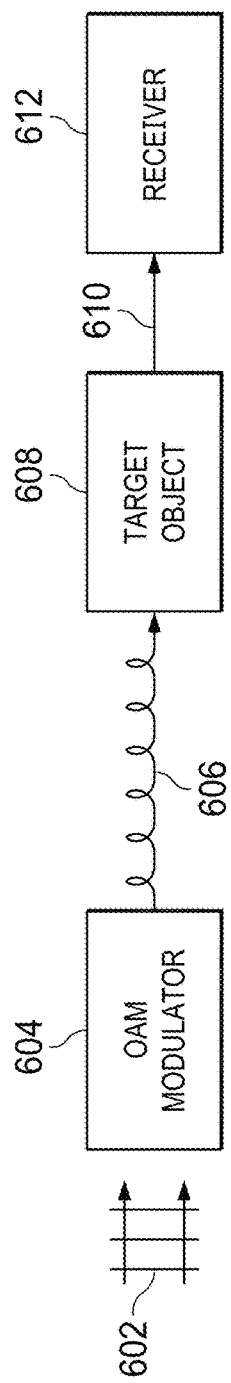
FIG. 6 illustrates the manner for using an Orbital Angular Momentum signature to identify a target object.

Referring now more particularly to FIG. 6, there is illustrated the manner for detecting the presence of a particular material within a sample based upon the unique orbital angular momentum signature imparted to a signal passing through the sample. A signal 602 having a series of plane waves therein is applied to a device for applying an orbital angular momentum (OAM) signal to the signal 602 such as an OAM modulator 604. While the present embodiment envisions the use of a signal 602, other types of RF, optical and other types of signals having orbital angular momentum or other orthogonal signals therein may be utilized in alternative embodiments. The OAM modulator 604 generates an output signal 606 having a known OAM twist applied to the signal. The OAM twist has known characteristics that act as a baseline prior to the application of the output signal 606 to a target object 608. The target object 608 may comprise a tank, plane, ship or any other object type. When reflecting from the target object 608, the output signal 606 has a unique OAM signature applied thereto that is reflected from the target object as an OAM distinct signature signal 610. The OAM distinct signature 610 comprises a composition of multiple orbital angular momentum modes (signatures) that is reflected from the target. OAM beams have been observed to exhibit unique characteristics upon reflecting from particular types of target objects. Given these unique topological features one can detect the type of object an OAM signal reflects from with specific signatures in both the amplitude and phase measurements. This distinct signature signal 610 may then be examined using for example a receiver 612 in order to detect the unique signal characteristics applied thereto and determine the target object based upon this unique signature. The determination of the particular target object indicated by the unique signature may be determined in one embodiment by comparison of the signature to a unique database of signatures that include known signatures that are associated with particular target objects. The manner of creating such a database would be known to one skilled in the art.

In addition to detecting the OAM signature of reflected waves, targets may be identified by the OAM signature of creeping waves that run around a target and produce secondary, small reflected amplitudes from the target. A creeping wave is a wave that is diffracted around the shadowed surface of a smooth body such as a sphere. Creeping waves play an important role in the analysis of electromagnetic scattering by large objects with curved boundaries. There are asymptotic models for the back-scattered field on a dielectric-coated cylinder at aspect angles near broadside incidence, a region where the creeping wave has maximum intensity. There are monostatic radar cross sections that are analytically derived from creeping wave poles and their residues, and they are all validated with data extracted from rigorous method of moments computation of the scattered field by utilizing state space spectral estimation algorithms. Detailed computations have revealed a major contrast between dielectric-coated objects and uncoated metallic ones with regard to creeping wave propagation. Because of smaller curvature-induced leakage and coherent interaction between incident wave and the dielectric coating, creeping waves, strongly attenuate by metallic objects, and become quite pronounced for coated objects. As the frequency increases, the creeping waves are partially trapped inside the dielectric layer and the scattered field becomes quite small. Therefore, in contrast to leakage on a metallic cylinder, which display smooth monotonic reduction in amplitude with increasing frequency, creeping waves on a coated cylinder exhibit a strong cutoff akin to a guided wave. These characteristics will thus provide OAM infused creeping waves that have a unique OAM signature from a target to enable identification of the target.

Figure 7:
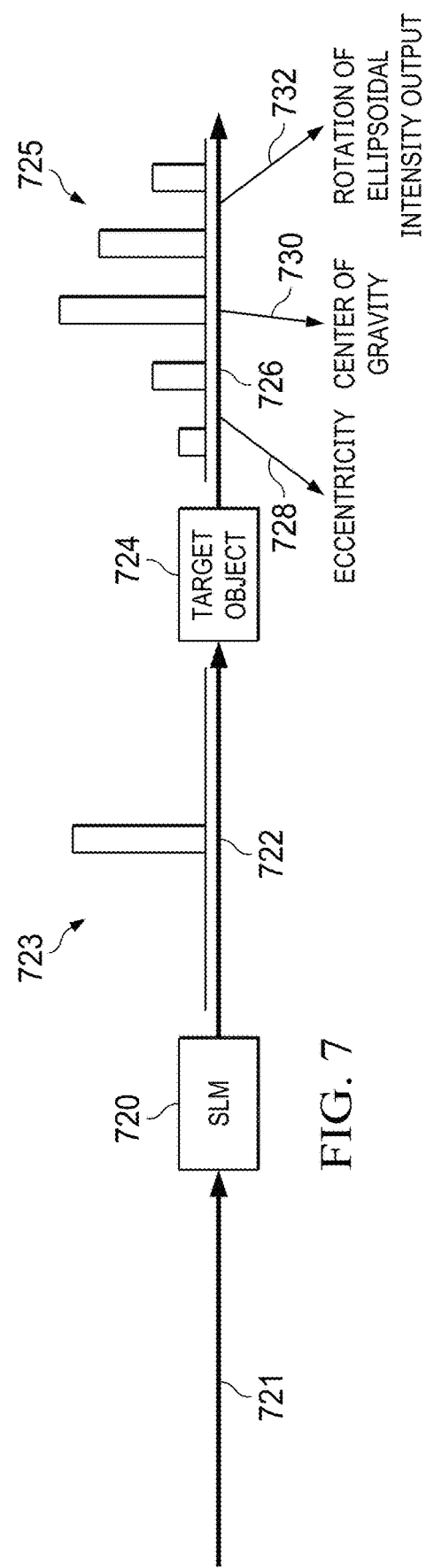
FIG. 7 illustrates the manner in which an OAM generator generates an OAM twisted beam.

Referring now to FIG. 7 illustrates the manner in which an OAM generator 720 may generate an OAM twisted beam 722. The OAM generator 710 may use any number of devices to generate the twisted beam 722 including holograms with an amplitude mask, holograms with a phase mask, Spatial Light Modulators (SLMs), Digital Light Processors (DLPs), or RF modulation processing. The OAM generator 720 receives a beam 721 that includes a series of plane waves. The OAM generator 720 applies an orbital angular momentum to the beam 722. The beam 722 includes a single OAM mode as illustrated by the intensity diagram 723. The OAM twisted beam 722 is reflected from the target object 724 including material that is being detected. The target object 724 will create new OAM mode levels within the intensity diagram 725 that includes the initial single OAM mode (pure OAM mode) plus multiple other OAM modes that are caused by the reflection from the target. Once the beam 722 reflects from the target object 724, the output beam 726 will have three distinct OAM mode signatures associated therewith based on a target object. These signatures include a change in eccentricity 728 of the intensity pattern, a shift or translation 730 in the center of gravity of the intensity pattern and a rotation 732 in three general directions (a, (3, y) of the ellipsoidal intensity pattern output. Each of these distinct signature indications may occur in any configuration and each distinct signature will provide a unique indication of the target object. The detection of the helicity spectrums from the beam reflecting from the target object 724 involves detecting the helical wave reflections from the target object.

With the advent of the laser, the Gaussian beam solution to the wave equation came into common engineering parlance, and its extension two higher order laser modes, Hermite Gaussian for Cartesian symmetry; Laguerre Gaussian for cylindrical symmetry, etc., entered laboratory optics operations. Higher order Laguerre Gaussian beam modes exhibit spiral, or helical phase fronts. Thus, the propagation vector, or the eikonal of the beam, and hence the beams momentum, includes in addition to a spin angular momentum, an orbital angular momentum, i.e. a wobble around the sea axis. This phenomenon is often referred to as vorticity. The expression for a Laguerre Gaussian beam is given in cylindrical coordinates:

$$u(r, \theta, z) = \sqrt{\frac{2pl}{1 + \delta_{0,m}\pi(m+p)!}} \frac{1}{w(z)}$$

$$\exp[j(2p + m + 1)(\psi(z) - \psi_0)] \left( \frac{\sqrt{2} r}{w(z)} \right) L_p^m \left( \frac{2r^2}{w(z)^2} \right) \exp\left[ -jk \frac{r^2}{2q(z)} + jm\theta \right]$$

Here, w (x) is the beam spot size, q(c) is the complex beam parameter comprising the evolution of the spherical wave front and the spot size. Integers p and m are the radial and azimuthal modes, respectively. The exp(imθ) term describes the spiral phase fronts.

Figure 8:
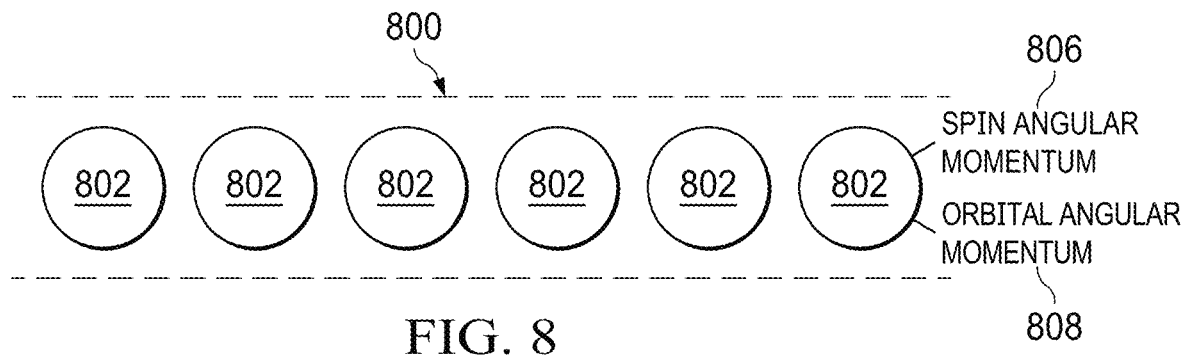
FIG. 8 illustrates a beam having orbital angular momentum imparted thereto.

Referring now also to FIG. 8, there is illustrated one embodiment of a beam for use with the system. A light beam 800 consists of a stream of photons 802 within the light beam 800. Each photon has an energy $\pm\hbar\ell$ and a linear momentum of $\pm\hbar k$ which is directed along the light beam axis 804 perpendicular to the wavefront. Independent of the frequency, each photon 802 within the light beam has a spin angular momentum 806 of $\pm\hbar$ aligned parallel or antiparallel to the direction of light beam propagation. Alignment of all of the photons 802 spins gives rise to a circularly polarized light beam. In addition to the circular polarization, the light beams also may carry an orbital angular momentum 808 which does not depend on the circular polarization and thus is not related to photon spin.

Figure 9:
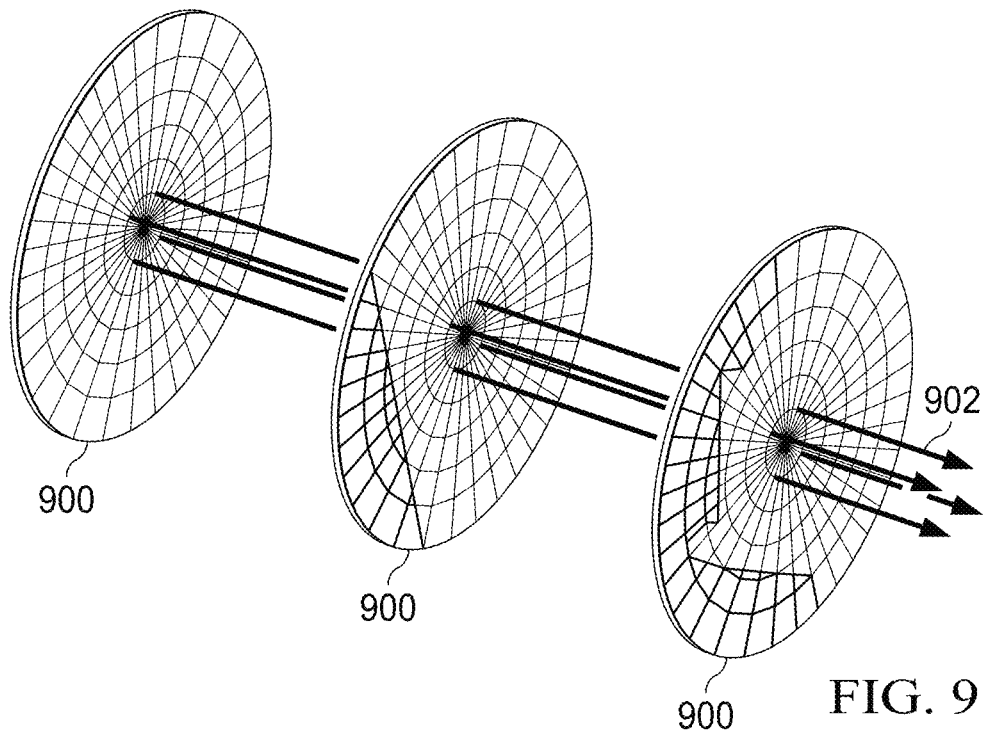
FIG. 9 illustrates a series of parallel wavefronts.

Lasers are widely used in optical experiments as the source of well-behaved light beams of a defined frequency. A laser may be used for providing the light beam 800. The energy flux in any light beam 800 is given by the Poynting vector which may be calculated from the vector product of the electric and magnetic fields within the light beam. In a vacuum or any isotropic material, the Poynting vector is parallel to the wave vector and perpendicular to the wavefront of the light beam. In a normal laser light, the wavefronts 900 are parallel as illustrated in FIG. 9. The wave vector and linear momentum of the photons are directed along the axis in a z direction 902. The field distributions of such light beams are paraxial solutions to Maxwell's wave equation but although these simple beams are the most common, other possibilities exist.

For example, beams that have 1 intertwined helical fronts are also solutions of the wave equation. The structure of these complicated beams is difficult to visualize, but their form is familiar from the l=3 fusilli pasta. Most importantly, the wavefront has a Poynting vector and a wave vector that spirals around the light beam axis direction of propagation as illustrated in FIG. 5 at 502.

A Poynting vector has an azimuthal component on the wave front and a non-zero resultant when integrated over the beam cross-section. The spin angular momentum of circularly polarized light may be interpreted in a similar way. A beam with a circularly polarized planer wave front, even though it has no orbital angular momentum, has an azimuthal component of the Poynting vector proportional to the radial intensity gradient. This integrates over the cross-section of the light beam to a finite value. When the beam is linearly polarized, there is no azimuthal component to the Poynting vector and thus no spin angular momentum.

Thus, the momentum of each photon 802 within the light beam 800 has an azimuthal component. A detailed calculation of the momentum involves all of the electric fields and magnetic fields within the light beam, particularly those electric and magnetic fields in the direction of propagation of the beam. For points within the beam, the ratio between the azimuthal components and the z components of the momentum is found to be 1/kr. (where 1=the helicity or orbital angular momentum; k=wave number $2\pi/\lambda$; r=the radius vector.) The linear momentum of each photon 802 within the light beam 800 is given by $\hbar k$, so if we take the cross product of the azimuthal component within a radius vector, r, we obtain an orbital momentum for a photon 802 of $1\hbar$. Note also that the azimuthal component of the wave vectors is 1/r and independent of the wavelength.

Ordinarily, beams with plane wavefronts 902 are characterized in terms of Hermite-Gaussian modes. These modes have a rectangular symmetry and are described by two mode indices m and n. There are m nodes in the x direction and n nodes in the y direction. Together, the combined modes in the x and y direction are labeled HGmn. In contrast, beams with helical wavefronts are best characterized in terms of Laguerre-Gaussian modes which are described by indices l, the number of intertwined helices, and p, the number of radial nodes. The Laguerre-Gaussian modes are labeled LGmn. For $l \neq 0$, the phase singularity on a light beam 800 results in 0 on axis intensity. When a light beam 800 with a helical wavefront is also circularly polarized, the angular momentum has orbital and spin components, and the total angular momentum of the light beam is $(1\pm\hbar)$ per photon.

Using the orbital angular momentum state of the transmitted energy signals, physical information can be embedded within the electromagnetic radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x) \text{the}$$

where $\nabla$ is the del operator, E is the electric field intensity and B is the magnetic flux density. Using these equations, we can derive 23 symmetries/conserve quantities from Maxwell's original equations. However, there are only ten well-known conserve quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2)$$

$$\frac{dU^{mech}}{dt} + \frac{dU^{em}}{dt} + \oint_{s'} d^2 x' \hat{n}' \cdot S = 0$$

The space symmetry, i.e., the conservation of system linear momentum representing the electromagnetic Doppler shift can be represented by the equations:

$$P = \sum_i m_i \gamma_i v_i + \varepsilon_0 \int d^3 x \, (E \times B)$$

$$\frac{dp^{mech}}{dt} + \frac{dp^{em}}{dt} + \oint_{s'} d^2 x' \hat{n}' \cdot T = 0$$

The conservation of system center of energy is represented by the equation:

$$R = \frac{1}{H}\sum_i (x_i - x_0)m_i\gamma_i c^2 + \frac{\varepsilon_0}{2H}\int d^3x(x-x_0)(|E^2|+c^2\,|B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{S'} d^2x'n'^2 \cdot M = 0$$

For radiation beams in free space, the EM field angular momentum $J^{em}$ can be separated into two parts:

$$J^{em} = \varepsilon_0 \int_{V'} d^3x'(E \times A) + \varepsilon_0 \int_{V'} d^3x' E_i [(x'-x_0) \times \nabla] A_i$$

For each singular Fourier mode in real valued representation:

$$J^{em} = -i\frac{\varepsilon_0}{2\omega}\int_{V'} d^3x'(E^* \times E) - i\frac{\varepsilon_0}{2\omega}\int_{V'} d^3x' E_i[(x'-x_0) \times \nabla]E_i$$

The first part is the EM spin angular momentum Sem, its classical manifestation is wave polarization. And the second part is the EM orbital angular momentum Lem its classical manifestation is wave helicity. In general, both EM linear momentum Pem, and EM angular momentum Jem=Lem+Sem are radiated all the way to the far field.

By using Poynting theorem, the optical vorticity of the signals may be determined according to the optical velocity equation:

$$\frac{\partial U}{\partial t} + \nabla \cdot S = 0$$

where S is the Poynting vector $$S = \tfrac{1}{4}(E \times H^* + E^* \times H)$$

and U is the energy density $$U = \tfrac{1}{4}(\varepsilon|E|^2 + \mu_0|H|^2)$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left(\frac{E \times H^* + E^* \times H}{\varepsilon|E|^2 + \mu_0\,|H|^2}\right)$$

Figure 11:
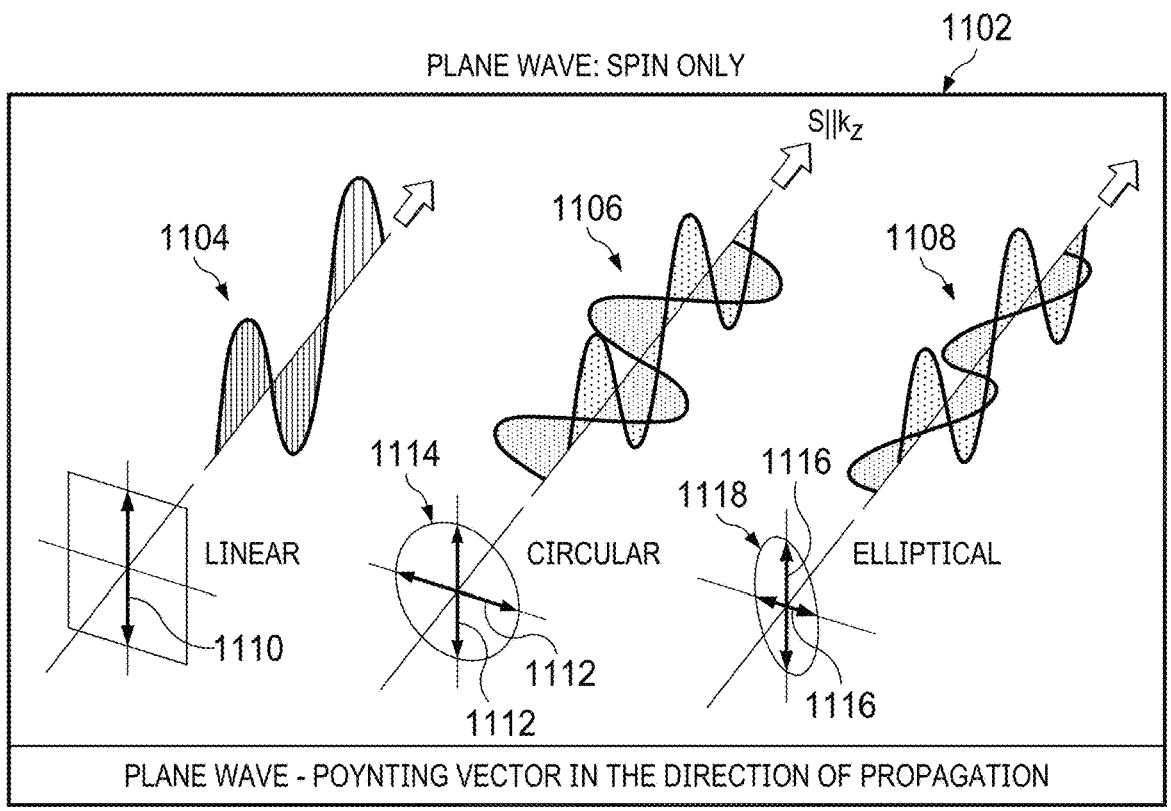
FIG. 11 illustrates a plane wave having only variations in the spin vector.
Figure 12:
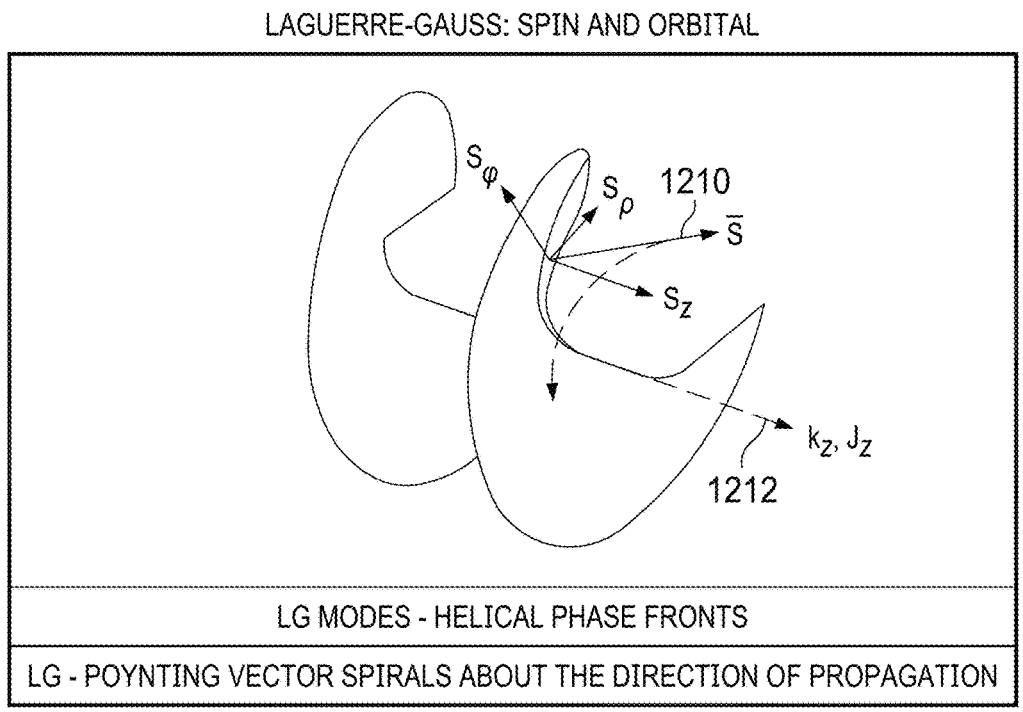
FIG. 12 illustrates the application of a unique orbital angular momentum to a signal.

Referring now to FIGS. 11 and 12, there are illustrated the manner in which a signal and an associated Poynting vector of the signal vary in a plane wave situation (FIG. 11) where only the spin vector is altered, and in a situation wherein the spin and orbital vectors are altered in a manner to cause the Poynting vector to spiral about the direction of propagation (FIG. 12).

In the plane wave situation, illustrated in FIG. 11, when only the spin vector of the plane wave is altered, the transmitted signal may take on one of three configurations. When the spin vectors are in the same direction, a linear signal is provided as illustrated generally at 1104. It should be noted that while 1104 illustrates the spin vectors being altered only in the x direction to provide a linear signal, the spin vectors can also be altered in the y direction to provide a linear signal that appears similar to that illustrated at 1104 but in a perpendicular orientation to the signal illustrated at 1104. In linear polarization such as that illustrated at 1104, the vectors for the signal are in the same direction and have a same magnitude.

Within a circular polarization as illustrated at 1106, the signal vectors 1112 are 90 degrees to each other but have the same magnitude. This causes the signal to propagate as illustrated at 1106 and provide the circular polarization 1114 illustrated in FIG. 11. Within an elliptical polarization 1108, the signal vectors 1116 are also 90 degrees to each other but have differing magnitudes. This provides the elliptical polarizations 1118 illustrated for the signal propagation 1208. For the plane waves illustrated in FIG. 11, the Poynting vector is maintained in a constant direction for the various signal configurations illustrated therein.

The situation in FIG. 12 illustrates when a unique orbital angular momentum is applied to a signal. When this occurs, Poynting vector S 1210 will spiral around the general direction of propagation 1212 of the signal. The Poynting vector 1210 has three axial components Sφ, Sp and Sz which vary causing the vector to spiral about the direction of propagation 1212 of the signal. The changing values of the various vectors comprising the Poynting vector 1210 may cause the spiral of the Poynting vector to be varied in order to enable signals to be transmitted on a same wavelength or frequency as will be more fully described herein. Additionally, the values of the orbital angular momentum indicated by the Poynting vector 1210 may be measured to determine the presence of particular materials and the concentrations associated with particular materials being processed by a scanning mechanism.

Figure 13A:
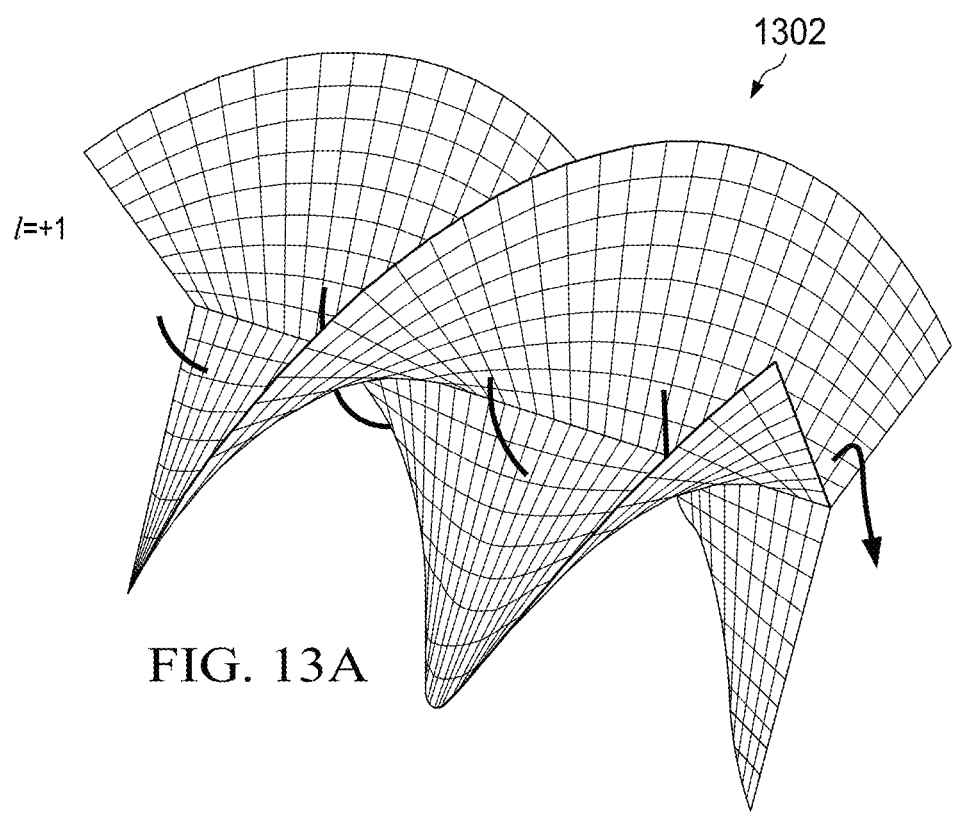
FIGS. 13A-13C illustrate the differences between signals having different orbital angular momentum applied thereto.
Figure 13B:
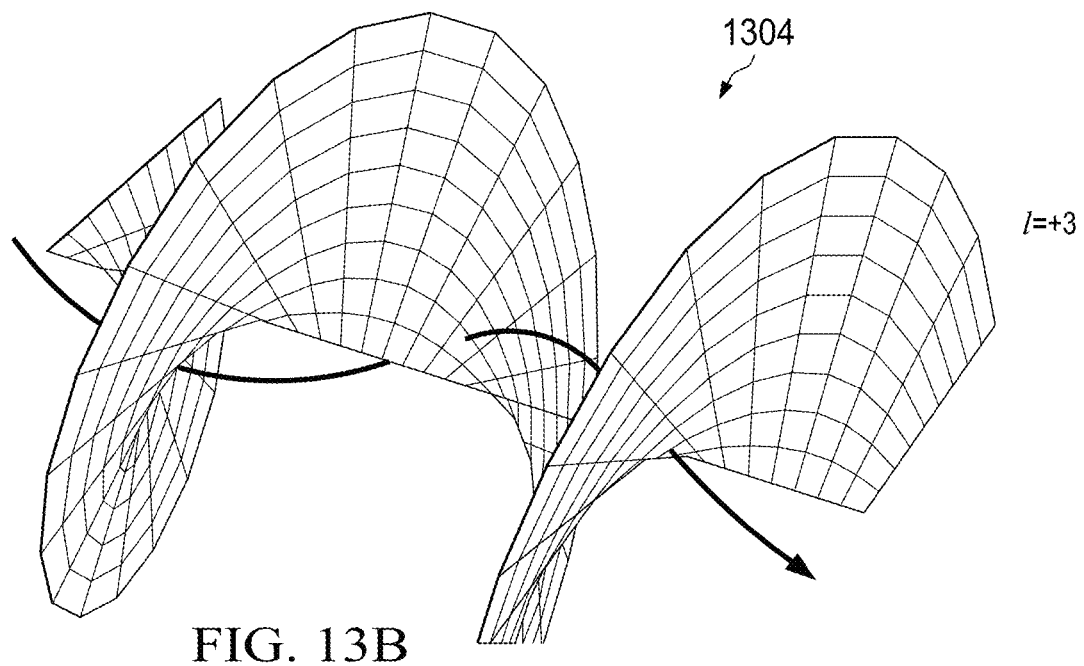
Figure 13C:
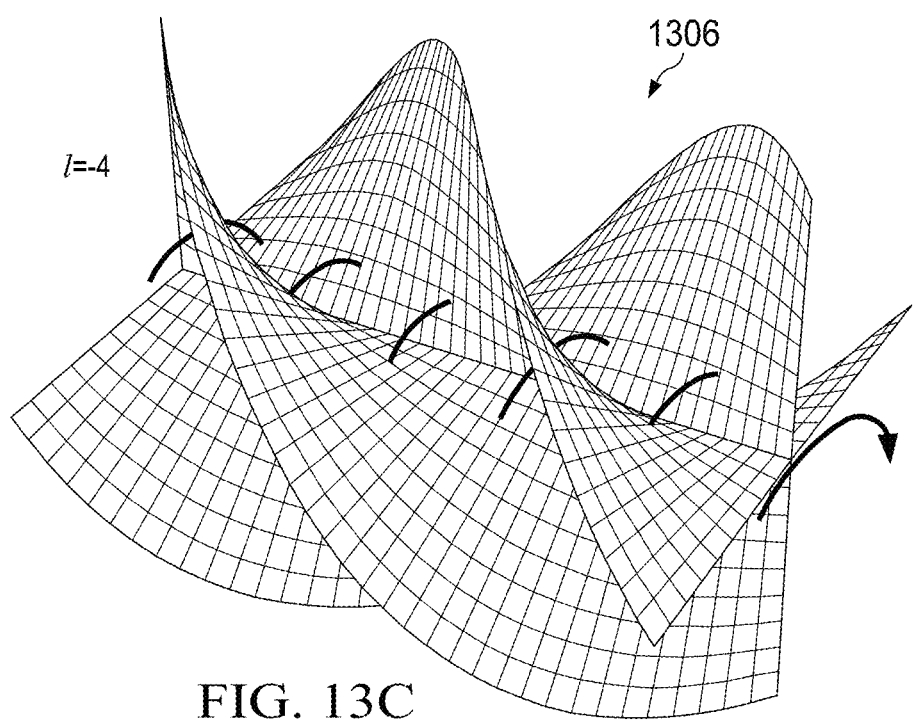

FIGS. 13A-13C illustrate the differences in signals having a different helicity (i.e., orbital angular momentum applied thereto). The differing helicities would be indicative of differing target objects that a beam was reflected from. By determining the particular orbital angular momentum signature including combined helicities therein associated with a signal, the particular target object could be determined. Each of the spiraling Poynting vectors associated with a signal 1302, 1304 and 1306 provides a different-shaped signal. Signal 1302 has an orbital angular momentum of +1, signal 1304 has an orbital angular momentum of +3 and signal 1306 has an orbital angular momentum of −4. Each signal has a distinct orbital angular momentum and associated Poynting vector enabling the signal to be indicative of a particular material and concentration of material that is associated with the detected orbital angular momentum. This allows determinations of materials and concentrations of various types of materials to be determined from a signal since the orbital angular momentums are separately detectable and provide a unique indication of the particular material and the concentration of the particular material that has affected the orbital angular momentum of the signal transmitted through the sample material.

Figure 14A:
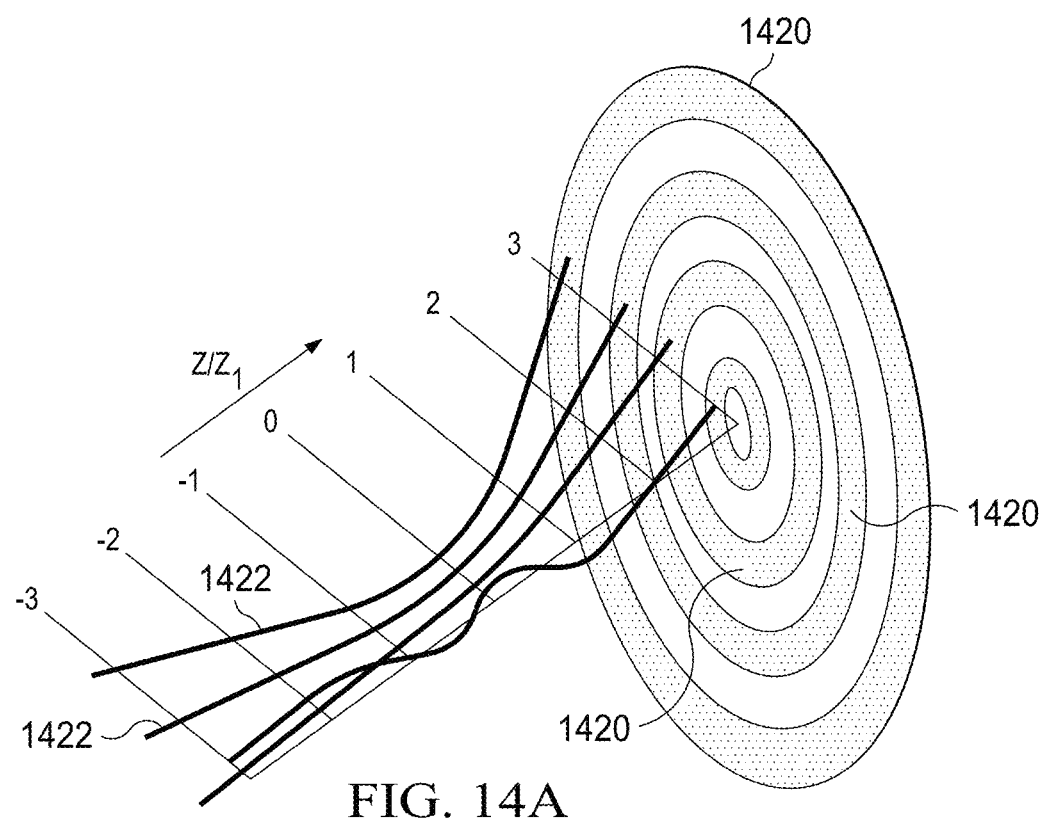
FIG. 14A illustrates the propagation of Poynting vectors for various eigenmodes.

FIG. 14A illustrates the propagation of Poynting vectors for various Eigen modes. Each of the rings 1420 represents a different Eigen mode or twist representing a different orbital angular momentum. Each of the different orbital angular momentums is associated with particular material and a particular concentration of the particular material. Detection of orbital angular momentums provides an indication of the a presence of an associated material and a concentration of the material that is being detected by the apparatus. Each of the rings 1420 represents a different material and/or concentration of a selected material that is being monitored. Each of the Eigen modes has a Poynting vector 1422 for generating the rings indicating different materials and material concentrations.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "I" or the amount of twist or OAM applied to the signal. The helicity index may be positive or negative.

Figure 14B:
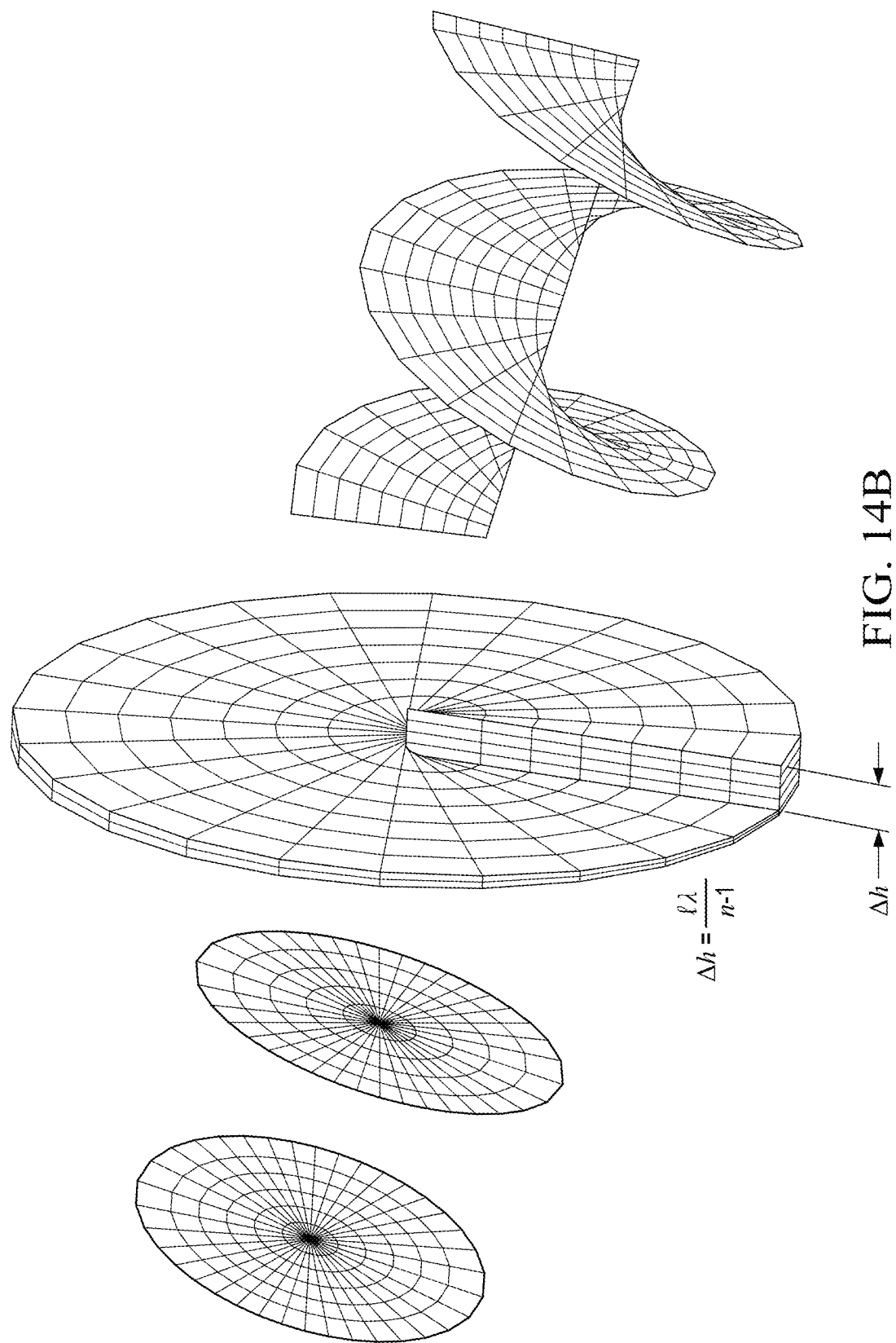
FIG. 14B illustrates a spiral phase plate.

The topological charges 1 s can be created using Spiral Phase Plates (SPPs) as shown in FIG. 14B using a proper material with specific index of refraction and ability to machine shop or phase mask, holograms created of new materials. Spiral Phase plates can transform a RF plane wave (1=0) to a twisted wave of a specific helicity (i.e. 1=+1).

Figure 15:
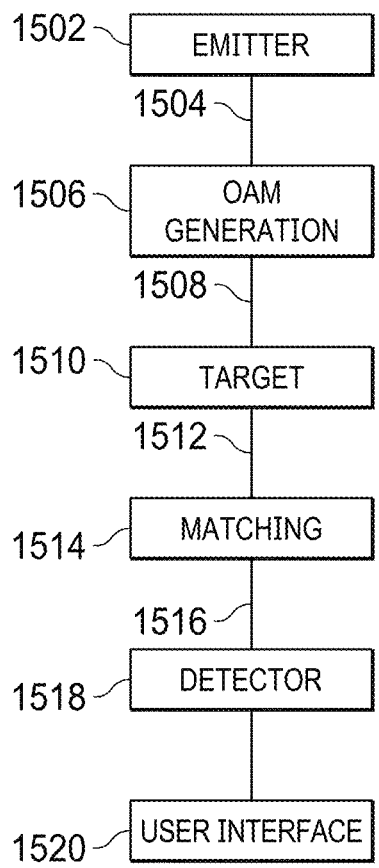
FIG. 15 illustrates a block diagram of an apparatus for providing concentration measurements and presence detection of various materials using orbital angular momentum.

Referring now to FIG. 15, there is illustrated a block diagram of the apparatus for providing identification of a target object responsive to the orbital angular momentum detected by the apparatus in accordance with the principles described herein above. An emitter 1502 transmits wave energy 1504 that comprises a series of plane waves. The emitter 1502 may provide a series of plane waves such as those describes previously with respect to FIG. 9. The orbital angular momentum generation circuitry 1506 generates a series of waves having an orbital angular momentum applied to the waves 1508 in a known manner. The orbital angular momentum generation circuitry 1506 may utilize holograms or some other type of orbital angular momentum generation process as will be more fully described herein below. The OAM generation circuitry 1506 may be generated by transmitting plane waves through a spatial light modulator (SLM), an amplitude mask, a phase mask, or other technique. The orbital angular momentum twisted waves 1508 are applied to a target 1510 to be identified under test. The identification of the target 1510 is determined via a detection apparatus in accordance with the process described herein.

A series of output waves 1512 reflected from the target 1510 have a particular orbital angular momentum signature including multiple orbital angular momentum modes imparted thereto as a result of the reflection from the target 1510. The output waves 1512 are applied to a matching module 1514 that includes a mapping aperture for amplifying a particular orbital angular momentums caused by a reflection from a particular target object. The matching module 1514 will amplify the orbital angular momentums associated with a particular target object that is detected or identified by the apparatus. The amplified OAM waves 1516 are provided to a detector 1518. The detector 1518 detects OAM waves identifying the object based on the OAM modes within the reflection and provides this information to a user interface 1520. The detector 1518 may utilize a camera to detect distinct topological features from the beam reflecting from a target object. The user interface 1520 interprets the information and provides relevant object identification to an individual or a recording device.

Figure 16:
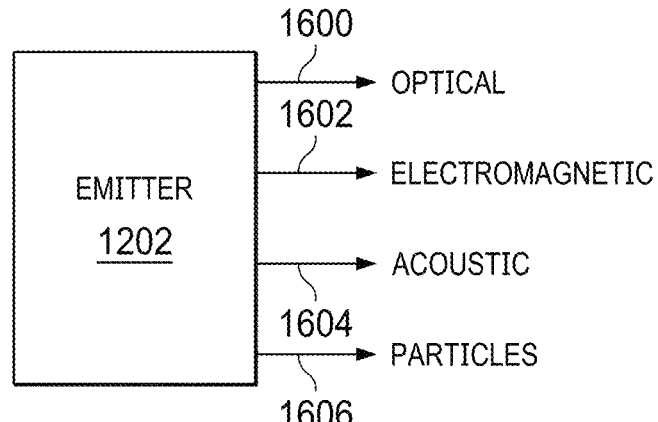
FIG. 16 illustrates an emitter of the system of FIG. 11.

Referring now to FIG. 16, there is more particularly illustrated the emitter 1502. The emitter 1502 may emit a number of types of energy waves 1504 to the OAM generation module 706. The emitter 1502 may emit optical waves 1600, electromagnetic waves 1602, acoustic waves 1604 or any other type of particle waves 1606. The emitted waves 1504 are plane waves such as those illustrated in FIG. 9 having no orbital angular momentum applied thereto and may come from a variety of types of emission devices and have information included therein. In one embodiment, the emission device may comprise a laser or RF transmitter. Plane waves have wavefronts that are parallel to each other having no twist or helicity applied thereto, and the orbital angular momentum of the wave is equal to 0. The Poynting vector within a plane wave is completely in line with the direction of propagation of the wave.

Figure 17:
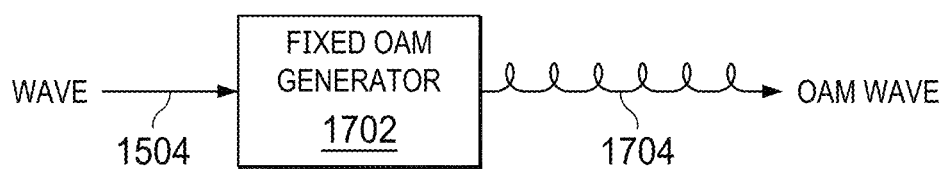
FIG. 17 illustrates a fixed orbital angular momentum generator of the system of FIG. 11.
Figure 18A:
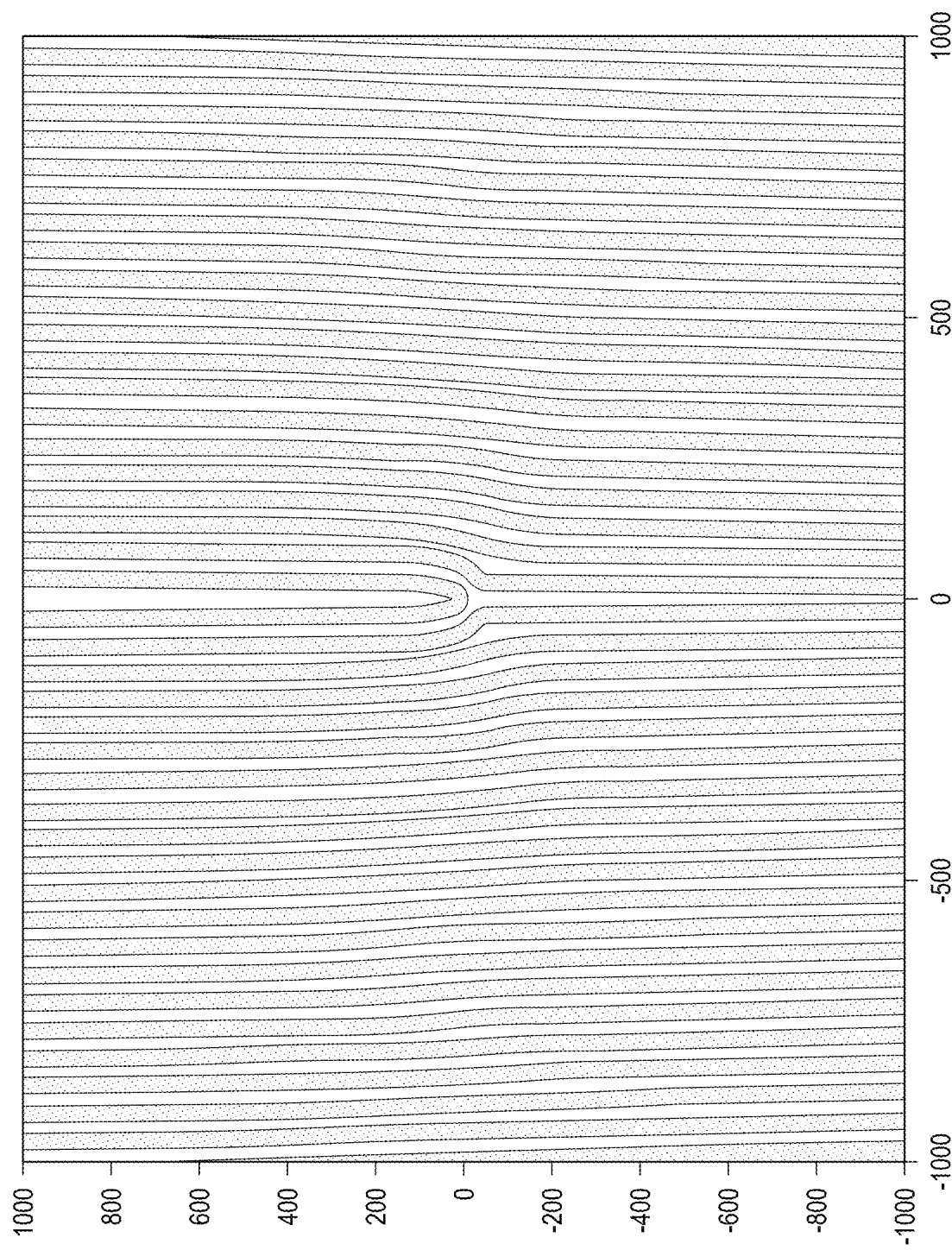
Figure 18C:
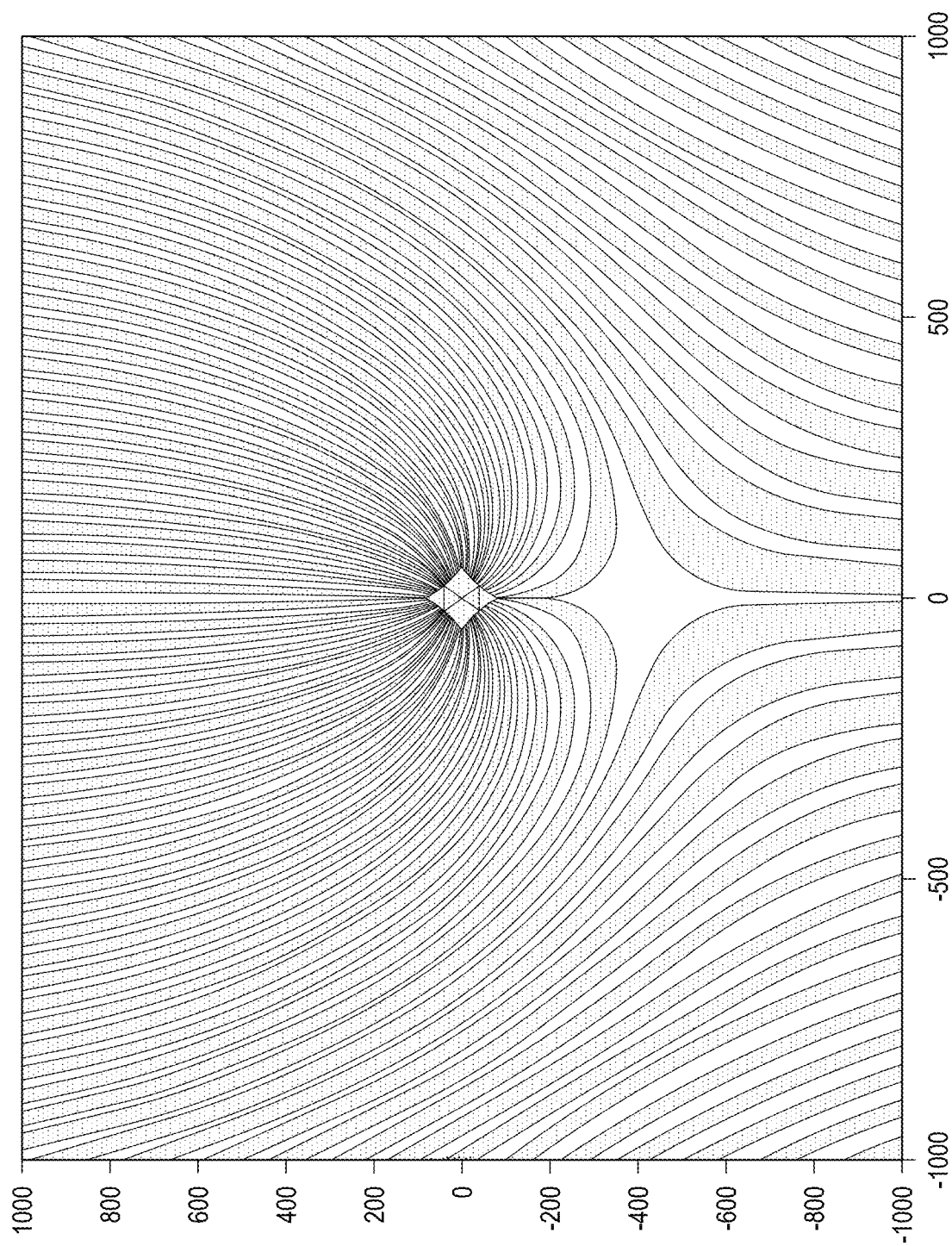
Figure 18D:
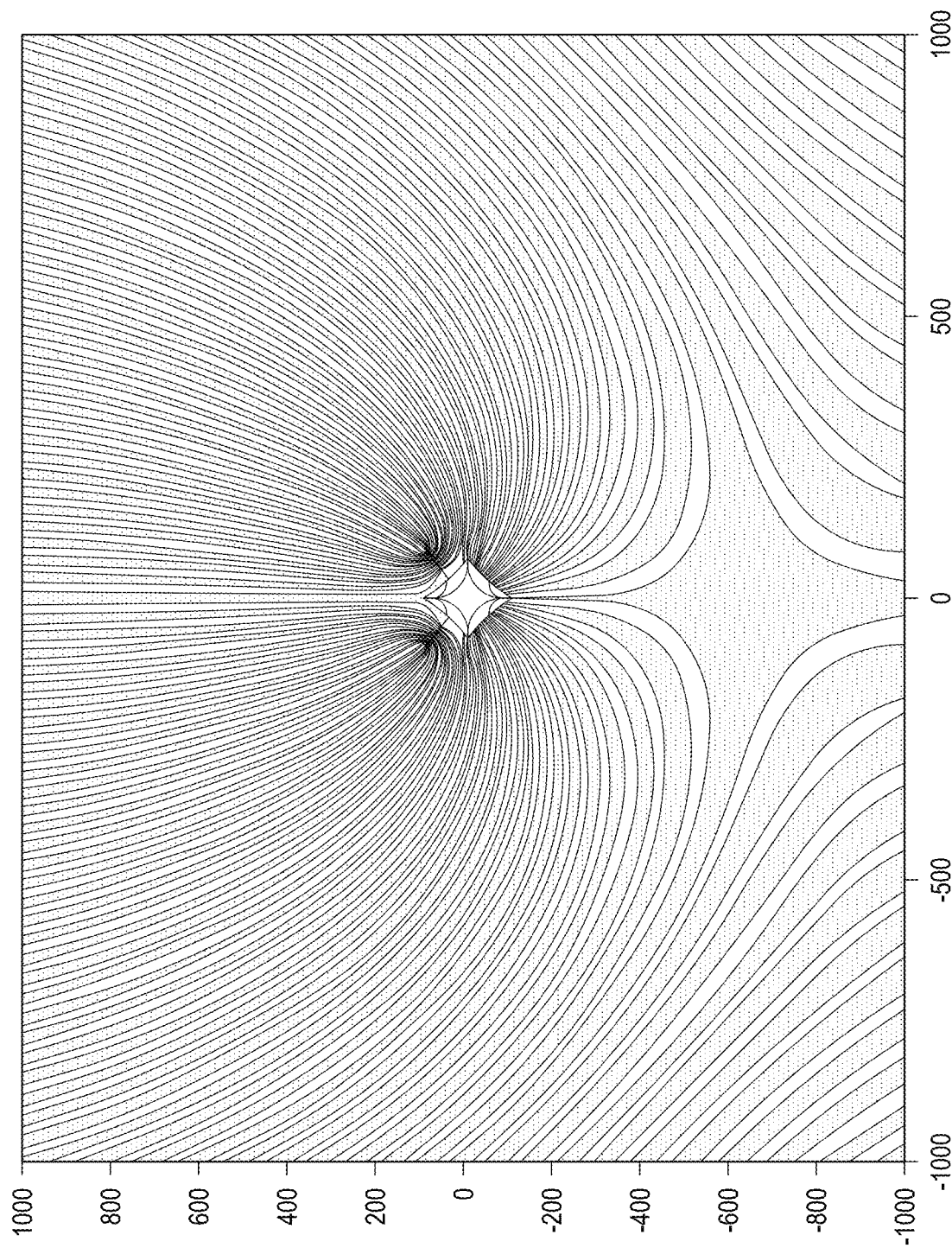

The OAM generation module 1506 processes the incoming plane wave 1504 and imparts a known orbital angular momentum onto the plane waves 1504 provided from the emitter 1502. The OAM generation module 1506 generates twisted or helical electromagnetic, optic, acoustic or other types of particle waves from the plane waves of the emitter 1502. A helical wave 1508 is not aligned with the direction of propagation of the wave but has a procession around direction of propagation as shown in FIG. 17. The OAM generation module 1506 may comprise in one embodiment a fixed orbital angular momentum generator 1702 as illustrated in FIG. 17. The fixed orbital angular momentum generator 1702 receives the plane waves 1504 from the emitter 1502 and generates an output wave 1704 having a fixed orbital angular momentum applied thereto.

The fixed orbital angular momentum generator 1702 may in one embodiment comprise a holographic image for applying the fixed orbital angular momentum to the plane wave 1504 in order to generate the OAM twisted wave 1704. Various types of holographic images may be generated in order to create the desired orbital angular momentum twist to an optical signal that is being applied to the orbital angular momentum generator 1702. Various examples of these holographic images are illustrated in FIG. 18A-18D. In one embodiment, the conversion of the plane wave signals transmitted from the emitter 1502 by the orbital angular momentum generation circuitry 1506 may be achieved using holographic images.

Figure 19:
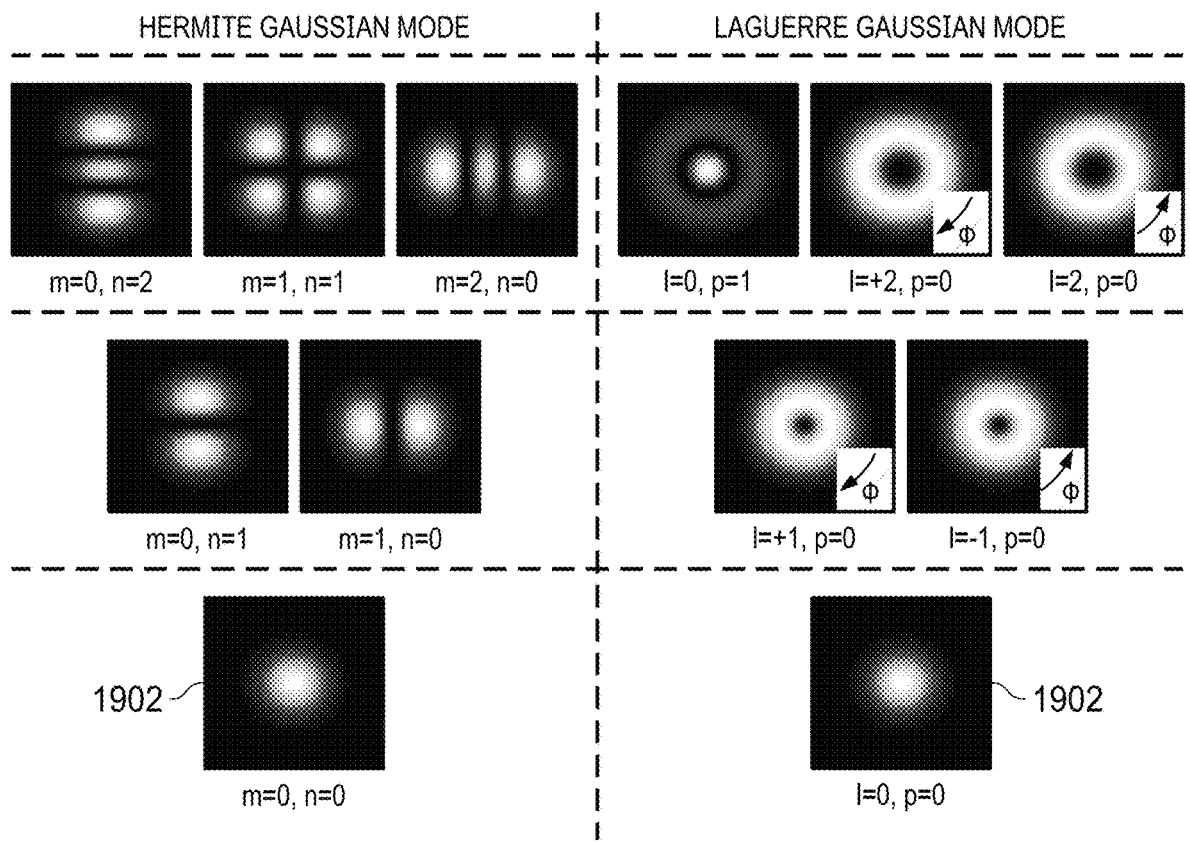
FIG. 19 illustrates the relationship between Hermite-Gaussian modes and Laguerre-Gaussian modes.

Most commercial lasers emit an HG00 (Hermite-Gaussian) mode 1902 (FIG. 19) with a planar wave front and a transverse intensity described by a Gaussian function. Although a number of different methods have been used to successfully transform an HG00 Hermite-Gaussian mode 1902 into a Laguerre-Gaussian mode 1904, the simplest to understand is the use of a hologram.

The cylindrical symmetric solution upl (r, φ, z) which describes Laguerre-Gaussian beams, is given by the equation:

$$u_{pl}(r,\phi,z) = \frac{C}{(1+z^2/z_R^2)^{1/2}} \left[\frac{r\sqrt{2}}{w(z)}\right]^l L_p^l\left[\frac{2r^2}{w^2(z)}\right] \exp\left[\frac{-r^2}{w^2(z)}\right]$$
$$\exp\left[\frac{-ikr^2 z}{2(z^2+z_R^2)}\right] \exp(-il\phi) \times \exp\left[i(2p+l+1)\tan^{-1}\frac{z}{z_R}\right]$$

Where $z_R$ is the Rayleigh range, w(z) is the radius of the beam, $L_P$ is the Laguerre polynomial, C is a constant, and the beam waist is at z=0.

In its simplest form, a computer generated hologram is produced from the calculated interference pattern that results when the desired beam intersects the beam of a conventional laser at a small angle. The calculated pattern is transferred to a high resolution holographic film. When the developed hologram is placed in the original laser beam, a diffraction pattern results. The first order of which has a desired amplitude and phase distribution. This is one manner for implementing the OAM generation module 1506. A number of examples of holographic images for use within a OAM generation module are illustrated with respect to FIGS. 18A-18D.

There are various levels of sophistication in hologram design. Holograms that comprise only black and white areas with no grayscale are referred to as binary holograms. Within binary holograms, the relative intensities of the two interfering beams play no role and the transmission of the hologram is set to be zero for a calculated phase difference between zero and 7C, or unity for a phase difference between π and 2π. A limitation of binary holograms is that very little of the incident power ends up in the first order diffracted spot, although this can be partly overcome by blazing the grating. When mode purity is of particular importance, it is also possible to create more sophisticated holograms where the contrast of the pattern is varied as a function of radius such that the diffracted beam has the required radial profile.

A plane wave shining through the holographic images 1802 will have a predetermined orbital angular momentum shift applied thereto after passing through the holographic image 1802. OAM generator 1502 is fixed in the sense that a same image is used and applied to the beam being passed through the holographic image. Since the holographic image 1802 does not change, the same orbital angular momentum is always applied to the beam being passed through the holographic image 1802. While FIGS. 18A-18D illustrate a number of embodiments of various holographic images that might be utilized within the orbital angular momentum generator 1502, it will be realized that any type of holographic image 1802 may be utilized in order to achieve the desired orbital angular momentum within an beam being shined through the image 1802.

Figure 20:
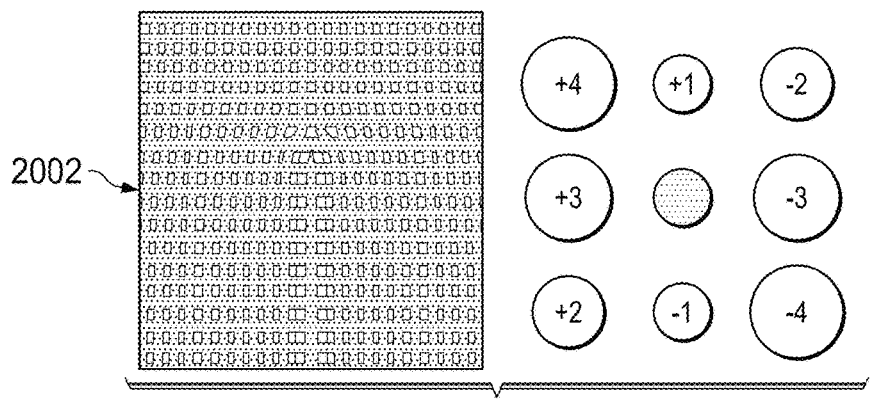
FIG. 20 illustrates super-imposed holograms for applying orbital angular momentum to a signal.

In another example of a holographic image illustrated in FIG. 20, there is illustrated a hologram that utilizes two separate holograms that are gridded together to produce a rich number of orbital angular momentum (1). The superimposed holograms of FIG. 20 have an orbital angular momentum of l=1 and l=3 which are superimposed upon each other to compose the composite vortex grid 2002. The holograms utilized may also be built in a manner that the two holograms are gridded together to produce a varied number of orbital angular momentums (1) not just on a line (1=+1, 1=0, 1=−1) but on a square which is able to identify the many variables more easily. Thus, in the example in FIG. 20, the orbital angular momentums along the top edge vary from +4 to +1 to −2 and on the bottom edge from +2 to −1 to −4. Similarly, along the left edge the orbital angular momentums vary from +4 to +3 to +2 and on the right edge from −2 to −3 to −4. Across the horizontal center of the hologram the orbital angular momentums provided vary from +3 to 0 to −3 and along the vertical axis vary from +1 to 0 to −1. Thus, depending upon the portion of the grid a beam may pass through, varying orbital angular momentum may be achieved.

Figure 21:
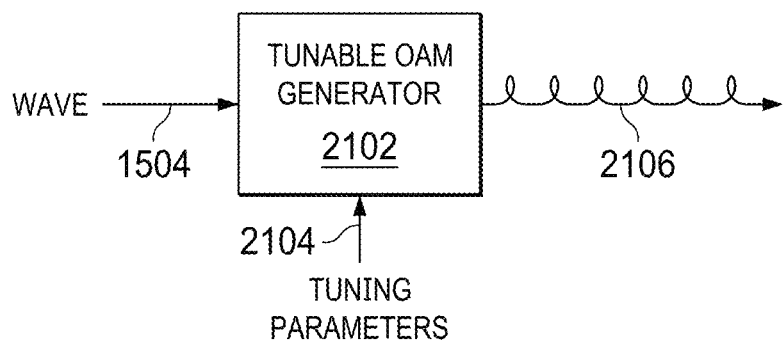
FIG. 21 illustrates a tunable orbital angular momentum generator for use in the system of FIG. 11.

Referring now to FIG. 21, in addition to a fixed orbital angular momentum generator, the orbital angular momentum generation circuitry 1506 may also comprise a tunable orbital angular momentum generator circuitry 2102. The tunable orbital angular momentum generator 2102 receives the input plane wave 1504 but additionally receives one or more tuning parameters 2104. The tuning parameters 2104 tune the tunable OAM generator 2102 to apply a selected orbital angular momentum so that the tuned OAM wave 2106 that is output from the OAM generator 2102 has a selected orbital angular momentum value applied thereto.

This may be achieved in any number of fashions. In one embodiment, illustrated in FIG. 22, the tunable orbital angular momentum generator 2102 may include multiple hologram images 2202 within the tunable OAM generator 2102. The tuning parameters 2104 enable selection of one of the holographic images 2206 in order to provide the desired OAM wave twisted output signal 2106 through a selector circuit 2204. Alternatively, the gridded holographic image such as that described in FIG. 20 may be utilized and the beam shined on a portion of the gridded image to provide the desired OAM output. The tunable OAM generator 2102 has the advantage of being controlled to apply a particular orbital angular momentum to the output orbital angular momentum wave 2106 depending upon the provided input parameter 2104. This enables the presence and concentrations of a variety of different materials to be monitored, or alternatively, for various different concentrations of the same material to be monitored.

Figure 22:
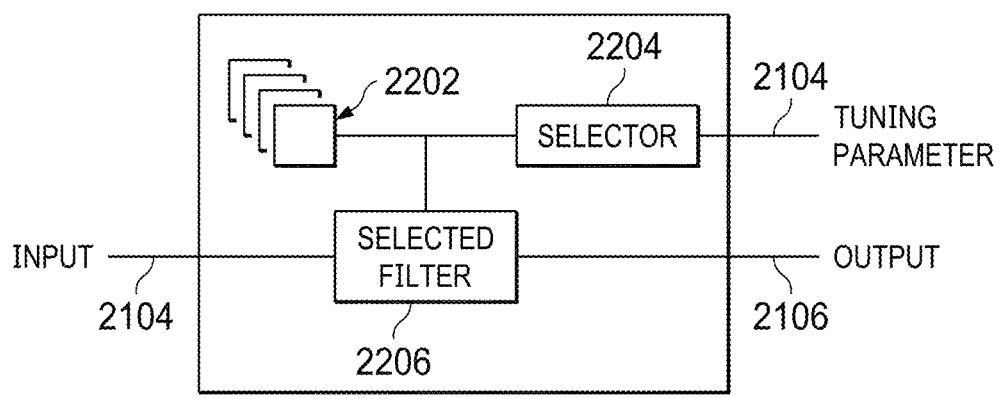
FIG. 22 illustrates a block diagram of a tunable orbital angular momentum generator including multiple hologram images therein.

Referring now to FIG. 22, there is more particularly implemented a block diagram of a tunable orbital angular momentum generator 2102. The generator 2102 includes a plurality of holographic images 2202 for providing orbital angular momentums of various types to a provided light signal. These holographic images 2202 are selected responsive to a selector circuitry 1904 that is responsive to the input tuning parameters 2104. The selected filter 2206 comprises the holographic image that has been selected responsive to the selector controller 2204 and receives the input plane waves 1504 to provide the tuned orbital angular momentum wave output 2106. In this manner, signals having a desired orbital angular momentum may be output from the OAM generation circuitry 1506.

Figure 23:
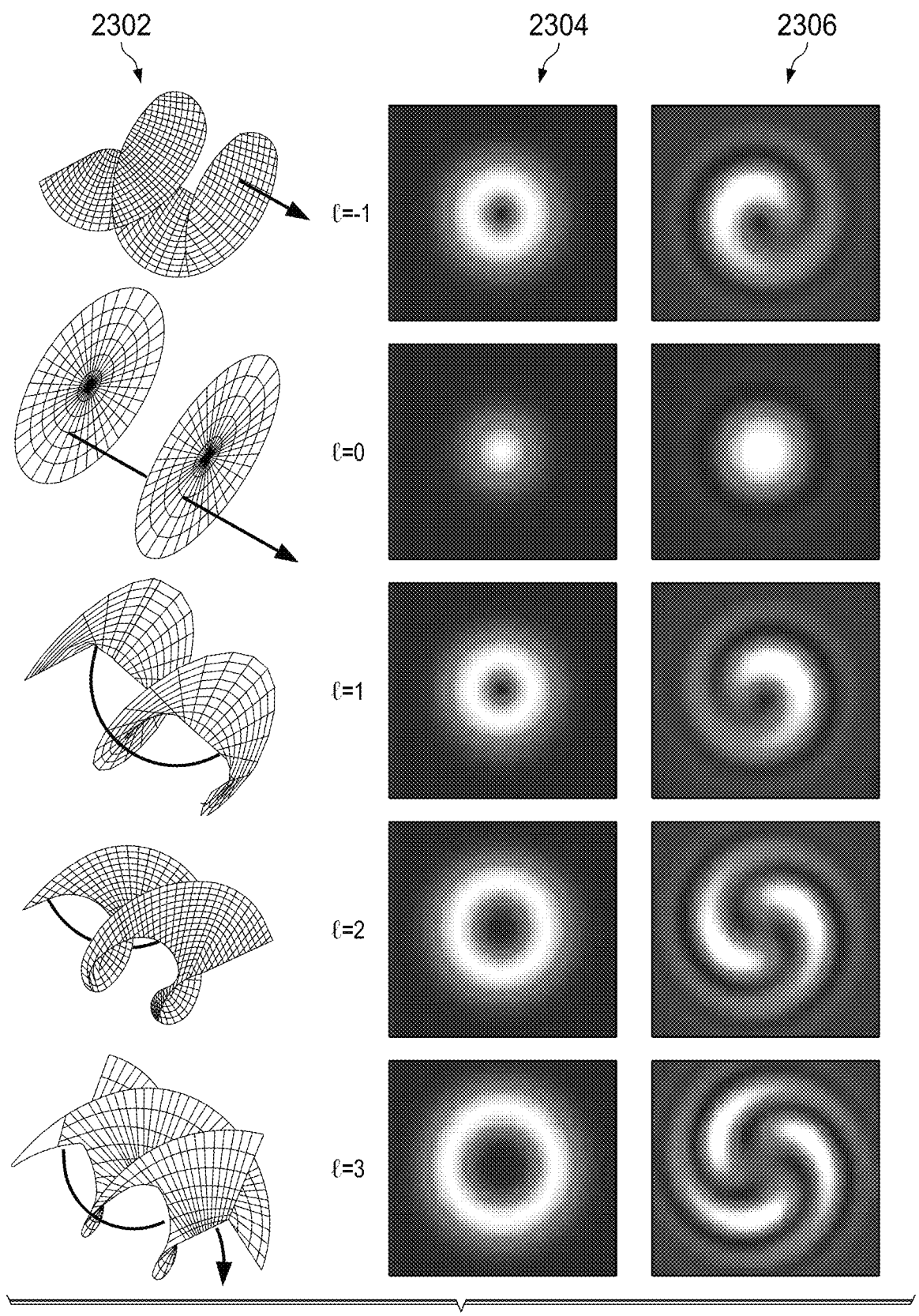
FIG. 23 illustrates the manner in which the output of the OAM generator may be varied by applying different orbital angular momentums thereto.

Referring now to FIG. 23, there is illustrated the manner in which the output of the OAM generator 1506 may vary a signal by applying different orbital angular momentums thereto. FIG. 23 illustrates helical phase fronts in which the Poynting vector is no longer parallel to the beam axis and thus has an orbital angular momentum applied thereto. In any fixed radius within the beam, the Poynting vector follows a spiral trajectory around the axis. Rows are labeled by l, the orbital angular momentum quantum number, $L=l\hbar$ is the beams orbital angular momentum per photon within the output signal. For each l, the left column 2302 is the light beam's instantaneous phase. The center column 2304 comprises the angular intensity profiles and the right column 2306 illustrates what occurs when such a beam interferes with a plane wave and produces a spiral intensity pattern. This is illustrated for orbital angular momentums of −1, 0, 1, 2 and 3 within the various rows of FIG. 26.

Figure 24:
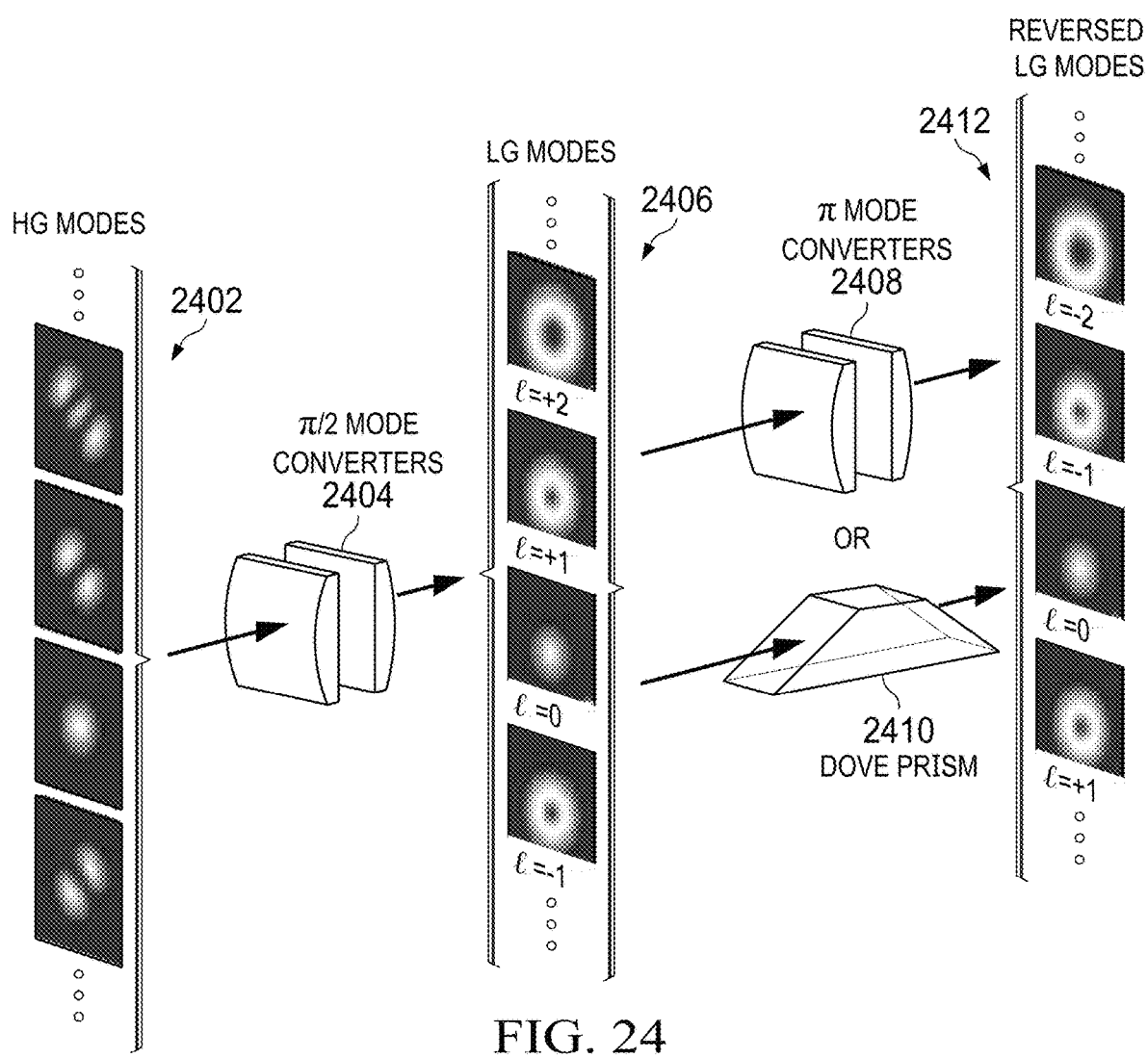
FIG. 24 illustrates an alternative manner in which the OAM generator may convert a Hermite-Gaussian beam to a Laguerre-Gaussian beam.

Referring now to FIG. 24, there is illustrated an alternative manner in which the OAM generator 1506 may convert a Hermite-Gaussian beam output from an emitter 1502 to a Laguerre-Gaussian beams having imparted therein an orbital angular momentum using mode converters 2404 and a Dove prism 2410. The Hermite-Gaussian mode plane waves 2402 are provided to a π/2 mode convertor 2404. The π/2 mode convertor 2404 produce beams in the Laguerre-Gaussian modes 2406. The Laguerre-Gaussian modes beams 2406 are applied to either a it mode convertor 2408 or a dove prism 2410 that reverses the mode to create a reverse Laguerre-Gaussian mode signal 2412.

Figure 25:
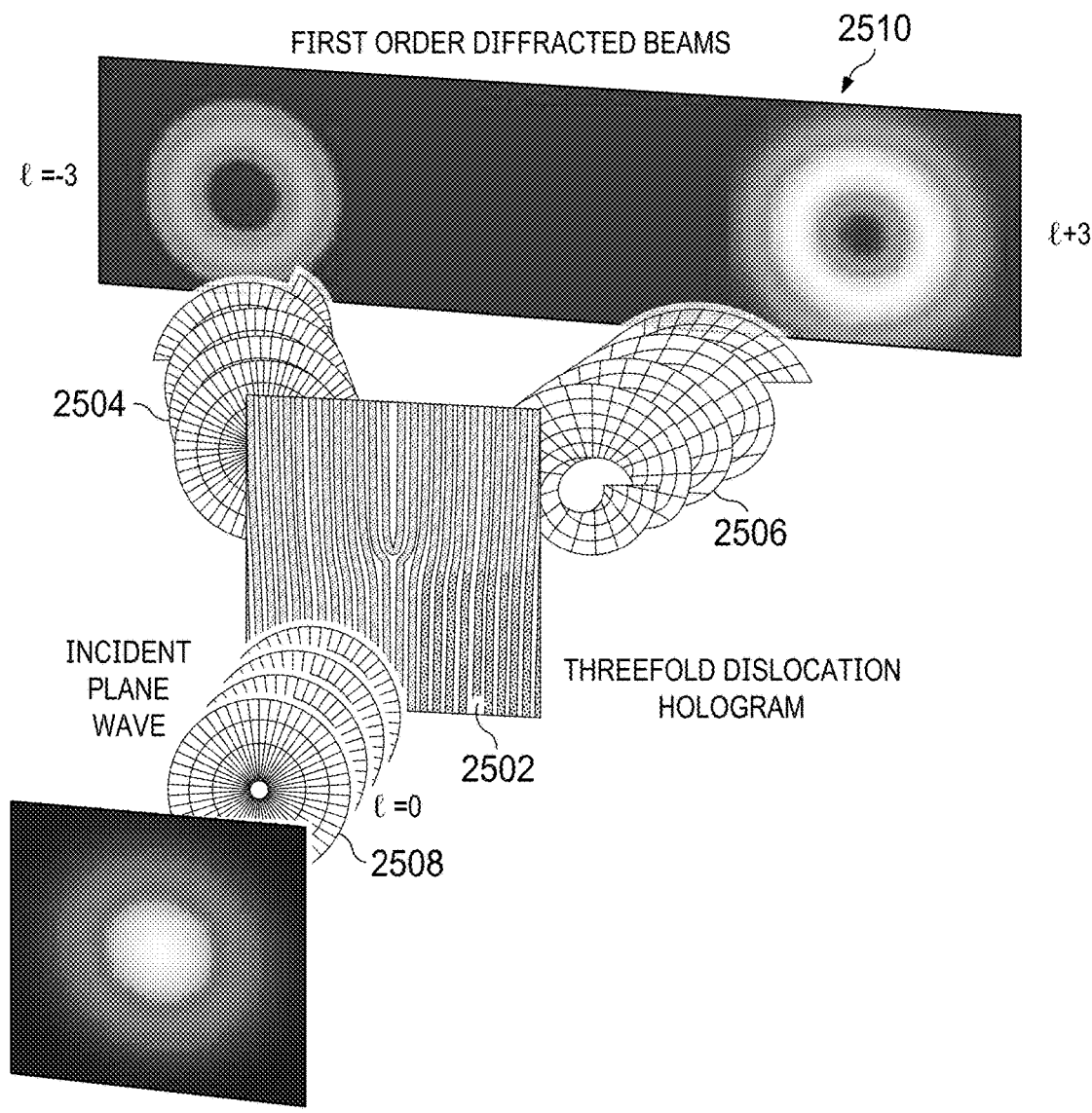
FIG. 25 illustrates the manner in which holograms within an OAM generator may twist a beam of light.

Referring now to FIG. 25, there is illustrated the manner in which holograms within the OAM generator 1506 generate a twisted light beam. A hologram 2502 can produce light beam 2504 and light beam 2506 having helical wave fronts and associated orbital angular momentum lh per photon. The appropriate hologram 2502 can be calculated or generated from the interference pattern between the desired beam form 2504, 2506 and a plane wave 2508. The resulting holographic pattern within the hologram 2502 resembles a diffraction grating, but has a 1-pronged dislocation at the beam axis. When the hologram is illuminated with the plane wave 2508, the first-order diffracted beams 2504 and 2506 have the desired helical wave fronts to provide the desired first ordered diffracted beam display 2510.

Figure 26:
FIG. 26 illustrates the manner in which a sample receives an OAM twisted wave and provides an output wave having a particular OAM signature.

Referring now to FIG. 26, there is more particularly illustrated the manner in which the target 1510 receives the input OAM twisted wave 1508 having a known OAM mode applied thereto provided from the OAM generator 1506 and reflects an output OAM wave 1512 having a particular OAM signature, including the original OAM mode provided by the OAM generator 1506 plus additional OAM modes, associated therewith that depends upon the type of target object 1510 reflecting the signal. The target 1510 may comprise any object such as an aircraft, vehicle or ship.

Figure 27:
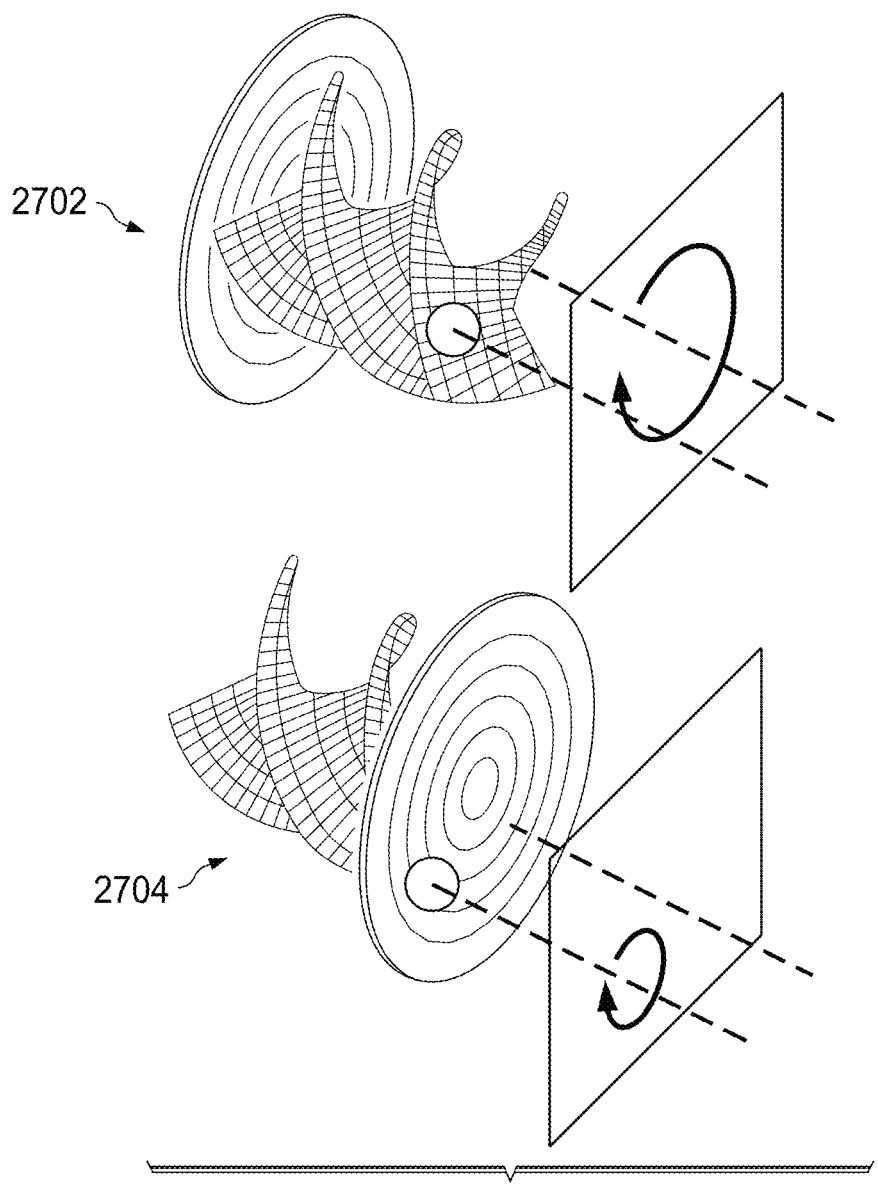
FIG. 27 illustrates the manner in which orbital angular momentum interacts with a molecule around its beam axis.

The orbital angular momentum within the beams provided to the target 1510 may be transferred from light to matter molecules depending upon the rotation of the matter molecules. When a circularly polarized laser beam with a helical wave front traps a molecule in an angular ring of light around the beam axis, one can observe the transfer of both orbital and spin angular momentum. The trapping is a form of optical tweezing accomplished without mechanical constraints by the ring's intensity gradient. The orbital angular momentum transferred to the molecule makes it orbit around the beam axis as illustrated at 2702 of FIG. 27. The spin angular momentum sets the molecule spinning on its own axis as illustrated at 2704.

The reflected OAM wave 1512 from the target 1510 will have the original orbital angular momentum transmitted toward the target plus multiple other orbital angular momentums that are different from the original orbital angular momentum provided on the input OAM wave 1508. The difference additional OAM modes/values in the output OAM wave 1512 will depend upon the type of target 1510. Differing targets 1510 will have unique orbital angular momentums associated therewith in addition to the original orbital angular momentums. Thus, by analyzing the particular orbital angular momentum signature associated with the reflected OAM wave 1512, determinations may be made of the type of target 1510.

Figure 28:
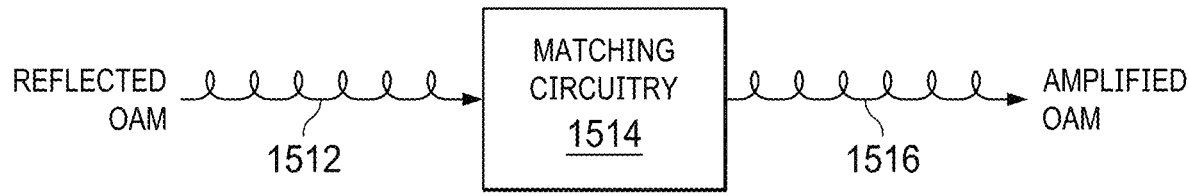
FIG. 28 illustrates a block diagram of the matching circuitry for amplifying a received orbital angular momentum signal.

Referring now to FIG. 28, the matching module 1514 receives the reflected orbital angular momentum wave 1512 from the target 1510 that has a particular signature associated therewith based upon the orbital angular momentum imparted to the waves reflected by the target 1510. The matching module 1514 amplifies the particular orbital angular momentum of interest in order to provide an amplified wave having the desired orbital angular momentums of interest 1516 amplified. The matching module 1514 may comprise a matching aperture that amplifies the detection orbital angular momentum associated with a specific material or characteristic that is under study or object being detected. The matching module 1514 may in one embodiment comprise a holographic filter such as that described with respect to FIGS. 18A-18D in order to amplify the desired orbital angular momentum wave of interest. The matching module 1514 is established based upon a specific material of interest that is trying to be detected by the system. The matching module 1514 may comprise a fixed module using holograms as illustrated in FIGS. 18A-18D or a tunable module in a manner similar to that discussed with respect to the OAM generation module 1506. In this case, a number of different orbital angular momentums could be amplified by the matching module in order to determine target 1510. Other examples of components for the matching module 1514 include the use of quantum dots, nanomaterials or metamaterials in order to amplify any desired orbital angular momentum values within a received wave form from the target 1510.

Figure 29:
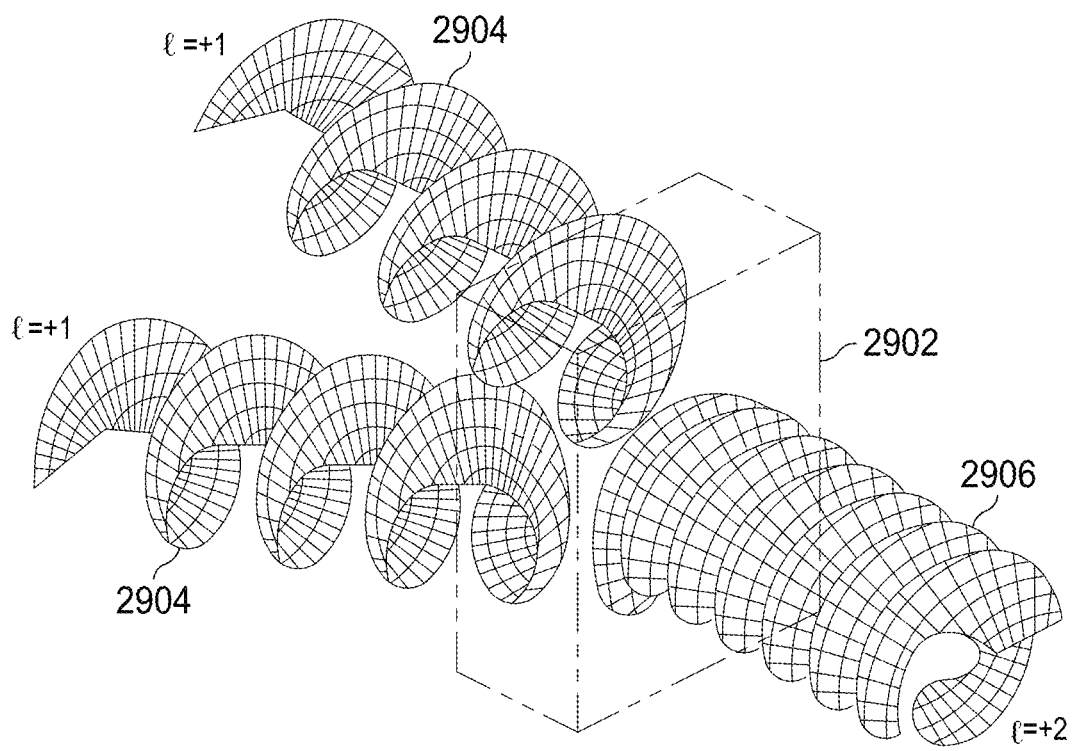
FIG. 29 illustrates the manner in which the matching module may use non-linear crystals in order to generate a higher order orbital angular momentum beam.

Referring now to FIG. 29, the matching module 1514 rather than using holographic images in order to amplify the desired orbital angular momentum signals may use non-linear crystals in order to generate higher orbital angular momentum light beams. Using a non-linear crystal 2902, a first harmonic orbital angular momentum beam 2904 may be applied to a non-linear crystal 2902. The non-linear crystal 2902 will create a second order harmonic signal 2906.

Figure 30:
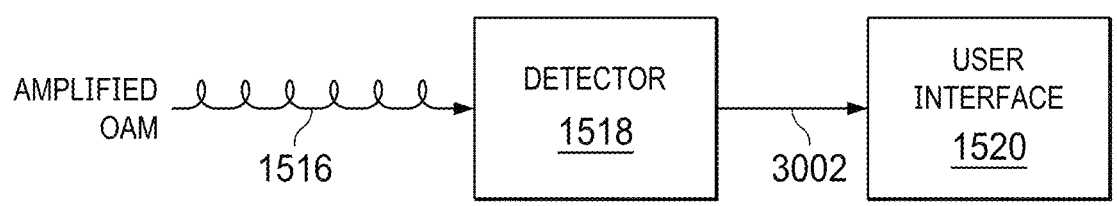
FIG. 30 illustrates a block diagram of an orbital angular momentum detector and user interface.

Referring now to FIG. 30, there is more particularly illustrated the detector 1518 to which the amplified orbital angular momentum wave 1516 from the matching circuit 1514 in order that the detector 1518 may extract desired OAM measurements 2602. The detector 1518 receives the amplified OAM waves 1516 and detects and measures observable changes within the orbital angular momentum modes of the reflected waves due to the type of target 1510. The detector 1518 is able to measure observable changes within the reflected amplified OAM wave 1516 from the state of the input OAM wave 1508 applied to the target 1510 or the presence of a particular target 1510. The extracted OAM measurements 3002 are applied to the user interface 1520. The detector 1518 includes an orbital angular momentum detector for determining a profile of orbital angular momentum states of the orbital angular momentums within the orbital angular momentum signal 1516, and a processor for identifying the target object responsive to the detected profile of the orbital angular momentum states of the orbital angular momentums. The manner in which the detector 1518 may detect differences within the orbital angular momentums is more particularly illustrates with respect to FIG. 31-33.

Figure 31:
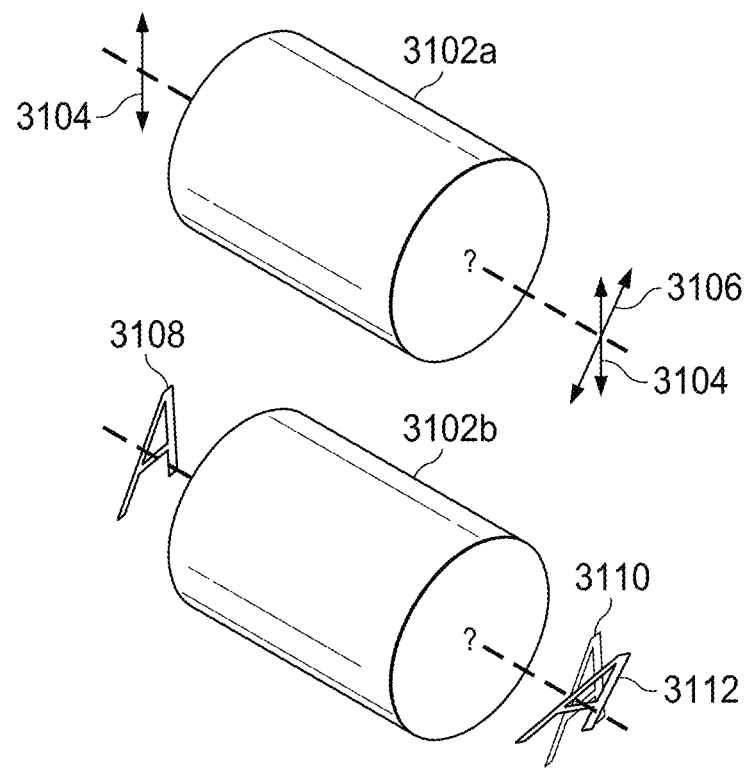
FIG. 31 illustrates the effect of target object reflections upon the spin angular polarization and orbital angular polarization of a beam reflecting from a target object.

FIG. 31 illustrates the difference in impact between spin angular polarization and orbital angular polarization due to a beam reflected from a target 3102. In target 3102a, there is illustrated the manner in which spin angular polarization is altered responsive to a beam passing through or reflecting from the target 3102a. The polarization of a wave having a particular spin angular momentum 3104 passing reflecting from the target 3102a will rotate from a position 3104 to a new position 3106. The rotation occurs within the same plane of polarization. In a similar manner, as illustrated with respect to target 3102b, an image appears as illustrated generally at 3108 before it reflects from the target 3102b. Upon reflecting from the target 3102b, the image will rotate from the position illustrated at 3110 to a rotated position illustrated at 3112. The amount of rotation is dependent upon the type of target associated with the target 3102. Thus, as can be seen with respect to the target 3102 of FIG. 31, both the spin angular polarization and the orbital angular momentum will change based upon the type of target 3102. By measuring the amount of rotation of the image caused by the change in orbital angular momentum, the target type may be determined.

Figure 32:
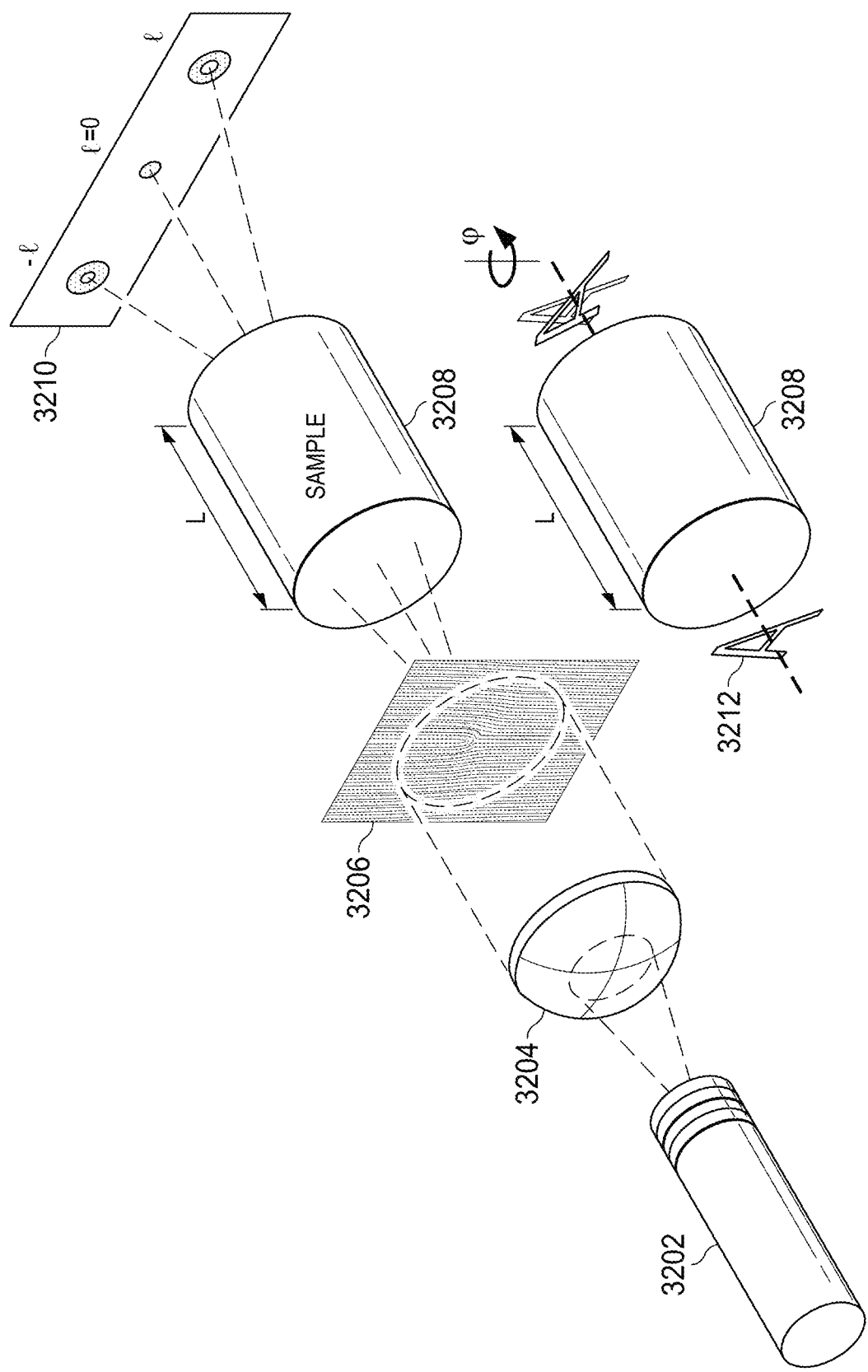
FIG. 32 more particularly illustrates the process that alters the orbital angular momentum polarization of a beam reflecting from a target object.

This overall process can be more particularly illustrated in one embodiment in FIG. 32. A light source 3202 shines a light beam through expanding optics 3204. The expanded light beam is applied through a metalab generated hologram 3206 that imparts an orbital angular momentum to the beam. The twisted beam from the hologram 3206 is shined through or reflected from a target 3208 having a particular length L. This causes the generation of a twisted beam on the reflection from the target 3208 to create a number of detectable waves having various orbital angular momentums 3210 associated therewith. The image 3212 associated with the light beam that is applied to target 3208 will rotate an angle φ depending upon the presence and concentration of the material within or type of the target 3208. The rotation φ of the image 3212 is different for each value orbital angular momentum −1 or +1. The change in rotation of the image Δφ may be described according to the equation:

$$\Delta\varphi = \varphi_1 - \varphi_{-1} = f(l, L, C)$$

Where l is orbital angular momentum number, L is the path length of the sample and C is the concentration of the material being detected.

Thus, since the length of the sample L is known and the orbital angular momentum may be determined using the process described herein, these two pieces of information may be able to calculate a concentration of the material within the provided sample.

Figure 33:
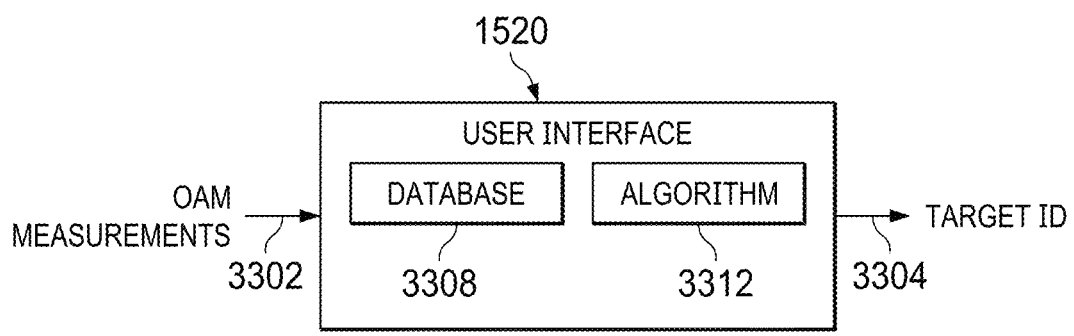
FIG. 33 provides a block diagram of a user interface of the system of FIG. 15.

The above equation may be utilized within the user interface more particularly illustrated in FIG. 33. The user interface 1520 processes the OAM measurements 3302 using an internal algorithm 3312 and a database of signatures 3308 that provides for the generation of target identity information 3304 that may be displayed in some type of user display. The algorithm would in one embodiment utilize that equation described herein above in order to identify the target based upon the detected variations in orbital angular momentums.

The QLO transmission and reception system can be designed to have a particular known overlap between symbols. The system can also be designed to calculate the overlaps causing ISI (symbol overlap) and ILI (layer overlay). The ISI and ILI can be expressed in the format of a NM*NM matrix derived from a N*NM matrix. N comprises the number of layers and M is the number of symbols when considering ISI. Referring now to FIG. 34, there is illustrated a fixed channel matrix $H_{yx}$, which is a N*NM matrix. From this we can calculate another matrix which is $H_{yx}$ which is a NM*NM matrix. The ISI and ILI can be canceled by (a) applying a filter of $H_{yx}^{-1}$ to the received vector or (b) pre-distorting the transmitted signal by the SVD (singular value decomposition) of $H_{yx}^{-1}$. Therefore, by determining the matrix $H_{xy}$ of the fixed channel, the signal may be mathematically processed to remove ISL and ILI.

When using orthogonal functions such as Hermite Guassian (HG) functions, the functions are all orthogonal for any permutations of the index if infinitely extended. However, when the orthogonal functions are truncated as discussed herein above, the functions become pseudo-orthogonal. This is more particularly illustrated in FIG. 35. In this case, orthogonal functions are represented along each of the axes. At the intersection of the same orthogonal functions, functions are completely correlated and a value of "1" is indicated. Thus, a diagonal of "1" exists with each of the off diagonal elements comprising a "0" since these functions are completely orthogonal with each other. When truncated HG choose functions are used the 0 values will not be exactly 0 since the functions are no longer orthogonal but are pseudo-orthogonal.

However, the HG functions can be selected in a manner that the functions are practically orthogonal. This is achieved by selecting the HG signals in a sequence to achieve better orthogonality. Thus, rather than selecting the initial three signals in a three signal HG signal sequence (P0 P1 P2), various other sequences that do not necessarily comprise the first three signals of the HG sequence may be selected as shown below.

| | |
|---|---|
| P0 P1 P4 | P0 P3 P6 |
| P0 P1 P6 | P0 P4 P5 |
| P0 P2 P3 | P0 P5 P6 |
| P0 P2 P5 | P1 P3 P6 |
| P0 P3 P4 | P2 P5 P6 |

Similar selection of sequences may be done to achieve better orthogonality with two signals, four signals, etc.

The techniques described herein are applicable to a wide variety of communication band environments. They may be applied across the visible and invisible bands and include RF, Fiber, Freespace optical and any other communications bands that can benefit from the increased bandwidth provided by the disclosed techniques.

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of $\ell$ 1 and $\ell$ 2, respectively:

$$U_l(r;\theta,z) = A_1(r,\exp(i\ell\theta)) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } \ell_1 \neq \ell_2 \\ A_1 A_2^* & \text{if } \ell_1 = \ell_2 \end{cases} \quad (13)$$

There are two different ways to take advantage of the distinction between OAM beams with different $\ell$ states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

Figure 36:
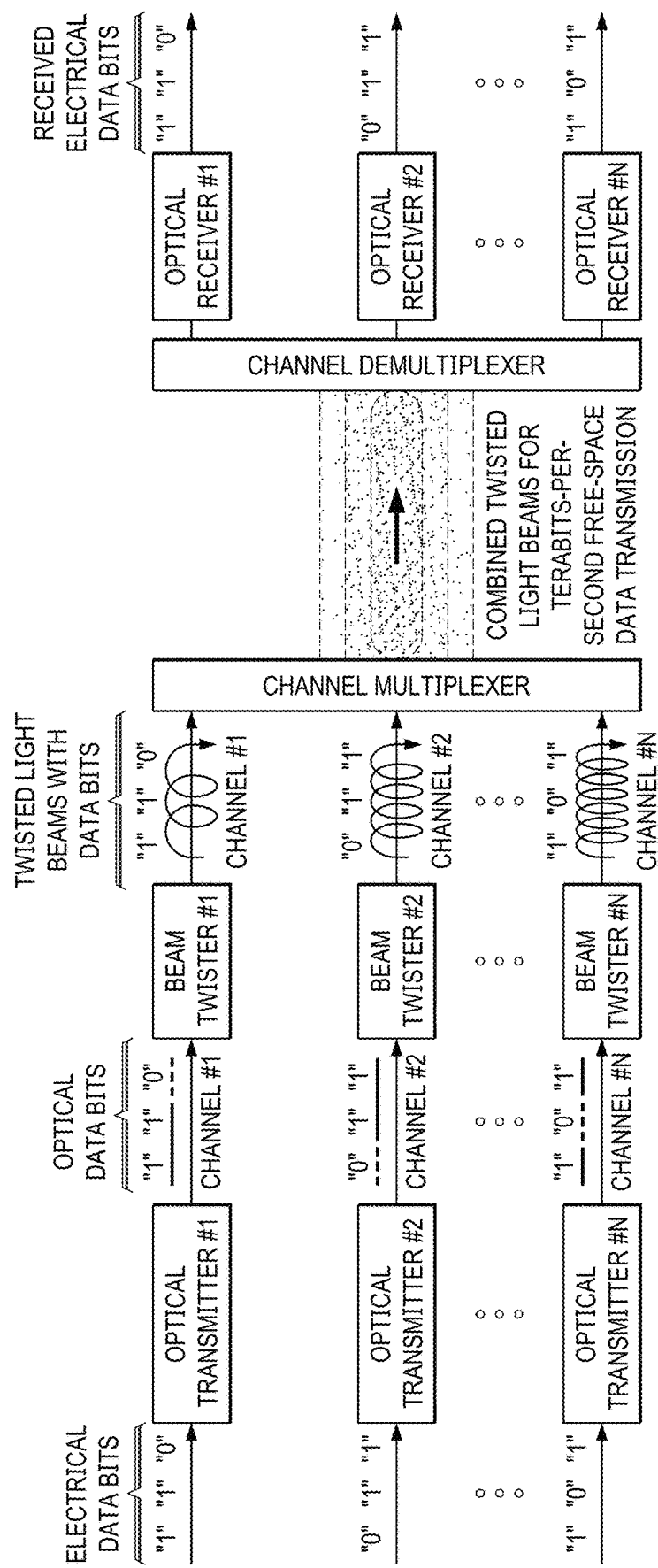
FIG. 36 illustrates a typical OAM multiplexing scheme.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 36. An obvious benefit of OAM multiplexing is the improvement in system spectral efficiency, since the same bandwidth can be reused for additional data channels.

OAM Beam Generation and Detection

Many approaches for creating OAM beams have been proposed and demonstrated. One could obtain a single or multiple OAM beams directly from the output of a laser cavity, or by converting a fundamental Gaussian beam into an OAM beam outside a cavity. The converter could be a spiral phase plate, diffractive phase holograms, metamaterials, cylindrical lens pairs, q-plates or fiber structures. There are also different ways to detect an OAM beam, such as using a converter that creates a conjugate helical phase, or using a plasmonic detector.

Mode Conversion Approaches

Figure 37:
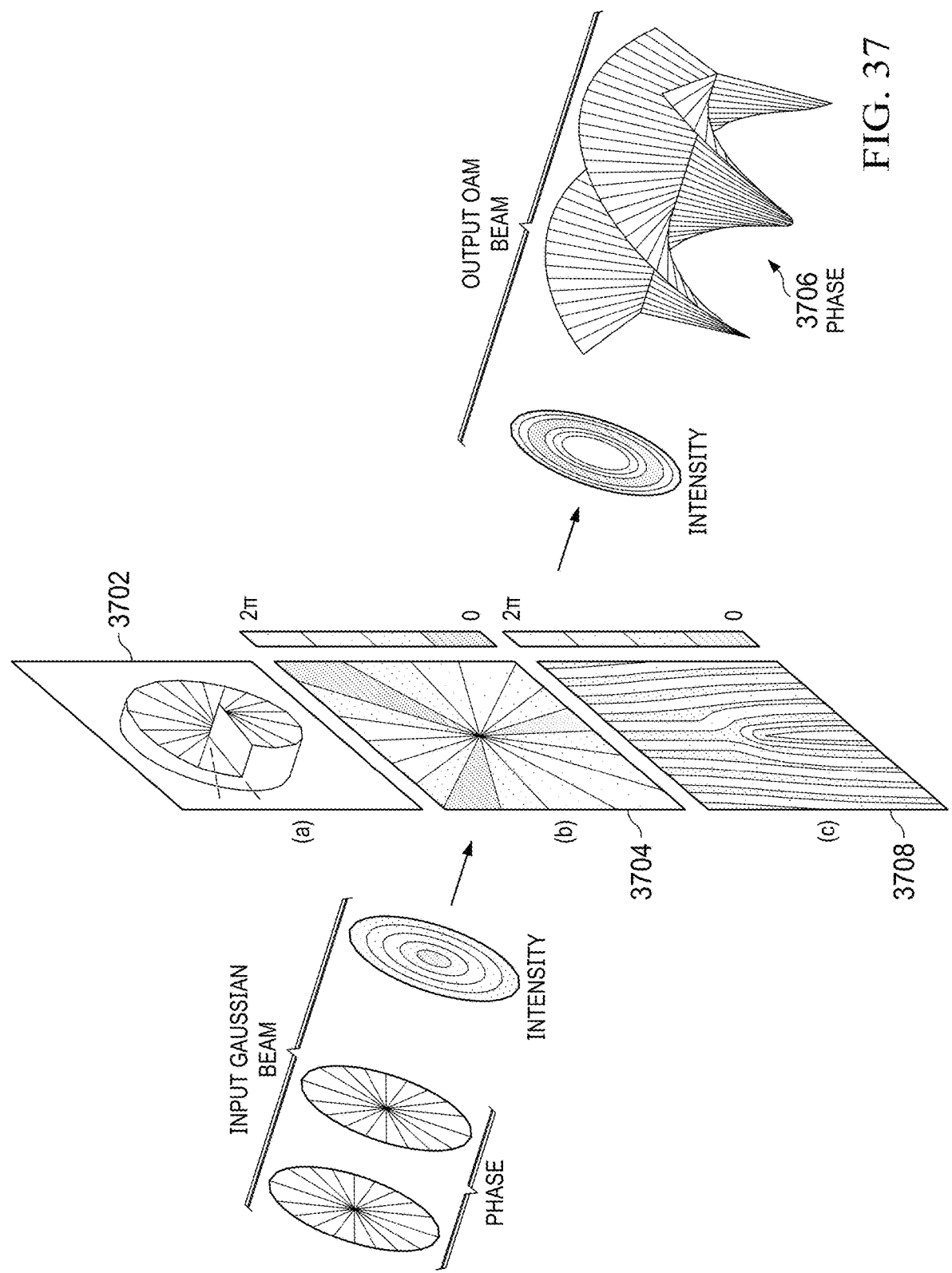
FIG. 37 illustrates various manners for converting a Gaussian beam into an OAM beam.

Referring now to FIG. 37, among all external-cavity methods, perhaps the most straightforward one is to pass a Gaussian beam through a coaxially placed spiral phase plate (SPP) 3702. An SPP 3702 is an optical element with a helical surface. To produce an OAM beam with a state of $\ell$, the thickness profile of the plate should be machined as $\ell\lambda\theta/2\pi(n-1)$, where n is the refractive index of the medium. A limitation of using an SPP 3702 is that each OAM state requires a different specific plate. As an alternative, reconfigurable diffractive optical elements, e.g., a pixelated spatial light modulator (SLM) 3704, or a digital micro-mirror device can be programmed to function as any refractive element of choice at a given wavelength. As mentioned above, a helical phase profile $\exp(i\ell\theta)$ converts a linearly polarized Gaussian laser beam into an OAM mode, whose wave front resembles an $\ell$-fold corkscrew 3706, as shown at 3704. Importantly, the generated OAM beam can be easily changed by simply updating the hologram loaded on the SLM 3704. To spatially separate the phase-modulated beam from the zeroth-order non-phase-modulated reflection from the SLM, a linear phase ramp is added to helical phase code (i.e., a "fork"-like phase pattern 3708 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

Figures 35, 40:
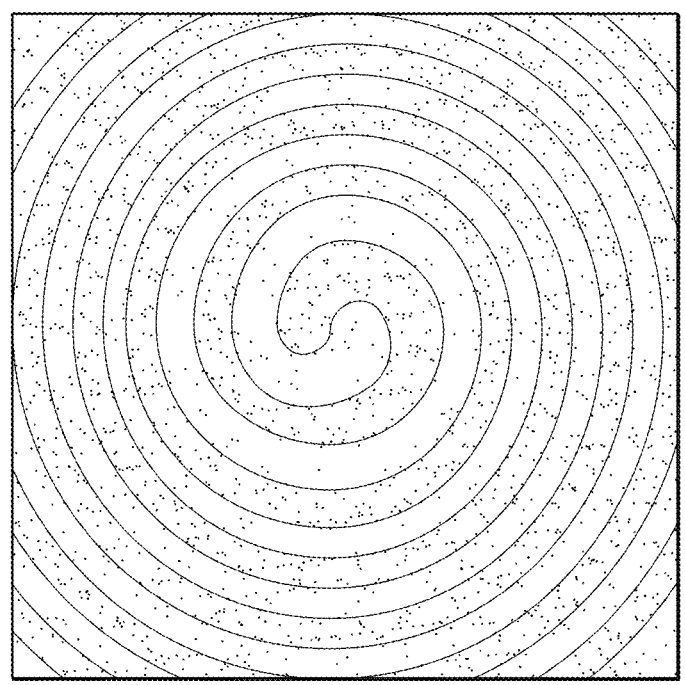
FIG. 35 illustrates truncated orthogonal functions.
FIG. 40 illustrates an OAM beam generated using the phase plate with $\ell=+1$.
Figure 38:
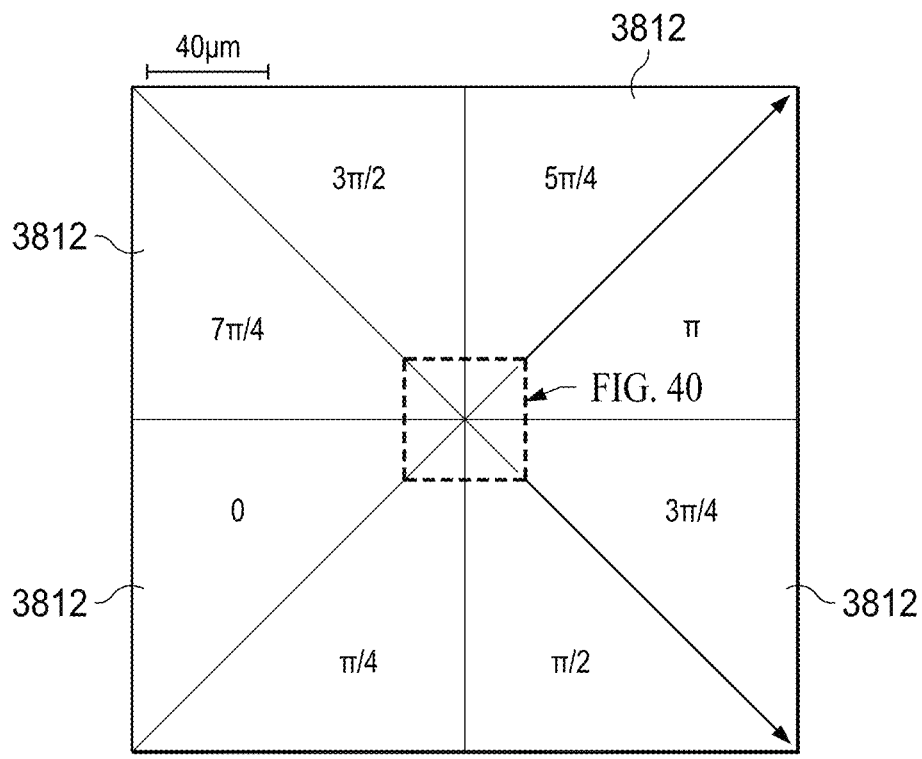
FIG. 38 illustrates a fabricated metasurface phase plate.
Figure 39:
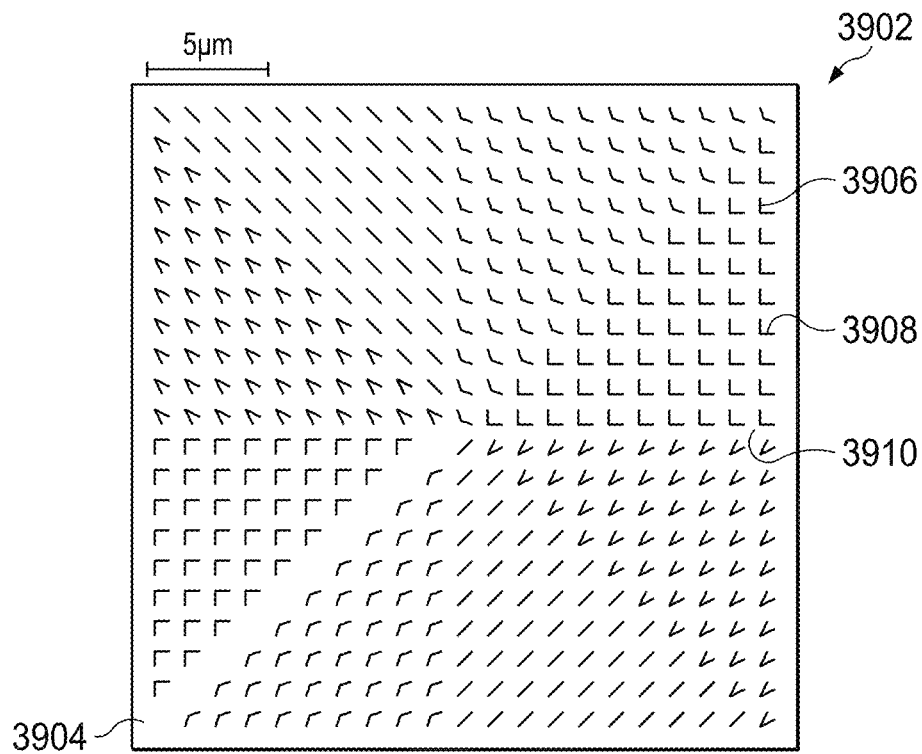
FIG. 39 illustrates a magnified structure of the metasurface phase plate.

Some novel material structures, such as metal-surface, can also be used for OAM generation. A compact metal-surface could be made into a phase plate by manipulation of the structure caused spatial phase response. As shown in FIGS. 38 and 39, a V-shaped antenna array 3902 is fabricated on the metal surface 3904, each of which is composed of two arms 3906, 3908 connected at one end 3910. A light reflected by this plate would experience a phase change ranging from 0 to 2n, determined by the length of the arms and angle between two arms. To generate an OAM beam, the surface is divided into 8 sectors 3812, each of which introduces a phase shift from 0 to $7\pi/4$ with a step of $\pi/4$. The OAM beam with $\ell=+1$ is obtained after the reflection, as shown in FIG. 40.

Referring now to FIG. 41A there is illustrated an example of a system whereby unique signatures provided by correlation matrices may be used for detecting an object such as an aircraft, ship, vehicle, tank or other item based upon a unique reflection of an OAM process beam from the transmitting antenna that is reflected from the object 4102 to a receiving antenna. Initially, in a similar manner to that described previously an OAM beam generator 4104 generates a beam for transmission by a radar transmitter 4106. The OAM beam generator may provide for the generation of an RF beam, and optical beam or another type of OAM process beam that may be transmitted by a radar transmitter 4106. The radar transmitter 4106 transmits the beam toward the object 4102 that is being monitored. The radar transmitter 4106 may transmit for example an RF beam utilizing multilevel patch antennas such as those described in U.S. patent application Ser. No. 15/926,087 entitled PATCH ANTENNA FOR WAVE AGILITY, filed on Mar. 20, 2018, which is incorporated herein by reference in its entirety.

The transmitted beam 4108 travels from the radar transmitter 4106 to reflect off of the object 4102. This creates a return beam 4110 that is received by a radar receiver 4112 located at a same or different location as the radar transmitter 4106. The reflected beam 4110 will include a different structure than that of the transmitted beam 4108, and a detector 4114 compares the reflected beam 4110 with a variety of beam signatures 4116 having multiple, different OAM values therein in order to determine a type of the detected object and provided an output 4118 with respect thereto. Depending upon the type of object 4102 the detected object 4118 will have a unique signature associated there with that may be identified based upon the signature stored within the database 4160.

This is more generally illustrated in FIG. 40B an operation of the type of the type of detection system described with respect to FIG. 41A. The pure state of the transmitted beam illustrated generally at 4120 has a pure OAM transmission state of l=3. A radar transmitter 4106 transmits the OAM pure state beam toward a target such as an aircraft 4122. The aircraft 4122 reflects the beam back in the radar site 4121 that would include the original OAM state and a different number of OAM states as illustrated generally at 4124. The received signature of multiple OAM states may be compared with the various signatures within the database 4116 to identify the type of aircraft 4122 that has been detected.

Figure 41C:
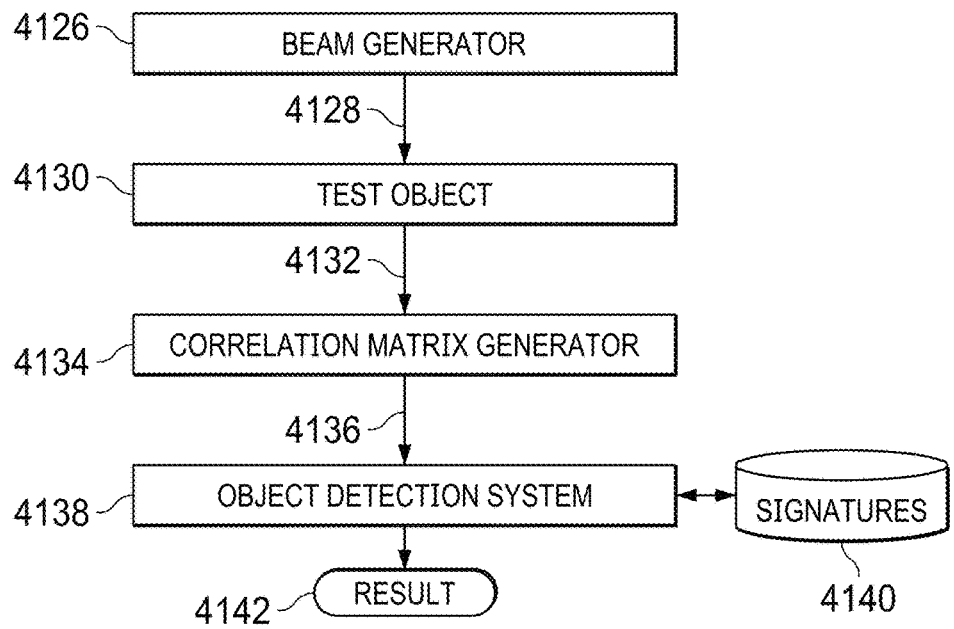
FIG. 41C illustrates a system for generating a unique identifier using correlation matrices.

Referring now to FIG. 41C, there is illustrated a system for generating a unique identifier for an object detected from a radar reflection using a pair of correlation matrixes. Reflection of an OAM processed RF or optical beam causes changes in characteristics of a beam reflected from a target and these characteristics can be detected using intensity matrices of different wavelengths to use as unique identifiers. A beam generator 4126 is used for generating an RF or optical beam 4128 having a variety of wavelengths applied thereto for transmission toward an object under test 4130. Upon reflecting from the test object 4130, a reflected beam 4132 having unique characteristics applied thereto by interaction with the test object 4130 is processed by correlation matrix generation circuitry 4134. The correlation matrix generation circuitry 4134 will be more fully described hereinbelow. The correlation matrix generation circuitry 4134 generates a pair of correlation matrices 4136 that are provided to an object detection system 4138. The object detection system 4138 utilizes a generated matrix associated with the object 4130 along with a plurality of stored signatures within a signature database 4140 to provide a more unique determination of the object 4130. Responsive to the comparison of the correlation matrix 4136 with the variety of signatures within the database 4140, object detection system 4138 may provide a result 4192 that indicates the identified object (aircraft type, ship type, vehicle type, etc.) determined with respect to the object 4130.

Figure 42:
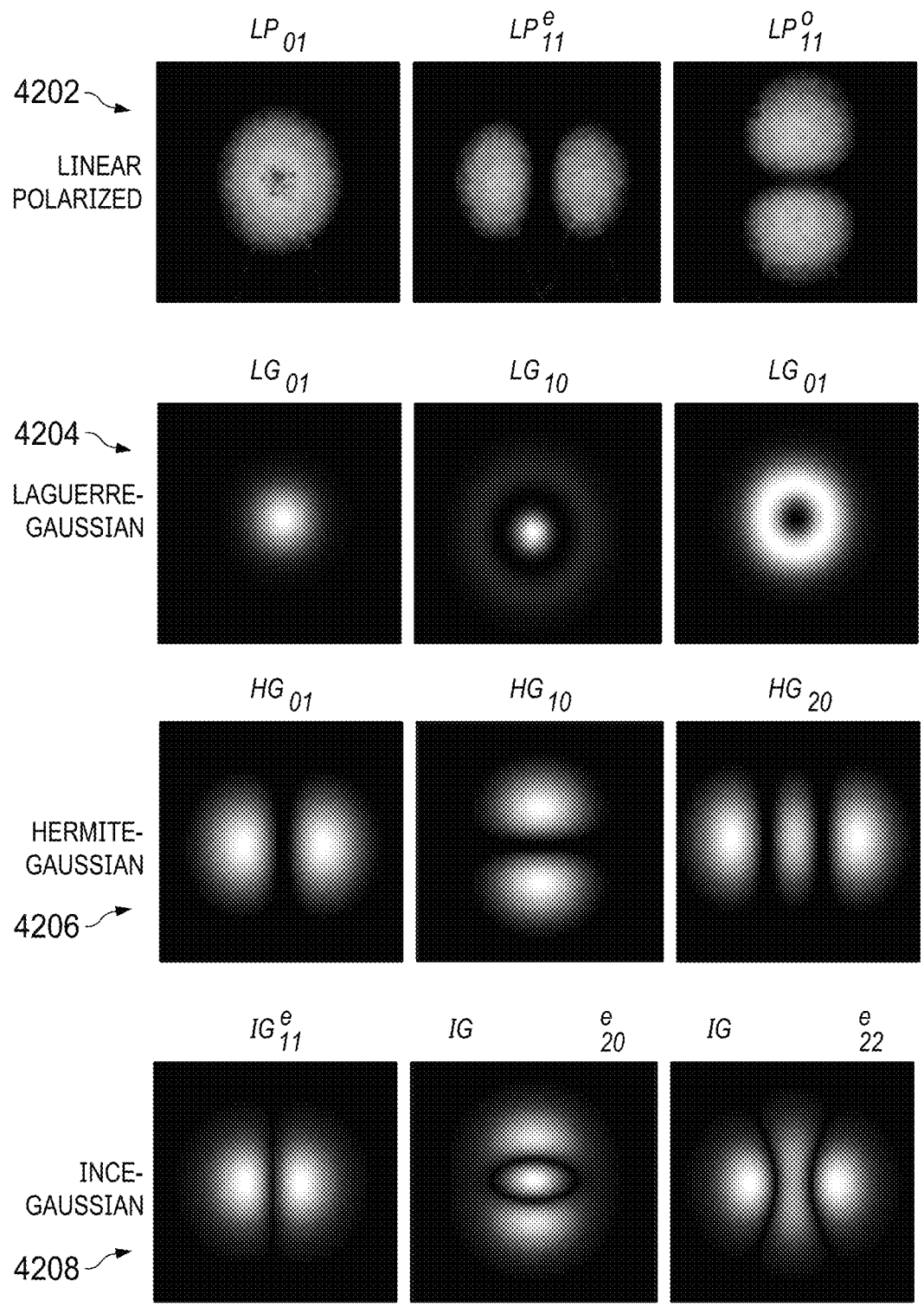
FIG. 42 illustrates intensity diagrams for various beam topologies on OAM states of a reflection.

The general process for the generation of correlation matrices by the correlation matrix generation circuitry 4110 is described more particularly with respect to FIGS. 42-52. Referring now to FIG. 42, there are illustrated intensity diagrams for various different types of beam topologies transmitted by a radar transceiver. Row 4202 illustrates linearly polarized signals transmitted from a radar transceiver for various modes. Row 4204 illustrates intensity diagrams for Laguerre-Gaussian signals for $LG_{01}$ mode, $LG_{10}$ mode and $LG_{01}$ mode. Row 4206 illustrates the intensity diagrams for Hermite-Gaussian signals for $HG_{01}$ mode, $HG_{10}$ mode and $HG_{20}$ mode. Finally, row 4208 illustrates the intensity diagrams for Ince-Gaussian beams in $IG_{11}$ mode, $IG_{20}$ mode and $IG_{22}$ mode.

Figure 43:
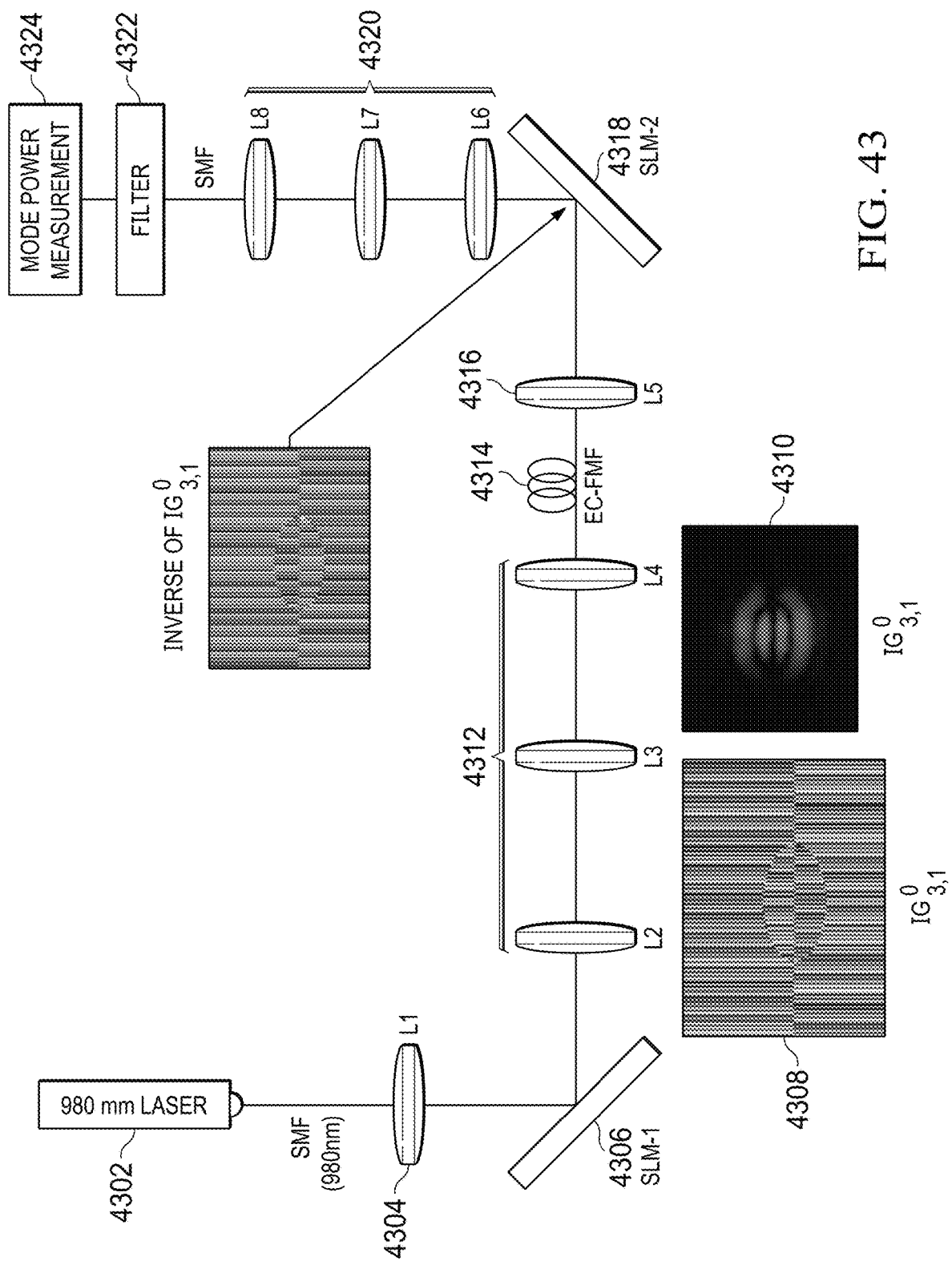
FIG. 43 illustrates a measurement technique for generating a mode crosstalk matrix.
Figures 44, 45:
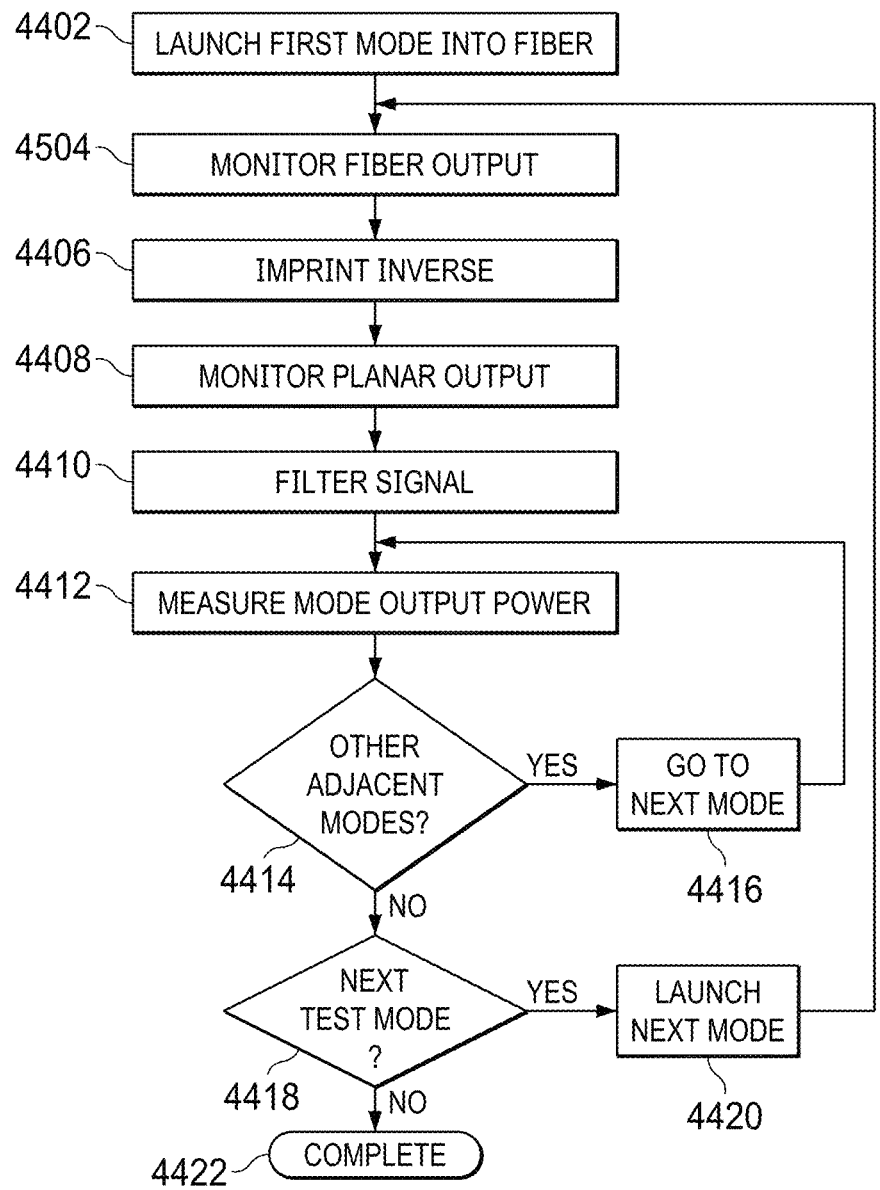
FIG. 44 illustrates a flow diagram of the process for performing the measurement technique using a mode crosstalk matrix.
FIG. 45 illustrates a generated single row of the mode crosstalk matrix.

A mode crosstalk matrix provides an illustration of the relative amount of energy scattered into adjacent modes of a reflected beam that were not launched into a transmitted beam. Referring now to FIG. 43 there is illustrated a measurement technique for generating a mode crosstalk matrix for an optical signal. However, it would be realized that a similar system may be used for generating a matrix for RF signals. FIG. 44 is a flow diagram illustrating the steps of the process. A 980 nm laser 4302 generates a laser signal that is transmitted through a first lens 4304 A first spatial light modulator 4306 utilizes a hologram 4308 to generate a first Ince-Gaussian, Hermite-Gaussian, LaGuerre-Gaussian or other type of orthogonal function processed beam of a first mode having a particular intensity diagram 4310. The generated beam from the SLM 4306 passes through a series of lenses 4312 that focuses and launches the generated beam having a particular mode onto an elliptical core few mode fiber 4314 or other fiber at step 4402 (see FIG. 44). While the present embodiment discloses transmitting the signal through an elliptical core few mode fiber, other types of fibers and communications links may also be tested using the described process to populate a mode crosstalk matrix.

After passing through the fiber 4314, the output of the fiber is monitored at step 4404. The output will comprise a superposition of the various output mode components. Within the monitoring process, the output signal passes through a lens 4316 to a second spatial light modulator (SLM) 4318. For every output mode component to be measured, the SLM 4318 will imprint at step 4406 an inverse of the modes face front onto the output beam from the fiber 4314. The output of the SLM 4318 next passes through a further series of lenses 4320 before being input to a spatial filter 4322. The output mode components from the SLM 4318 to be measured will have a planar face front after the imprinting with the inverse of the Ince-Gaussian, Hermite-Gaussian, LaGuerre-Gaussian or other type of orthogonal function processed beam. The spatial filter 4322 passes the plane wave component and blocks other output mode components within the signal from the SLM 4318 at step 4410. The relative amount of power through the spatial filter 4322 is the amount of the output mode component to be measured at step 4412 by the mode power measurement circuitry 4344. By interrogating each of the adjacent mode components, the mode power measurement circuitry 4324 populates the columns of the mode crosstalk matrix for the fiber or communications link under test for a particular row associated with the mode being transmitted.

Initially, the mode output power for a first of the adjacent modes measured at step 4412 is used to populate a first column of the row associated with the row associated with the mode under test. Each of the columns is associated with one of the adjacent mode components of the mode being transmitted. After storage of the power value for the adjacent mode in the mode crosstalk matrix, inquiry step 4414 determines if there are adjacent modes for test. If so, the measurement circuitry 4324 proceeds to the next adjacent mode at step 4416 and measures at step 4412 the output power for the next adjacent mode at step 4412. After population of the matrix row associated with the current mode being transmitted through the fiber or communications link is determined to be complete at inquiry step 4414, inquiry step 4418 determines if a new mode for test exists. If so, a next mode may be launched at step 4420 into the fiber or communications link under test to complete a next row of the crosstalk matrix. The output associated with this mode is monitored at step 4404. The above process is repeated for each mode to be tested.

FIG. 45 illustrates a generated single row of the mode crosstalk matrix. The mode $HG_{11}$ has been launched into the fiber 4314 (or communications link). The power output is measured for various other adjacent modes to the transmitted mode and the values associated with the adjacent modes are stored in the columns within the row. Thus, the selectively measured output for mode $HG_{00}$ is −23.7, for mode $HG_{01}$ is −21.2, for mode $HG_{10}$ is −18.8, for mode $HG_{02}$ is −17.1 and for mode $HG_{20}$ is −20.9.

Figure 46:
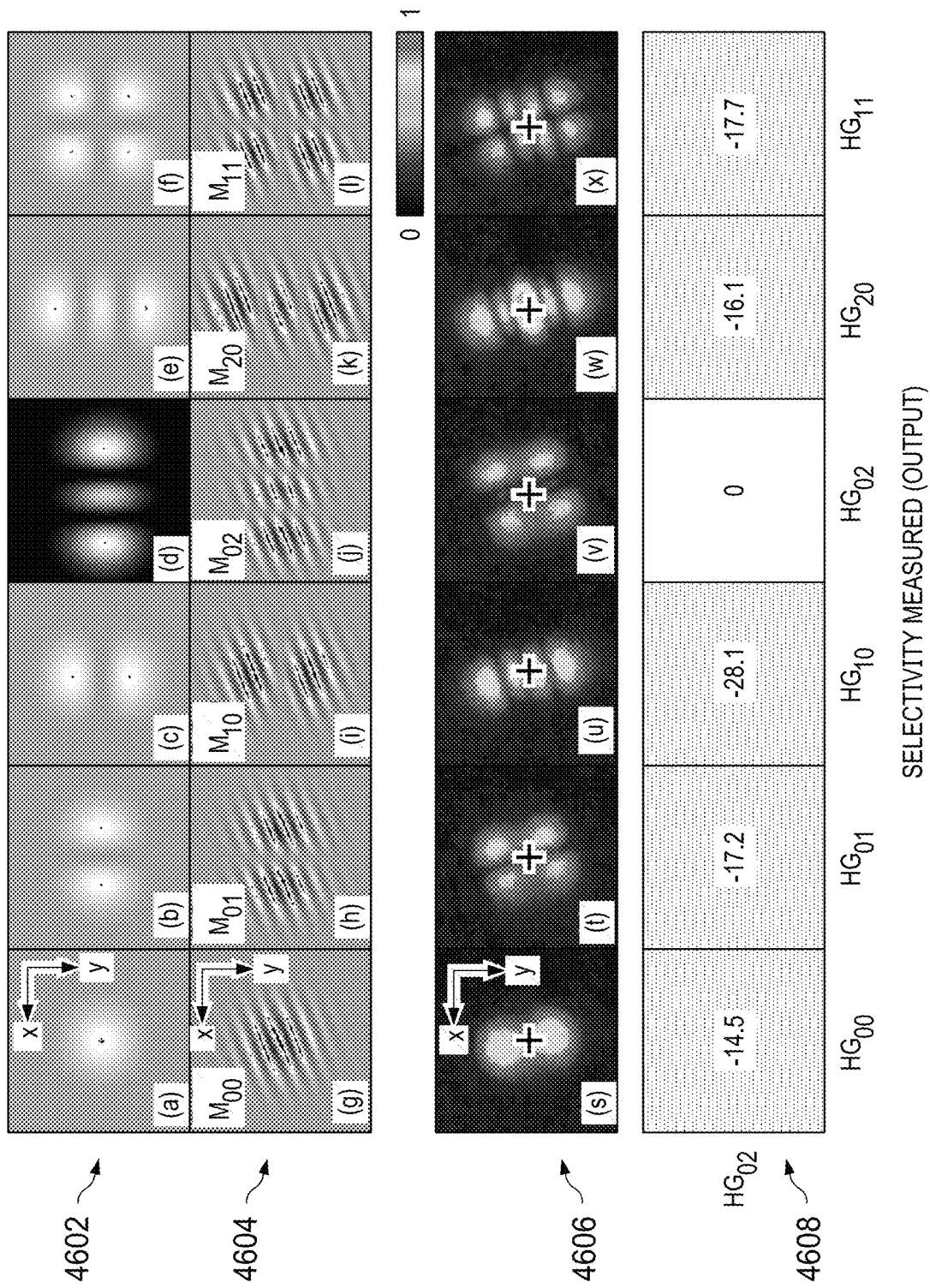
FIG. 46 illustrates the results of a comparison of selected the excited modes from an SLM.

Referring now to FIG. 46, there is illustrated the results for the comparison of each of the selectively excited modes 4602 that are calculated from the first SLM 4306. Each of the modes after passing through the fiber 4314 is measured by set of masks (holograms) 4604 using the second SLM 4318 to yield an associated set of intensity images 4606. For each of the intensity images 4606, the optical power of the light coupled into the fiber is measured using the mode power measurement circuitry 4344. These are represented for the various modes as indicated generally at 4608 from a level of −28.1 dB to −14.5 dB.

Figures 47, 48:
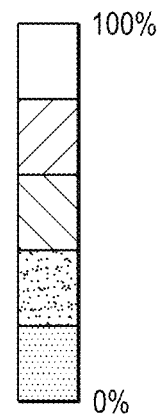
FIG. 47 illustrates a mode crosstalk matrix populated using Hermite-Gaussian modes.
FIG. 48 illustrates a mode crosstalk matrix for Laguerre-Gaussian modes.
Figure 49:
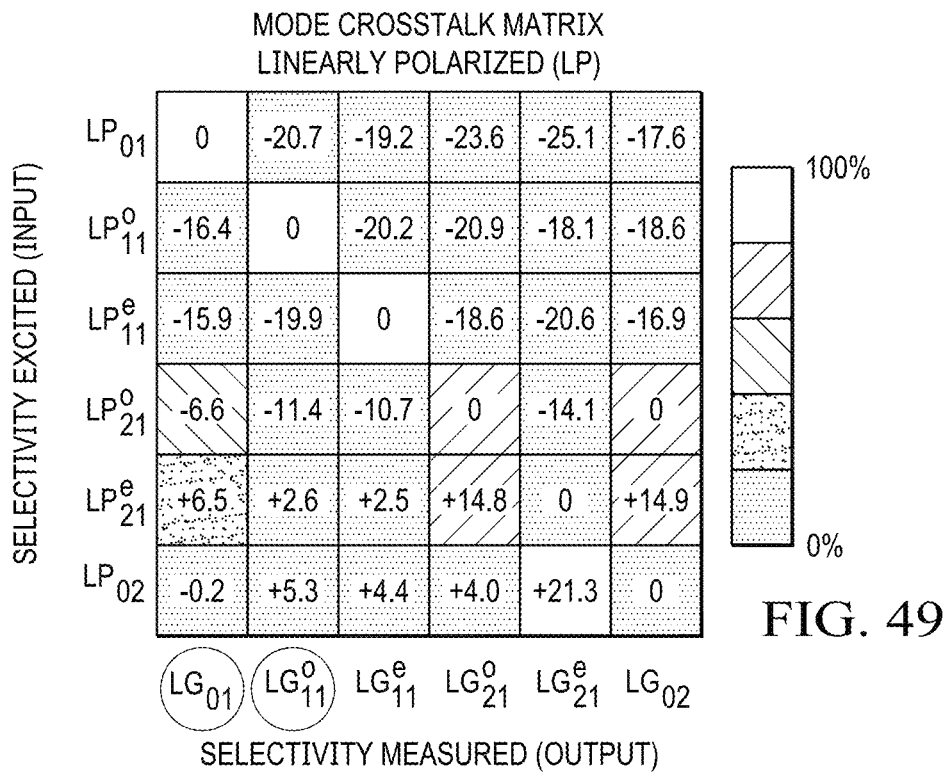
FIG. 49 illustrates a mode crosstalk matrix for linearly polarized modes.
Figure 50:
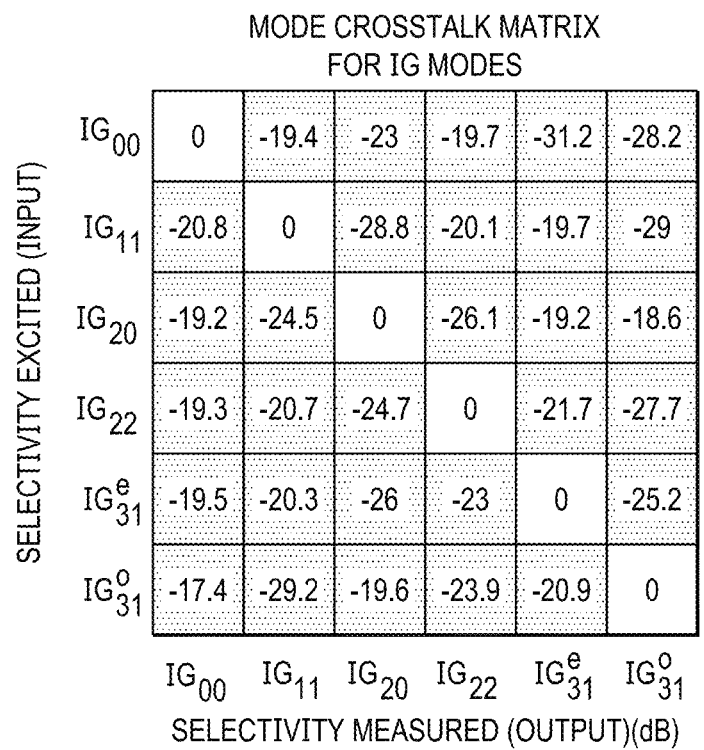
FIG. 50 illustrates a mode crosstalk matrix for Ince-Gaussian modes.

Each of the selectively measured outputs 4608 that are measured may be used to populate a mode crosstalk matrix using Hermite-Gaussian modes as illustrated in FIG. 47. The mode crosstalk matrix 4702 generates the power values for adjacent modes to a transmitted mode for provided input values according to dB→$10 \log_{10} P_{ij}/P_{ii}$ in each row and are measured for each selectively measured output by the spatial light modulator 4318 for a given selectively excited input to the fiber 4314 by the SLM 4306. The rows of the mode crosstalk matrix 4702 comprise the modes selectively excited by the spatial light modulator 4306. The columns of the mode crosstalk matrix 4702 comprise the modes selectively excited by the spatial light modulator 4318. A mode crosstalk matrix for Laguerre-Gaussian modes, linearly polarized modes and Ince-Gaussian modes are illustrated in FIGS. 48, 49 and 50, respectively.

In addition to those various orthogonal function mode techniques discussed hereinabove to which Ince Gaussian functions may be applied in a manner similar to that of Hermite Gaussian, Laguerre Gaussian or other types of orthogonal functions, Ince Gaussian orthogonal modes/functions may be applied in a number of other manners. The mode crosstalk matrix with Hermite-Gaussian, Laguerre-Gaussian and Ince-Gaussian spatial orthogonal modes may also be used with WDM and DWDM to determine a number of modes that can be multiplexed together based upon the determined crosstalk as indicated by the mode crosstalk matrix. These further include the use of Ince Gaussian orthogonal modes in fibers to perform phase estimation and carrier recovery, to perform symbol, estimation and clock recovery, to perform decision directed carrier recovery where decoded signals are compared with the closest constellation points or for dealing with amplifier nonlinearity. Ince Gaussian orthogonal modes within a fiber may also be used for adaptive power control, adaptive variable symbol rate and within adaptive equalization techniques.

Figure 51:
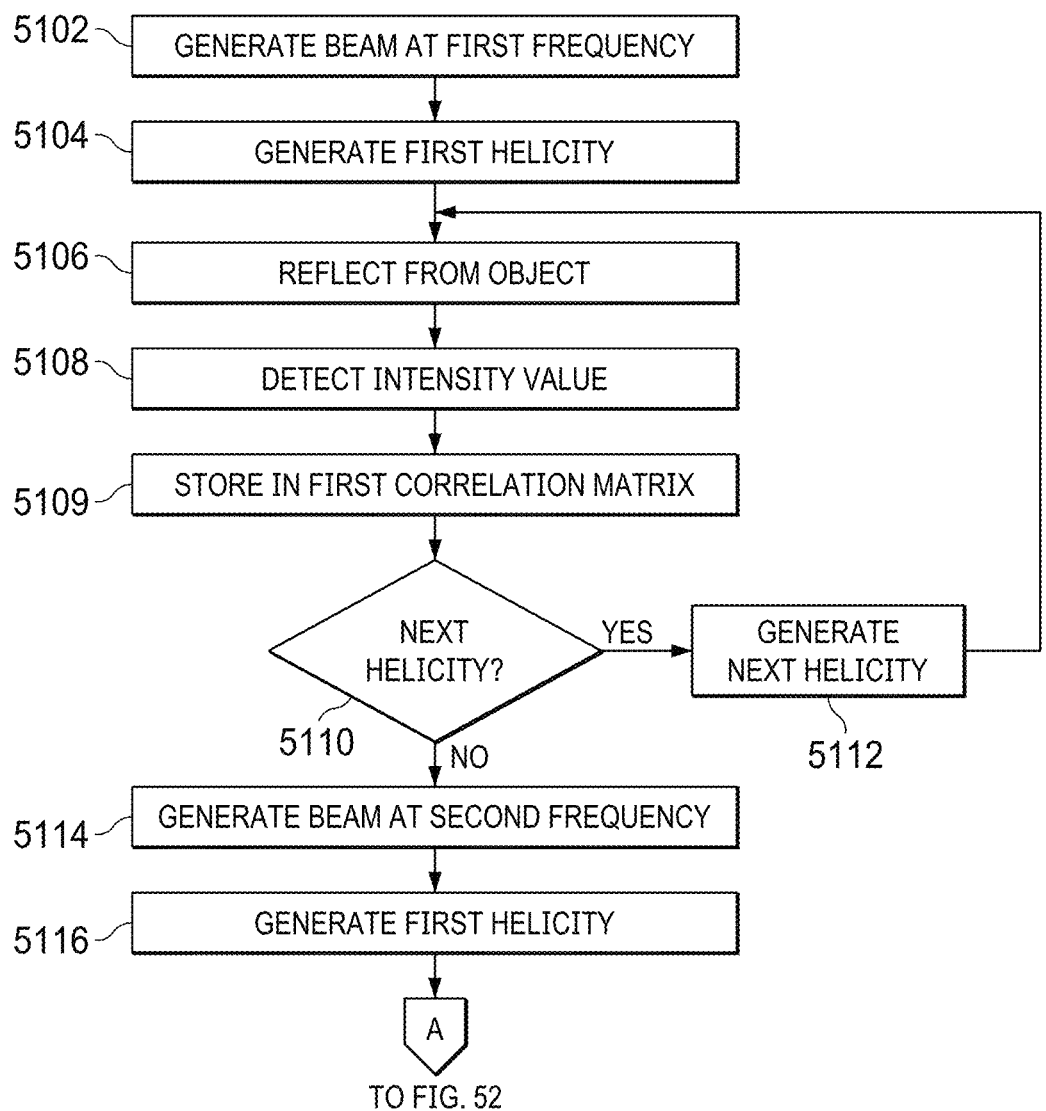
FIGS. 51-52 illustrate a flow diagram of the process for generating a unique identifier for an object.
Figure 52:
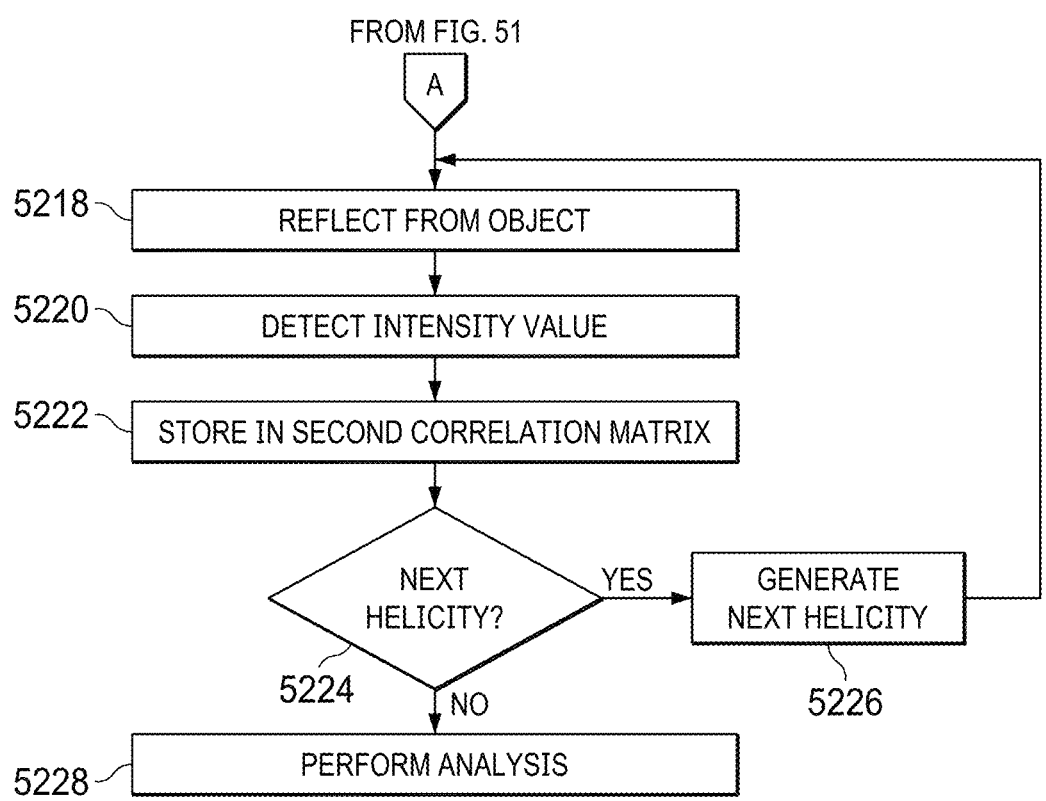

The above describes the process for generating a single correlation matrix. FIGS. 51-52 are a flow diagram illustrating the process for generating a unique identifier of an object using first and second correlation matrices generated using RF or light beams at first and second wavelengths with the above described techniques. The beam generator 9602 generates at step 5102 a beam at a first wavelength. The beam generator 9602 additionally generates and applies a first helicity to the RF or light beam at step 5104. While the present discussion envisions the application of differing helicity using differing Hermite Gaussian functions to the light beam, it should be realized that other types of orthogonal functions such as Laguerre Gaussian, Ince Gaussian, etc. described hereinabove may also be applied to the light beam at the first wavelength. The generated RF or light beam is reflected at step 5106 off of the object 9606 in order to generate an object affected RF or light beam 9608. The intensity of the RF or light beam 9608 from the sample is detected at step 5108 using the correlation matrix generation circuitry 9610. The detected intensity value is stored at step 5109 by the correlation matrix generation circuitry 9610 at an entry in a first correlation matrix as described above. Inquiry step S110 determines if a further helicity exist to be applied to the light beam in order to fill another entry within the correlation matrix. If further helicity values exist, control passes to step 5112 to generate a next helicity which is applied to the RF or light beam and transmitted through the sample at step 5106.

If inquiry step 5110 determines that there are no further helicity values to apply to the RF or light beam for population of another row within the correlation matrix, control passes to step 5114 wherein a next RF or light beam is generated at a second wavelength. The first helicity is generated again at step 5116 and applied to the RF or light beam at the second wavelength. The newly generated RF or light beam is reflected from the object at step 5118. The object reflected beam is processed to detect intensity value of the beam at step 5120, and the detected intensity value is stored within a second correlation matrix associated with the second wavelength at step 5122. Inquiry step 5124 determines if additional helicity values exist to be applied to the light beam at the second wavelength and if so, the light beam having the next helicity applied thereto is generated at step 5126 and control passes back to step 5118 reflect the beam from the sample. If inquiry step 5124 determines there are no further helicity values available and the correlation matrix has been fully populated for the light beam at the second frequency, control passes to step 5128 to perform an analysis based upon the two generated correlation matrices as will be more fully described with respect to FIG. 53.

Figure 53:
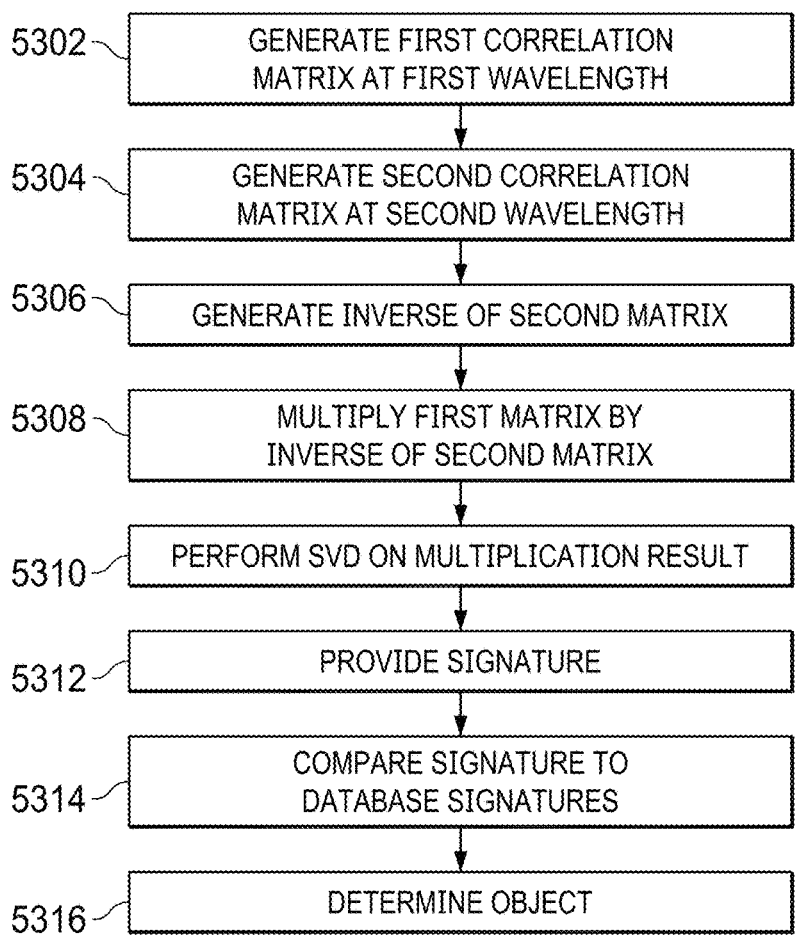
FIG. 53 illustrates a flow diagram describing the process for utilizing first and second correlation matrices to identify a target object.

FIG. 53 illustrates a flow diagram describing the process for utilizing the first and second correlation matrices generated with respect to FIGS. 51-52 for creating a unique identifier signature for the object being detected. Initially at steps 5302 and 5304, the first and second correlation matrices are generated at first and second wavelengths as has been previously described with respect to FIGS. 51A-51B. Referring now to FIGS. 54 and 55 there are illustrated first and second correlation matrices that have been generated at two different wavelengths. FIG. 54 illustrates the correlation matrix $A_{325}$. This correlation matrix comprises an intensity matrix of an object at a 325 nm wavelength. FIG. 55 illustrates the correlation matrix $B_{355}$. This correlation matrix comprises an intensity matrix of the object at a 355 nm wavelength. The alpha values $\alpha_n$ (intensity values) that are not along the diagonal are crosstalk from other Laguerre Gaussian modes and these values are much smaller than those located on the diagonal.

Once each of the first and second correlation matrices have been created, the inverse of the second matrix is generated at step 5306. The first correlation matrix is multiplied by the inverse of the second correlation matrix at step 5310 in accordance with the equation:

$$C=AB^{-1}$$

The generated matrix C is subjected to a singular value decomposition (SVD) that yields:

$$C=UDV$$

where D is the signature of the molecule under test.

This yields the signature matrix D as shown in FIG. 56. The signature matrix D includes a diagonal having various $\delta_n$ on the diagonal entries of the matrix and zero values within each of the other entries. The diagonal of the matrix D is the signature of the molecule under test and is produced using singular value decomposition on matrix C.

The above described SVD provides the signature generated by the object at step 5312 as described above. The generated signature is compared to the database 9616 of signatures at step 5314 and based upon the comparison an identification of the object is made at step 5316. Each of the signatures in the database 41616 is associated with a particular object such as a plane type, vehicle type, ship type, etc.

The mathematical equations associated with the correlation matrix radar technique are as follows:

$$\rho_i = \frac{P_t}{4\pi R^2} \text{ comprises the incident Power density and}$$

$$\rho_i = \frac{P_t G_t}{4\pi R^2} \text{ is the Gain}$$

The power intercepted by target is defined by following for a plane wave signal and for an OAM signal:

| Plane Wave | OAM | $\sigma = RSS$ |
|---|---|---|
| $\rho_i = \frac{P_t G_t}{4\pi R^2}$ | $\rho_i = \frac{P_t G_t}{4\pi R^2}\cos\theta$ | |
| $\rho_s = \left(\frac{P_t G_t}{4\pi R^2}\right)\sigma\left(\frac{1}{4\pi R^2}\right)$ comprises the Scattered Power density | | |

The scattered power density with respect to a plane wave and OAM may then be determined:

| Plane Wave | OAM |
|---|---|
| $\rho_s = \frac{P_t G_t \sigma}{(4\pi)^2 R^4}$ | $\rho_s = \frac{P_t G_t \sigma}{(4\pi)^2 R^4}\cos\theta$ |

The Antenna Aperture is defined by $$A_e = \frac{G_r \lambda^2}{4\pi} \text{ effective}$$

The Plane wave radar equation is defined by $$P_r = \rho_s A_e = \frac{P_t G_t G_r \lambda^2}{(4\pi)^3 R^4} \sigma$$

The OAM radar equation is defined by $$P_r = \frac{P_t G_t G_r \lambda^2}{(4\pi)^3 R^4} \sigma \cos^2 \theta$$

$$\theta = \tan^{-1} \frac{z}{r}$$

$$\tan \theta = \frac{z}{r}$$

$\rho$ = power density $$P_s = \sigma \rho_i$$

$$\rho_s = \frac{P_s}{4\pi R^2}$$

$$\sigma = \frac{P_s}{\rho_i} = \frac{4\pi R^2 \rho_s}{\rho_i} = 4\pi R^2 \left[\frac{\rho_s}{\rho_i}\right]$$

$\theta_i = \theta_s$ & $\phi_i = \phi_s$ monostatic RCS $\theta_i \neq \theta_s$ & $\phi_i \neq \phi_s$ bistatic RCS $$\sigma_t = \frac{1}{4\pi} \int_{\phi_s=0}^{2\pi} \int_{\theta_s=0}^{\pi} \sigma(\theta_s, \phi_s) \sin\theta_s d\theta_s d\phi_s$$

For polarized plane wave in z-direction, we have:

$$E_x = E_1 \sin(\omega t - kz) \quad k = \frac{2\pi}{\lambda}$$

$$E_y = E_2 \sin(\omega t - kz + \delta) \quad \delta = \text{time phase}$$

$$\vec{E} = \hat{x} E_1 \sin(\omega t - kz) + \hat{y} E_2 \sin(\omega t - kz + \delta)$$

At $z = 0$ $E_x = E_1 \sin\omega t$ $\sin\omega t = \frac{E_x}{E_1}$ $$E_y = E_2 \sin(\omega t + \delta)$$

$$\frac{E_x^2}{E_1^2} - \frac{2 E_x E_y \cos\delta}{E_1 E_2} + \frac{E_y^2}{E_2^2} = (\sin\delta)^2 \neq f(\omega t)$$

In general $\vec{E} = \vec{E_R} + \vec{E_L}$ Right and Left circular polarizations $\vec{E_R} = \vec{E_V} + j\vec{E_H}$ $\vec{E_L} = \vec{E_V} - j\vec{E_H}$ V-H polarizations $$E_R = \frac{E_H - jE_v}{\sqrt{2}}$$

$$E_L = \frac{E_H + jE_v}{\sqrt{2}}$$

Then T $$\begin{bmatrix} E_R \\ E_L \end{bmatrix} = \frac{1}{\sqrt{2}} \begin{bmatrix} 1 & -j \\ 1 & j \end{bmatrix} \begin{bmatrix} E_H \\ E_v \end{bmatrix} \quad E_c = TE_L$$

$$\begin{bmatrix} E_H \\ E_V \end{bmatrix} = \frac{1}{\sqrt{2}} \begin{bmatrix} -j & -j \\ 1 & -1 \end{bmatrix} \begin{bmatrix} E_R \\ E_L \end{bmatrix} \quad E_L = T^{-1} E_c$$

$T^{-1}$

In general for many targets the scattered menus will have different polarization than the incident waves (depolarization) except perfect reflectors.

In general $\begin{bmatrix} E_1^s \\ E_2^s \end{bmatrix} = S \begin{bmatrix} E_1^i \\ E_2^i \end{bmatrix} = \begin{bmatrix} s_{11} & s_{12} \\ s_{21} & s_{22} \end{bmatrix} \begin{bmatrix} E_1^i \\ E_2^i \end{bmatrix}$ Then back scattered RCS $\begin{bmatrix} \sigma_{11} & \sigma_{12} \\ \sigma_{21} & \sigma_{22} \end{bmatrix} = 4\pi R^2 \begin{bmatrix} |s_{11}|^2 & |s_{12}|^2 \\ |s_{21}|^2 & |s_{22}|^2 \end{bmatrix}$ $$\sigma = 4\pi R^2 |S|^2$$

$$\begin{bmatrix} E_H^s \\ E_V^s \end{bmatrix} = \begin{bmatrix} s_{HH} & s_{HV} \\ s_{VH} & s_{VV} \end{bmatrix} \begin{bmatrix} E_H^i \\ E_V^i \end{bmatrix}$$

$$\begin{bmatrix} E_R^s \\ E_L^s \end{bmatrix} = \begin{bmatrix} s_{RR} & s_{RL} \\ s_{LR} & s_{LL} \end{bmatrix} \begin{bmatrix} E_R^i \\ E_L^i \end{bmatrix}$$

Therefore $$\begin{bmatrix} s_{RR} & s_{RL} \\ s_{LR} & s_{LL} \end{bmatrix} = T \begin{bmatrix} s_{HH} & s_{HV} \\ s_{VH} & s_{VV} \end{bmatrix} \begin{bmatrix} 1 & 0 \\ 0 & -1 \end{bmatrix} T^{-1}$$

And $$\begin{bmatrix} s_{HH} & s_{HV} \\ s_{VH} & s_{VV} \end{bmatrix} = T^{-1} \begin{bmatrix} s_{RR} & s_{RL} \\ s_{LR} & s_{LL} \end{bmatrix} \begin{bmatrix} 1 & 0 \\ 0 & -1 \end{bmatrix} T$$

For a sphere $$\frac{\sigma_{sphere}}{\pi r^2} = \left(\frac{j}{Kr}\right) \Sigma (-1)^n (2n+1) \left[\left(\frac{KrJ_{n-1}(Kr) - nJ_n(Kr)}{KrH_{n-1}^{(1)}(Kr) - nH_n^{(1)}(Kr)}\right) - \left(\frac{J_n(Kr)}{H_n^{(1)}(Kr)}\right)\right]$$

Where Hankel function $H_n^{(1)}(Kr) = J_n(Kr) + jY_n(Kr)$

Spherical Bessel of second kind

For $r \gg \lambda$ $\sigma = \pi r^2$ optical

For $r \ll \lambda$ $\sigma = 9\pi r^2 (Kr)^4$ Rayleigh small sphere

Between optical and Rayleigh is oscillatory (Mic or resonance region)

For ellipsoid $$\left(\frac{x}{a}\right)^2 + \left(\frac{y}{b}\right)^2 + \left(\frac{z}{c}\right)^2 = 1$$

$$\sigma = \frac{\pi a^2 b^2 c^2}{[a^2 \sin^2\theta \cos^2\phi + b^2 \sin^2\theta \sin^2\phi + c^2 \cos^2\theta]^2}$$

For $a = b$ symmetric football $$\sigma = \frac{\pi a^4 c^2}{[a^2 \sin^2\theta + c^2 \cos^2\theta]^2} \neq f(\phi)$$

For $a = b = c$ $\sigma = \pi c^2$

For cylinders:

Elliptical cylinder non-normal incident $$\sigma_\theta = \frac{2\pi H^2 r_2^2 r_1^2}{\lambda (r_1^2 \cos^2 \phi + r_2^2 \sin^2 \phi)^{1.5}}$$

Elliptical cylinder normal incdient $$\sigma_{cylinder} = \frac{\lambda r_2^2 r_1^2 \sin\theta}{8\pi \cos^2 \theta \ [r_1^2 \cos^2 \phi + r_2^2 \sin^2 \phi]^{1.5}}$$

For circular cylinder $r_1 = r_2 = r$

Non-normal $\sigma_\theta = \frac{2\pi H^2 r}{\lambda}$ $\sigma = \frac{\lambda r \sin\theta}{8\pi \cos^2 \theta}$ Now for OAM $$E(\rho, \phi, z) = \sum_\ell \sum_P c_{\ell P} E_0 \frac{\omega_0}{\omega(z)} \left[ \frac{\sqrt{2}\rho}{\omega(z)} \right]^\ell$$

$$\mathbb{L}_P^\ell \left[ \frac{\sqrt{2}\rho}{\omega(z)} \right] e^{\frac{-\rho^2}{\omega^2(t)}} e^{-j(2P+\ell+1)\tan^{-1}\frac{z}{z_0}} e^{j\ell\phi} e^{\frac{jk(\rho^2)}{2R(z)}}$$

$E(\rho, \phi, z, t) = E(\rho, \phi, z)e^{j\omega t}$

Now with polarization for a Vector beam with both helicity and polarization
$E_i^{OAM} = E(\rho,\varphi,z)(\alpha_1 \hat{x} \pm i\alpha_2 \hat{y})$ ±L and R circular polarization
$\alpha_1 = 0$ or $\alpha_2 = 0$ linear polarization V and H
$\alpha_1 = \alpha_2 \neq 0$ circular polarization V and H
$\alpha_1 \neq \alpha_2 \neq 0$ elliptical polarization V and H Thus for linear polarization
$E_i^{OAM} = E(\rho,\varphi,z)e^{j\omega t}$ For R-hand circular polarization
$E_i^{OAM} = E(\rho,\varphi,z)e^{j\omega t}[\hat{x}+i\hat{y}]$ For L-hand circular polarization $E_i^{OAM} = E(\rho, \phi, z)e^{j\omega t}[\hat{x} - i\hat{y}]$ $\sigma = \lim_{R\to\infty} 4\pi R^2 \frac{|E_s|^2}{|E_i|^2} = \lim_{R\to\infty} 4\pi R^2 \frac{|H_s|^2}{|H_i|^2} = \lim_{R\to\infty} 4\pi R^2 \frac{I_s}{I_i}$ For conducting surface the induced current on a target is:

$\vec{J_s} = 2\hat{n} \times \vec{H_i}$ $\begin{pmatrix} \hat{x} \\ \hat{y} \\ \hat{z} \end{pmatrix} = (\mathbb{R}) \begin{pmatrix} \hat{r} \\ \hat{\theta} \\ \hat{\phi} \end{pmatrix}$ $\begin{pmatrix} \hat{x} \\ \hat{y} \\ \hat{z} \end{pmatrix} = \begin{pmatrix} \sin\theta\cos\phi & \cos\theta\cos\phi & -\sin\phi \\ \sin\theta\sin\phi & \cos\theta\sin\phi & \cos\phi \\ \cos\theta & -\sin\theta & \theta \end{pmatrix} \begin{pmatrix} \hat{r} \\ \hat{\theta} \\ \hat{\phi} \end{pmatrix}$ For $\phi = 0 \ \hat{x} = \sin\theta\hat{r} - \cos\theta\hat{\theta}$ Thus $E_s^{OAM} = \frac{-ik\eta_0}{4\pi} \frac{e^{-ikr}}{r} \hat{r} \times \int_{s'} 2\hat{n}' \times H_i^{OAM} \times \hat{r} e^{ik\hat{r}\cdot r'} ds'$ $$\sigma = 4\pi A_\perp \frac{|E_s^{OAM}|^2}{\int_0^{2\pi} \int_0^\pi |E_i^{OAM}|^2 \sin\theta' d\theta' d\phi'}$$

It will be appreciated by those skilled in the art having the benefit of this disclosure that this system and method for detecting and identifying targets using an orbital angular momentum correlation matrix. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for identifying an object, comprising:
generating a first correlation matrix using a reflected first signal at a first wavelength reflecting from a target object, wherein the reflected first signal is responsive to a first signal having a plurality of different Hermite-Gaussian functions applied to the first signal for applying different helicities to the first signal;
generating a second correlation matrix using a reflected second signal at a second wavelength reflected from the target object, wherein the reflected second signal is responsive to a second signal having the plurality of different Hermite-Gaussian functions applied to the second signal for applying different helicities to the second signal;
multiplying the first correlation matrix by an inverse of the second correlation matrix to obtain a third matrix;
generating a fourth matrix by taking a singular value decomposition of the third matrix, wherein the fourth matrix comprises a unique identifier for the target object;
identifying the target object responsive to the fourth matrix; and
outputting an indicator identifying the target object.

2. The method of claim 1, wherein the step of identifying the target object further comprises:
comparing the fourth matrix to a plurality of matrices stored within a database, each of the plurality of matrices associated with a particular target object;
determining a stored matrix of the plurality of matrices that matches the fourth matrix; and
identifying the target object based upon the determined stored matrix that matches the fourth matrix.

3. The method of claim 1, wherein the step of generating the first correlation matrix further comprise the steps of:
generating the first signal at the first wavelength;
applying each of the plurality of different Hermite-Gaussian functions to the first signal;
reflecting the first signal off of the target object as each of the plurality of different Hermite-Gaussian functions is applied thereto to generate the reflected first signal reflecting from the target object;
measuring an intensity value of the reflected first signal reflecting from the target object for each of the plurality of different Hermite-Gaussian functions; and storing the measured intensity values of the reflected first signal for each of the different orthogonal modes Hermite-Gaussian functions within the first correlation matrix.

4. The method of claim 1, wherein the step of generating the second correlation matrix further comprise the steps of:
generating the second signal at the second wavelength;
applying each of the plurality of different Hermite-Gaussian functions to the second signal;
reflecting the second signal off of the target object as each of the plurality of different Hermite-Gaussian functions is applied thereto to generate the reflected second signal reflecting from the target object;
measuring an intensity value of the reflected second signal reflecting from the target object for each of the plurality of different Hermite-Gaussian functions; and
storing the measured intensity values of the reflected second signal for each of the different Hermite-Gaussian functions within the second correlation matrix.

5. The method of claim 1, wherein the step of multiplying further comprises the step of inverting the second correlation matrix to create the inverse of the second correlation matrix.

6. The method of claim 1, wherein the first signal and the second signal comprises an RF signal.

7. The method of claim 1, wherein the first signal and the second signal comprises an optical signal.

8. A system for identifying a target object, comprising:
a database containing a plurality of matrices, each of the plurality of matrices associated with a particular target object;
a processor;
a memory coupled to the processor, the memory storing a plurality of instructions for execution by the processor, the plurality of instructions including:
instructions for generating a first correlation matrix using a reflected first signal at a first wavelength reflecting from the target object, wherein the reflected first signal is responsive to a first signal having a plurality of different Hermite-Gaussian functions applied to the first signal for applying different helicities to the first signal;
instructions for generating a second correlation matrix using a reflected second signal at a second wavelength reflected from the target object, wherein the reflected second signal is responsive to a second signal having the plurality of different Hermite-Gaussian functions applied to the second signal for applying different helicities to the second signal;
instructions for multiplying the first correlation matrix by an inverse of the second correlation matrix to obtain a third matrix;
instructions for generating a fourth matrix by taking a singular value decomposition of the third matrix, wherein the fourth matrix comprises a unique identifier for the target object;
instructions for identifying the target object responsive to the fourth matrix; and
instructions for outputting an indicator identifying the target object.

9. The system of claim 8, wherein the instructions for identifying the target object further comprises:
instructions for comparing the fourth matrix to a plurality of matrices stored within a database, each of the plurality of matrices associated with a particular target object;
instructions for determining a stored matrix of the plurality of matrices that matches the fourth matrix; and
instructions for identifying the target object based upon the determined stored matrix that matches the fourth matrix.

10. The system of claim 8, wherein the instructions for generating the first correlation matrix further comprise the steps of:
instructions for generating the first signal at the first wavelength;
instructions for applying each of the plurality of different Hermite-Gaussian functions to the first signal;
instructions for reflecting the first signal off of the target object as each of the plurality of different orthogonal modes Hermite-Gaussian functions is applied thereto to generate the reflected first signal reflecting from the target object;
instructions for measuring an intensity value of the reflected first signal reflecting from the target object for each of the plurality of different Hermite-Gaussian functions; and
instructions for storing the measured intensity values of the reflected first signal for each of the different Hermite-Gaussian functions within the first correlation matrix.

11. The system of claim 9, wherein the instructions for generating the second correlation matrix further comprise the steps of:
instructions for generating the second signal at the second wavelength;
instructions for applying each of the plurality of different Hermite-Gaussian functions to the second signal;
instructions for reflecting the second signal off of the target object as each of the plurality of different Hermite-Gaussian functions is applied thereto to generate a reflected second signal reflecting from the target object;
instructions for measuring an intensity value of the reflected second signal reflecting from the target object for each of the plurality of different Hermite-Gaussian functions; and
instructions for storing the measured intensity values of the reflected second signal for each of the different Hermite-Gaussian functions within the second correlation matrix.

12. The system of claim 9, wherein the instructions for multiplying further comprises instructions for inverting the second correlation matrix to create the inverse of the second correlation matrix.

13. The system of claim 9, wherein the first signal and the second signal comprises an RF signal.

14. The system of claim 9, wherein the first signal and the second signal comprises an optical signal.

15. A system for identifying a target object, comprising:
a database containing a plurality of matrices, each of the plurality of matrices associated with a particular target object;
a signal generator for generating a first signal at a first wavelength and a second signal at a second wavelength each having one of a plurality of Hermite-Gaussian functions applied thereto and directing the first and second signals toward the target object;
a correlation matrix generator for generating a first correlation matrix using a reflected first signal at the first wavelength reflecting from the target object and for generating a second correlation matrix using a reflected second signal at the second wavelength reflecting from the target object; and a detection system for multiplying the first correlation matrix by an inverse of the second correlation matrix to obtain a third matrix, for generating a fourth matrix by taking a singular value decomposition of the third matrix, wherein the fourth matrix comprises a unique identifier for the target object, for determining the target object responsive to the fourth matrix and the plurality of matrices within the database and for outputting an indicator identifying the target object.

16. The system of claim 15, wherein the detection system further compares the fourth matrix to the plurality of matrices stored within the database, determines a stored matrix of the plurality of matrices that matches the fourth matrix and identifies the target object.

17. The system of claim 15, wherein the correlation matrix generator further generates the first signal at the first wavelength, applies each of a plurality of different Hermite-Gaussian functions to the first signal and reflects the first signal from the target object as each of the plurality of different Hermite-Gaussian functions is applied thereto to generate the reflected first signal reflecting from the target object, further wherein the correlation matrix generator measures an intensity value of the reflected first signal reflecting from the target object for each of the plurality of different Hermite-Gaussian functions and stores the measured intensity values of the reflected first signal for each of the different Hermite-Gaussian functions within the first correlation matrix.

18. The system of claim 15, wherein the correlation matrix generator further generates the second signal at the second wavelength, applies each of the plurality of different Hermite-Gaussian functions to the second signal and directs the second signal to reflect from the target object as each of the plurality of different Hermite-Gaussian functions is applied thereto to generate the reflected second signal reflecting from the target object, further wherein the correlation matrix generator measures an intensity value of the reflected second signal reflecting from the target object for each of the plurality of different Hermite-Gaussian functions and stores the measured intensity values of the reflected second signal for each of the different Hermite-Gaussian functions within the second correlation matrix.

19. The system of claim 15, wherein the correlation matrix generator further inverts the second correlation matrix to create the inverse of the second correlation matrix.

20. The system of claim 15, wherein the first signal and the second signal comprises an RF signal.

21. The system of claim 15, wherein the first signal and the second signal comprises an optical signal.

* * * * *